United States Patent
Kangas et al.

(10) Patent No.: US 6,664,359 B1
(45) Date of Patent: *Dec. 16, 2003

(54) TACKIFIED POLYDIORGANOSILOXANE POLYUREA SEGMENTED COPOLYMERS AND A PROCESS FOR MAKING SAME

(75) Inventors: Lani S. Kangas, Woodbury, MN (US); Mieczyslaw H. Mazurek, Roseville, MN (US); Kurt C. Melancon, White Bear Lake, MN (US); Walter R. Romanko, Austin, TX (US); Audrey A. Sherman, St. Paul, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,771
(22) PCT Filed: Apr. 25, 1996
(86) PCT No.: PCT/US96/05852
§ 371 (c)(1), (2), (4) Date: May 15, 1998
(87) PCT Pub. No.: WO96/35458
PCT Pub. Date: Nov. 14, 1996

(51) Int. Cl.$^7$ ............... C08L 83/10; C08G 18/61; C09D 183/10; C09J 183/10
(52) U.S. Cl. ............... 528/38; 528/22; 528/37
(58) Field of Search ............... 428/35.5, 355 N, 428/447, 448, 450, 451; 528/22, 37, 38

(56) References Cited

U.S. PATENT DOCUMENTS

| 2,676,182 A | 4/1954 | Daudt et al. ............... 556/453 |
| 2,736,721 A | 2/1956 | Dexter ............... 525/475 |
| 2,814,601 A | 11/1957 | Currie et al. ............... 528/18 |

(List continued on next page.)

FOREIGN PATENT DOCUMENTS

| DE | 3143994 | 5/1983 |
| EP | 0 250 248 | 12/1987 |
| EP | 0 311 262 | 4/1989 |
| EP | 0 380 236 | 8/1990 |
| EP | 0 540 332 | 5/1993 |
| JP | 4-214341 | 8/1992 |
| WO | WO 95/03354 | 2/1995 |

OTHER PUBLICATIONS

Parin, "Constrained Layer Viscoelastic Vibration Damping," Techical Paper, *Society of Manufacturing Engineers*, Sep. 1989.
Yilgor et al., "Segmented Organosiloxane Copolymers—1. Synthesis of Siloxane—Urea Copolymers," *Polymer*, vol. 25, pp. 1800–1806 (Dec. 1984).
Tyagi et al., "Segmented Organosiloxane Copolymers—2. Thermal and Mechanical Properties of Siloxane—Urea Copolymers," Polymer, vol. 25, pp. 1807–1816 (Dec. 1984).
Tyagi et al., "Solid State Properties of Segmented Polysiloxane Thermoplastic Elastomeric Copolymers," *Polymer Preprints*, vol. 24, No. 2, pp. 39–40 (Aug. 1983).

Primary Examiner—D. S. Nakarani
(74) Attorney, Agent, or Firm—Carolyn V. Peters

(57) ABSTRACT

A tackified composition comprising (a) a polydiorgannosiloxane polyurea segmented copolymer comprising the reaction product of (i) at least one polyaminie, wherein the polyamine comprises at least one polydiorganosiloxane diamine, or a mixture of at least one polydiorganosiloxane diamine and at least one organic polyamine, and (ii) at least one polyisocyanate, wherein the mol ratio of isocyanate to amined is between 0.9:1 and 0.95:1 or between 1.05:1 and about 1.3:1, and (b) silicate resins. The tackified compositions are useful as pressure sensitive adhesives, particularly for foamed backing tapes, medical tapes and the like, hot melt adhesives, vibration dampers, anti-corrosive materials.

1 Claim, 3 Drawing Sheets

U.S. PATENT DOCUMENTS

| | | | |
|---|---|---|---|
| 2,857,356 A | 10/1958 | Goodwin, Jr. | 442/151 |
| 3,528,940 A | 9/1970 | Modic | 524/493 |
| 3,562,352 A | 2/1971 | Nyilas | 525/440 |
| 3,772,247 A | 11/1973 | Flannigan | 528/31 |
| 3,890,269 A | 6/1975 | Martin | 528/14 |
| 4,117,192 A | 9/1978 | Jorgensen | 428/337 |
| 4,447,493 A | 5/1984 | Driscoll et al. | 428/332 |
| 4,518,758 A | 5/1985 | Cavezzan et al. | 528/12 |
| 4,528,343 A | 7/1985 | Kira | 528/26 |
| 4,539,345 A | 9/1985 | Hansen | 523/219 |
| 4,605,712 A | 8/1986 | Mueller et al. | 525/474 |
| 4,736,048 A | 4/1988 | Brown et al. | 556/454 |
| 4,900,474 A | 2/1990 | Terae et al. | 252/358 |
| 4,908,208 A | 3/1990 | Lee et al. | 424/409 |
| 4,933,396 A | 6/1990 | Leir et al. | 525/410 |
| 4,948,859 A | 8/1990 | Echols et al. | 528/28 |
| 4,985,526 A | 1/1991 | Kishita et al. | 528/15 |
| 5,028,679 A | 7/1991 | Terae et al. | 528/12 |
| 5,091,483 A | 2/1992 | Mazurek et al. | 525/477 |
| 5,118,775 A | 6/1992 | Inomata et al. | 528/12 |
| 5,194,113 A | 3/1993 | Lasch et al. | 156/243 |
| 5,213,879 A | 5/1993 | Niwa et al. | 428/213 |
| 5,214,119 A | 5/1993 | Leir et al. | 528/28 |
| 5,236,997 A | 8/1993 | Fujiki | 524/731 |
| 5,268,433 A | 12/1993 | Ikeno et al. | 525/478 |
| 5,279,896 A | 1/1994 | Tokunaga et al. | 428/355 |
| 5,286,815 A | 2/1994 | Leir et al. | 525/477 |
| 5,290,615 A | 3/1994 | Tushaus et al. | 428/40 |
| 5,314,748 A | 5/1994 | Mazurek et al. | 428/345 |
| 5,391,015 A | 2/1995 | Kaczmarczik et al. | 404/14 |
| 5,461,134 A | 10/1995 | Leir et al. | 528/14 |
| 5,468,815 A | 11/1995 | Boardman et al. | 525/478 |
| 5,514,730 A | 5/1996 | Mazurek et al. | 522/99 |

TACKIFIED POLYDIORGANOSILOXANE POLYUREA SEGMENTED COPOLYMERS AND A PROCESS FOR MAKING SAME

TECHNICAL FIELD

This invention relates to polydiorganosiloxane polyurea segmented copolymers and a process for making the same.

BACKGROUND OF THE INVENTION

Pressure-sensitive adhesive tapes have been used for more than half a century for a variety of marking, holding, protecting, sealing and masking purposes. Pressure-sensitive adhesive tapes comprise a backing, or substrate, and a pressure-sensitive adhesive. Pressure-sensitive adhesives are materials which adhere with no more than applied finger pressure and are aggressively and permanently tacky. Pressure-sensitive adhesives require no activation, exert a strong holding force and tend to be removable from a smooth surface without leaving a residue. In some applications, interesting pressure-sensitive adhesives are silicone based adhesives.

Traditionally, polydiorganosiloxane pressure-sensitive adhesives have been made in solution. Conventional solvent based polydiorganosiloxane pressure-sensitive adhesives are generally blends of high molecular weight silanol functional polydiorganosiloxanes, i.e., polydiorganosiloxane gums, and copolymeric silanol functional silicate resin, i.e., MQ resins, which comprise $R_3SiO_{1/2}$ units and $SiO_{4/2}$ units. In order to obtain the desired adhesive properties, it has been necessary to react the copolymeric silicate resin with the polydiorganosiloxane. Improvements in such pressure-sensitive adhesive properties are achieved when the copolymeric polydiorganosiloxane resin and polydiorganosiloxane are intercondensed, providing intra- and inter-condensation within the adhesive. This condensation step requires 1) the addition of a catalyst, 2) reacting the copolymeric polydiorganosiloxane resin and polydiorganosiloxane in solution, and 3) allowing the reaction to take place over a period of time at elevated temperature Solutions of intercondensed polydiorganosiloxane pressure-sensitive adhesives, are generally applied to a backing, heated to remove solvent, and crosslinked, if necessary, to improve physical properties. If crosslinking is needed, peroxide catalysts are conmnonly used. Disadvantages of solution applied polydiorganosiloxane pressure-sensitive adhesives include the need for elaborate drying ovens to remove solvent, and if crosslinking is required, ovens which operate at temperatures greater than 140° C. are needed to initiate diaryl peroxide crosslinking catalysts. Such high oven temperatures limit the substrates useful in making pressure-sensitive adhesive tapes to those which can withstand the elevated temperatures.

In the medical field, pressure-sensitive adhesive tapes are used for many different applications in the hospital and health areas, but basically they perform one of two functions. They are used to restrict movement, such as in various strapping applications, or they are used to hold something in place, such as a wound dressing. It is important in each function that the pressure-sensitive adhesive tape be compliant with and non-irritating to the skin and adhere well to the skin without causing skin damage on removal.

In recent years, pressure-sensitive adhesives have been used in transdermal patch aplications as drug transport membranes or to attach drug transport membranes to skin. Although there is continued development of new drugs and the need for different transport rates of existing drugs, pressure-sensitive adhesives are still needed that can transport such drugs at various rates. Furthermore, there is a continuing need to adhere new drug transport membrances to skin during a treatment period.

In the automotive industry, there are applications that remain unaddressed by current tape products. One such application relates to automative paints and finishes that are formulated for environmental conservation, recyclability, enhanced appearance, improved durability, as well as resistance to environmental sources of contamination. Painted substrates using these new formulations are difficult to adhere to with current tape products. Another application involves mounting thermoplastic polyolefin automotive body side moldings.

Similarly, early electrical tapes were black friction tapes, and the adhesive was soft and often split when unwound. Current electrical tapes have a layer of a pressure-sensitive adhesive applied to a plasticized polyvinyl chloride backing or a polyethylene or rubber film backing. Electrical tape is used to insulate, hold, reinforce and protect electrical wires. Other uses include providing a matrix for varnish impregnation, identifying wires in electrical circuitry, and protecting terminals during manufacture of electrical circuit boards. Electrical tape, should be stretchable, conformable and meet nonflammability requirements.

Corrosion protection materials must be delivered in a conformable form for optimal performance. The ability of pressure-sensitive adhesives to instantly attach to exposed surfaces is very useful for applying protective constructions and for convenient repair of breached protective coatings associated with steel pipelines and related structures subject to corrosion. In these and related applications, the material must not readily flow or be easily rubbed off. Some of the properties of commercially available silicones are known to provide some degree of corrosion protection.

For many heat shrink applications, a single article capable of withstanding high temperature while providing an environmental seal is desired. It is preferable that the adhesive be transparent, to allow viewing of the spliced or protected region. Dual wall heat shrink tubes generally are coextruded tubes of polyolefin (the shrinkable sleeve) and EVA (for hot melt sealing). Use of these products is limited by the rheology of the hot melt. High temperature heat shrink tubes are generally made of fluorinated materials. Hotmelts used in dual wall heat shrink can be of a wide range of materials, as described in U.S. Pat. No. 4,509,820. However, no hotmelt adhesive with satisfactory flow and temperature stability has been identified for use at the shrink temperature of high temperature tubing.

Preformed pavement marking materials include pavement marking sheet materials and raised pavement markers that are used as highway and pedestrian crosswalk markings. They are often reflective and strategically oriented to enhance reflective efficiency when illuminated by vehicle headlamps at night. The marking materials must adhere to a variety of surfaces such as concrete or asphalt, that may be cold, hot, oily, damp, rough or smooth. Present pavement marking adhesive generally have inadequate initial bonding or inadequate permanent bonding to roadway surfaces that are illustrated by five problem areas: (1) limited adhesive tack at cold temperatures resulting in a narrow application window, (2) reduced durability under shear or impact causing difficult removal of temporary markings, (3) low molecular weight fractions in the adhesives on removable markings that stain light colored concrete surfaces, (4)

limited ductility allowing raised markers to sometimes shatter upon impact by vehicle tires and (5) insufficient elasticity to fill in gaps between markers and rough road surfaces, thus often leading to premature detachment of the marker from the roadway surface.

Hot melt adhesives are compositions that can be used to bond nonadhereing surfaces together into a composite. During application to a substrate, hot melt adhesives should be sufficiently fluid to wet the surface completely and leave no voids, even if the surface is rough. Consequently, the adhesive must be low in viscosity at the time of application. However, the bonding adhesive generally sets into a solid to develop sufficient cohesive strength to remain adhered to the substrate under stressful conditions.

For hot melt adhesives, the transition from fluid to solid may be accomplished in several ways. First, the hot melt adhesive may be thermoplastic that softens and melts when heated and becomes hard again when cooled. Such heating results in sufficiently high fluidity to achieve successful wetting. Alternatively, the hot melt adhesive may be dissolved in a solvent or carrier that lowers the viscosity of the adhesive sufficiently to permit satisfactory wetting and raised the adhesive viscosity when the solvent or carrier is removed. Such an adhesive can be heat activated, if necessary.

Damping is the dissipation of mechanical energy as heat by a material in contact with the source of that energy. The temperature range and frequency range over which damping occurs can be quite broad, depending upon the particular application. For instance, for damping in tall buildings that experience wind sway or seismic vibrations, the frequency range can go to as low as about 0.1 Hertz (Hz) up to about 10 Hz. Higher frequency damping applications can be those such as for computer disk drives (on the order of 1000 Hz) or higher frequency applications (10,000 Hz). Furthermore, outdoor damping applications expose damping treatments to a wide range of temperature and humidity conditions.

While the performance of a surface layer damping treatment depends largely on the dynamic properties of the viscoelastic material, it is also dependent on other parameters. The geometry, stiffness, mass, and mode shape of the combination of the damping material and the structure to which it is applied will affect the performance of the damping material.

Presently known viscoelastic materials consist of single components or polymer blends. Since presently known single component viscoelastic materials perform over fairly narrow temperature ranges, conventional solutions to wide temperature variations incorporate multiple layers of viscoelastic material, with each layer being optimized for a different temperature range.

SUMMARY OF THE INVENTION

The present invention provides compositions comprising (a) polydiorganosiloxane polyurea segmented copolymer compositions comprising the reaction product of (i) at least one polyamine, wherein the polyamine comprises at least one polydiorganosiloxane diamine, or a mixture of at least one polydiorganosiloxane diamine and at least one organic amine, and (ii) at least one polyisocyanate, wherein the mol ratio of isocyanate to amine is between 0.9:1 and 0.95:1 and between 1.05:1 and about 1.3:1, and (b) silicate resins. The composition may optionally contain the product of the addition reaction of at least one polydiorganosiloxane monoamine and at least one polyisocyanate and optionally polydiorganosiloxane diamine. The composition may also optionally contain nonreactive additives such as fillers, pigments, stabilizers, plasticizers, organic tackifiers, antioxidants, compatibilizers and the like. The composition may also have vibration damping, PSA, hot melt, and corrosion protection characteristics.

The present invention further provides a tackified polydiorganosiloxane polyurea segmented copolymer composition comprising (a) a polydiorganosiloxane polyurea segmented copolymer with alternating soft polydiorganosiloxane units and hard polyisocyanate residue units, (wherein the polyisocyanate residue is the polyisocyanate minus the —NCO groups), and optionally, soft and/or hard organic polyamine units, and such that the residues of the amine and isocyanate units are connected together by urea linkages. Compositions of the present invention typically have inherent viscosities of at least 0.8 dL/g, or are essentially insoluble in common organic solvents such as, for example, chloroform, tetrahydrofuran, dimethyl formamide, toluene, isopropyl alcohol, and combinations thereof, and (b) silicate resin. The composition may optionally contain the product of the addition reaction of at least one polydiorganosiloxane monoamine and at least one polyisocyanate and optionally polydiorganosiloxane diamine. The composition may also have vibration damping, PSA, hot melt, and corrosion protection characteristics.

The compositions of the present invention are particularly useful as pressure-sensitive adhesives and in one aspect of the present invention, the pressure-sensitive adhesives (PSAs) can be used to fabricate PSA articles, wherein the PSA articles comprise a flexible substrate and a layer of PSA prepared according to the present invention. Furthermore, the substrate may be any substrate that would be known to those skilled in the art, may be previously made or coextruded with the PSA, and may further be coated or treated to provide a low energy release surface, such as coating with a low adhesion backsize, a release coating and the like. In addition, the substrate may be made of a low surface energy material such as, for example, TEFLON™ and polyolefins. Particularly useful articles include medical tapes, transdermal drug delivery systems, corrosion protection tapes and pavement markers.

In another aspect of the present invention, hot melt adhesives can be used as prepared rods, sheets, pellets and the like that can be subsequently applied in a molten state or heat activated to produce an adhesive bond between different substrates. The substrate may be any substrate that would be known to those skilled in the art and the invention would be especially useful in adhering low surface energy materials and electronic components.

The polydiorganosiloxane polyurea segmented copolymer pressure-sensitive adhesives in this invention provide to metal substrates superior corrosion protection and ease of application. They also offer the appropriate combination of viscosity, thermal stability and transparency for heat shrink applications.

The present invention also provides a vibration damping composite comprising at least one substrate and at least one layer of the composition of the present invention The substrate may be flexible, stiff, or rigid. Furthermore, the substrate may be any substrate that would be known to those skilled in the art and may further be coated or treated to provide a low energy release surface, such as coating with a low adhesion backsize, a release coating and the like.

Such composites may be a constrained layer construction, wherein the construction comprises at least one substrate having a stiffness sufficient to cause resonation within the substrate in response to an internal or external applied force and at least one layer of the composition of the present invention. The constrained layer construction preferably has a composite loss factor, tan δ greater than or equal to 0.40 in the temperature range of between about −80 and 150° C. and in the frequency range of 0.01 to 100,000 Hz as evaluated by a Polymer Laboratories Dynamic Mechanical Thermal Analyzer Mark II in the shear mode. The useful temperature range depends on both the frequency and the characteristics of the damping composition.

In another aspect, the composite article construction may be such to provide a bidirectional vibration damping constrained layer construction comprising at least two rigid members, and at least one layer of the composition of the present invention. Generally, each rigid member has a stiffness exceeding that of a 0.25 cm steel plate. Preferably, the vibration damping composition has a tan δ greater than or equal to 0.4 in the temperature range of −80° C. and 150° C. and in the frequency range of 0.1 to 10 Hz, as evaluated by a Polymer Laboratories Dynamic Mechanical Thermal Analyzer Mark II in the shear mode.

Advantageously, shaped articles can be produced, for example, by techniques such as compression molding, injection molding, casting, calendaring and extrusion.

The compositions of the present invention have excellent physical properties typically associated with polydiorganosiloxane polymers such as moderate thermal and oxidative stabilities, UV resistance, low surface energy and hydrophobicity, resistance to degradation from exposure to heat and water, good dielectric properties, good adhesion to low surface energy substrates, low index of refraction, and flexibility at low temperatures. In addition, the compositions exhibit a combination of unexpected properties including, for example, excellent mechanical strength upon cooling, allowing subsequent operations to contact the surface soon after the compositions have been applied, excellent damping performance over a broad temperature range, an ability to withstand large strains, excellent adhesion to a variety of substrates when formulated for adhesion, and handling characteristics that permit easy attainment of desired thicknesses and shapes.

The compositions of the invention have good resistance to environmental conditions and good performance over a broad range of frequency and temperature. Vibration damping compositions of the present invention have wide utility for minimizing adverse vibration in constrained layer damping treatments as well as minimizing adverse wind sway and seismic influences in buildings subject to wide temperature and humidity variations.

The polyurea functionality of the polydiorganosiloxane-based compositions allows the formulation to take advantage of thermally disassociable crosslinks that are formed via hydrogen bonding of the urea functional groups in the polymer backbone. These crosslinks are thermally disassociated during hot melt processing to allow coating and can reform on cooling to restore the original mechanical properties without the need for additional crosslinking agents.

The present invention further provides a method of making a melt processable composition comprising the steps of mixing a polyamine with a polyisocyanate in a heated vessel, reacting the two to make polydiorganosiloxane urea segmented copolymer and adding a silicate tackifying resin. The process is preferably carried out under substantially solventless conditions. The silicate tackifying resin can be added at any point in the process, preferably before or during the reaction step, and more preferably before the reaction step. Optionally the silicate tackifying resin can be subsequently added to the reacted polydiorganosiloxane polyurea segmented copolymer in solution.

The substantial elimination of solvent in the process of the present invention has many advantages involving the environment, economics, and safety. This solventless process is environmentally advantageous as there are no solvents to be evaporated from the final composition. The continuous nature of this process has several other inherent advantages over conventional solution polymerization processes. The isocyanate to amine ratio can be varied below and, more notably, above 1:1 to optimize the properties while still obtaining strong, extrudable materials. Another advantage of this process is the ability to utilize high molecular weight polydiorganosiloxane polyurea segmented copolymers which are not obtainable using solution polymerization processes due to the insolubility of the forming polymer in the solvent medium or excessively high viscosities at practical solution concentrations.

Yet another advantage of this substantially solventless, continuous process is the ability to add or blend, in line, the silicate resin, as well as various fillers, and other property modifiers into the polydiorganosiloxane polyurea segmented copolymer before, during, or after formation of the copolymer.

Optionally, nonreactive additives such as fillers, plasticizers, pigments, stabilizers, antioxidants, flame retardants, compatibilizers and the like may be added at any point in each of the above processes.

DESCRIPTION OF THE EMBODIMENT(S)

Figure 1:
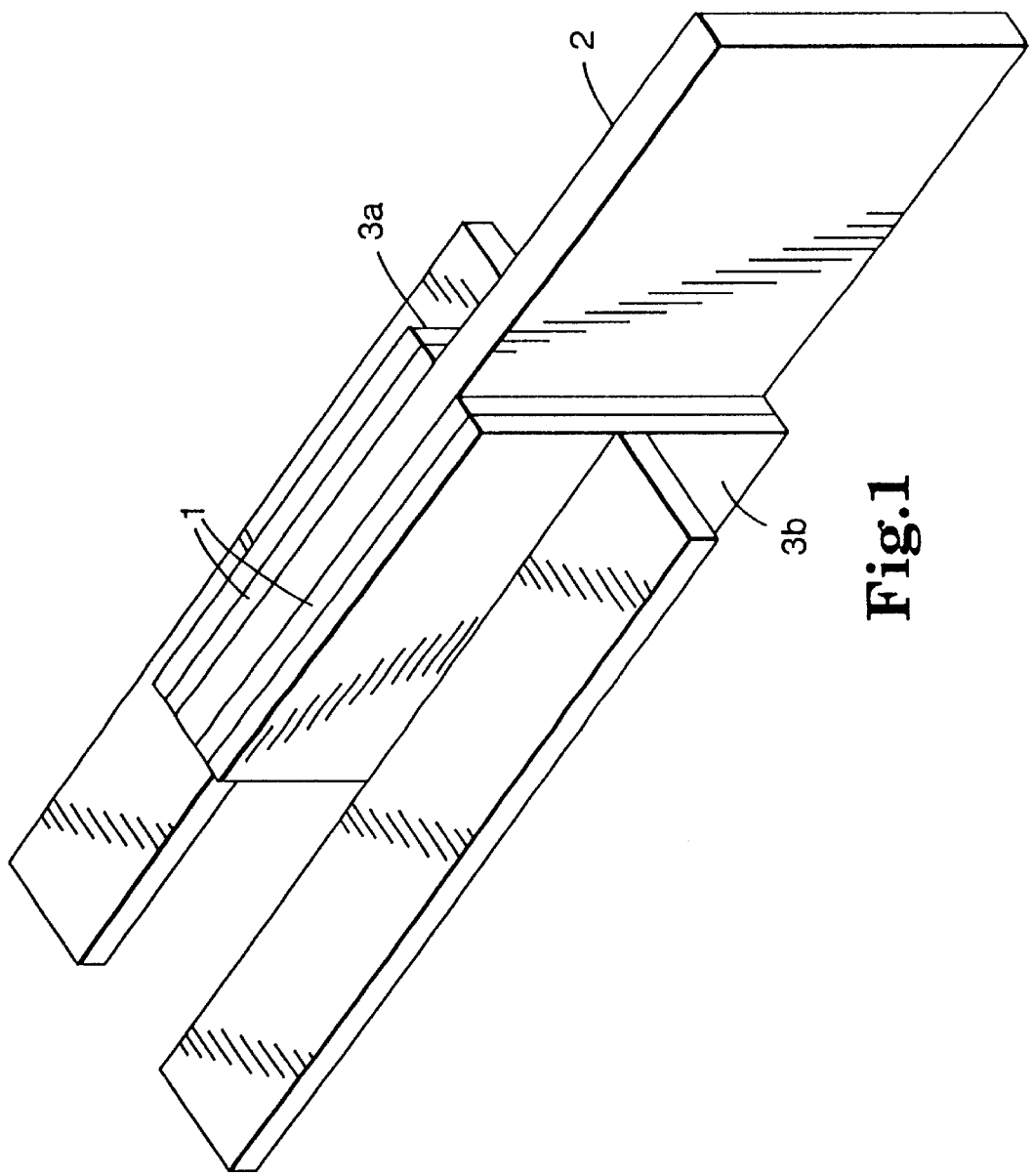
FIG. 1 is a perspective view of a bidirectional vibration damper of the present invention.

The polydiorganosiloxane polyurea segmented copolymers of the invention can be represented by the repeating unit:

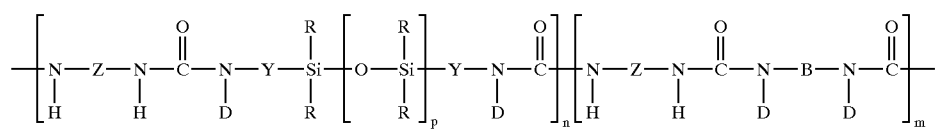

wherein:

each R is a moiety that independently is an alkyl moiety preferably having about 1 to 12 carbon atoms and may be substituted with, for example, trifluoroalkyl or vinyl groups, a vinyl radical or higher alkenyl radical preferably represented by the formula —$R^2(CH_2)_a$ CH=$CH_2$ wherein $R^2$ is —$(CH_2)_b$— or —$(CH_2)_c$ CH=CH— and a is 1, 2 or 3; b is 0, 3 or 6; and c is 3, 4 or 5, a cycloalkyl moiety having about 6 to 12 carbon atoms and may be substituted with alkyl, fluoroalkyl, and vinyl groups, or an aryl moiety preferably having about 6 to 20 carbon atoms and may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a perfluoroether-containing group, as described in U.S. Pat. Nos. 4,900,474 and No. 5,118,775, wherein such descriptions are incorporated herein by reference; preferably at least 50% of the R moieties are methyl radicals with the balance being monovalent alkyl or substituted alkyl radicals having 1 to 12 carbon atoms, alkenylene radicals, phenyl radicals, or substituted phenyl radicals;

each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy- 4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of to 10 carbon atoms, an aralkylene radical or an arylene radical preferably having 6 to 20 carbon atoms;

each D is selected from the group consisting of hydrogen, an alkyl radical of 1 to 10 carbon atoms, phenyl, and a radical that completes Y to form a heterocycle;

B is a polyvalent radical selected from the group consisting of alkylene, aralkylene, cycloalkylene, phenylene, polyalkylene oxide, including for example, polyethylene oxide, polypropylene oxide, polytetramethylene oxide, and copolymers and mixtures thereof, m is a number that is 0 to about 1000;

n is a number that is equal to or greater than 1, and is a number that is about 10 or larger, preferably about 15 to 2000, more preferably about 30 to 1500.

In the use of polyisocyanates (Z is a radical of functionality greater than 2) and polyamines (B is a radical of functionality greater than 2), the structure of Formula I will be modified to reflect branching at the polymer backbone.

Polydiorganosiloxane diamines useful in the process of the present invention can be represented by the formula

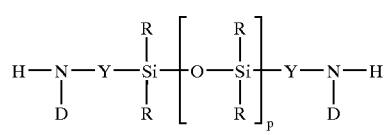

(II)

wherein each of R, Y, D, and p are defined as above. Generally, the number average molecular weight of the polydiorganosiloxane diamines useful in the present invention are greater than about 700.

Polydiorganosiloxane diamines (also referred to as silicone diamines) useful in the present invention are any which fall within Formula II above and including those having molecular weights in the range of about 700 to 150,000. Polydiorganosiloxane diamines are disclosed, for example, in U.S. Pat. No. 3, 890,269, U.S. Pat. No. 4, 661,577, U.S. Pat. No. 5,026,890, U.S. Pat. No. 5,276,122, each of which is incorporated herein by reference, and International Patent Publication No. WO 95/03354. Polydiorganosiloxane diamines are commercially available from, for example, Shin Etsu Silicones of America, Inc., Torrance, Calif., and Hüls America, Inc. Preferred are substantially pure polydiorganosiloxane diamines prepared as disclosed in U.S. Pat. No. 5,214,119 which is incorporated herein by reference. The polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15 weight percent based on the weight of the total amount of cyclic organosiloxane with the reaction run in two stages.

Particularly preferred polydiorganosiloxane diamines are prepared using cesium and rubidium catalysts. The preparation of polydiorganosiloxane diamine includes combining under reaction conditions (1) an amine functional endblocker represented by the formula

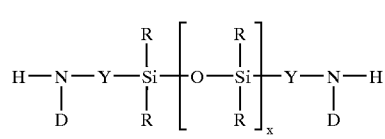

(III)

wherein:

each R, D and Y are defined as above, and x is an integer of about 1 to 150;

(2) sufficient cyclic siloxane to obtain a polydiorganosiloxane diamine having a number average molecular weight greater than the molecular weight of the endblocker; and (3) a catalytically effective amount of cesium hydroxide, rubidium hydroxide, cesium silanolate, rubidium silanolate, cesium polysiloxanolate, rubidium polysiloxanolate, and mixtures thereof. The reaction is continued until substantially all of the amine functional endblocker is consumed.

The reaction is then terminated by adding a volatile organic acid to form a mixture of a polydiorganosiloxane diamine usually having greater than about 0.01 weight percent silanol impurities and one or more of the following: a cesium salt of the organic acid, a rubidium salt of the organic acid, or both such that there is a small molar excess of organic acid in relation to catalyst. The silanol groups of the reaction product are then condensed under reaction conditions to form polydiorganosiloxane diamine having less than or equal to about 0.01 weight percent silanol impurities while the unreacted cyclic siloxane is stripped. Optionally, the salt is removed by subsequent filtration.

Examples of polydiorganosiloxane diamines useful in the present invention include but are not limited to polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and copolymers and mixtures thereof Examples of organic polyamines useful in the present invention include but are not limited to polyoxyalkylene diamine such as D-230, D400, D-2000, D4000, DU-700, ED-2001 and EDR-148 available from Huntsman, polyoxyalkylene triamines such as T-3000 and T-5000 available from Huntsman, polyalkylenes such as Dytek A and Dytek EP available from DuPont.

Different polyisocyanates in the reaction will modify the properties of the polydiorganosiloxane polyurea segmented copolymer. For example, if a polycarbodiimide-modified diphenylmethane-diisocyanate, such as ISONATE™ 143L, available from Dow Chemical Co., is used, the resulting polydiorganosiloxane polyurea segmented copolymer has enhanced solvent resistance when compared with copolymers prepared with other diisocyanates. If tetramethyl-m-xylylene diisocyanate is used, the resulting segmented copolymer has a very low melt viscosity that makes it particularly useful for injection molding.

Diisocyanates useful in the process of the present invention can be represented by the formula

OCN—Z—NCO (IV)

Any diisocyanate that can react with a polyamine, and in particular with polydiorganosiloxane diamine of Formula II can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene 4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(o-dianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate. Particularly preferred is tetramethyl-m-xylylene diisocyanate. Polydiorganosiloxane polyurea segmented copolymers produced using tetramethyl-m-xylylene diisocyanate generally have lower melt viscosities than similar copolymers produced using other diisocyanates, and a higher modulus.

Any triisocyanate that can react with a polyamine, and in particular with polydiorganosiloxane diamine of Formula II, can be used in the present invention. Examples of such triisocyanates include, but are not limited to, polyfunctional isocyanates, such as those produced from biurets, isocyanurates, adducts and the like. Some commercially available polyisocyanates include portions of the DESMODUR™ and MONDUR™ series from Bayer and the PAPI™ series of Dow Plastics.

Preferred triisocyanates include DESMODUR™ N-3300 and MONDUR™ 489.

When the reaction of the polyamine and the polyisocyanate is carried out under solventless conditions to prepare the polydiorganosiloxane polyurea segmented copolymer, the relative amounts of amine and isocyanate can be varied over a much broader range than those produced by previous methods. Molar ratios of isocyanate to amine continuously provided to the reactor are preferably from about 0.9:1 to 1.3:1, more preferably 1:1 to 1.2:1.

Once the reaction of the polyisocyanate with the polyamine has occurred, active hydrogens in the urea linkage may still be available for reaction with excess isocyanate. By increasing the ratio of isocyanate to amine, the formation of biuret moieties may be facilitated, especially at higher temperatures, resulting in branched or crosslinked polymer. Low to moderate amounts of biuret formation can be advantageous to shear properties and solvent resistance.

The polydiorganosiloxane polyamine component employed to prepare polydiorganosiloxane polyurea segmented copolymers of this invention provides a means of adjusting the modulus of the resultant copolymer. In general, high molecular weight polydiorganosiloxane polyamines provide copolymers of lower modulus, whereas low molecular polydiorganosiloxane polyamines provide polydiorganosiloxane polyurea segmented copolymers of higher modulus.

When polydiorganosiloxane polyurea segmented copolymer compositions contain an optional organic polyamine, this optional component provides yet another means of modifying the modulus of copolymers of this invention. The concentration of organic polyamine as well as the type and molecular weight of the organic polyamine determine how it influences the modulus of polydiorganosiloxane polyurea segmented copolymers containing this component.

The silicate resin plays an important role in determining the physical properties of the compositions of the present invention. For example, as silicate resin content is increased from low to high concentration the glassy to rubbery transition occurs at increasingly higher temperatures. Thus, varying silicate resin concentration in vibration damping applications shifts the area of maximum damping to the desired temperature range. Of course the M to Q ratio, D and T content, and molecular weight of resins may significantly influence the relative "hardness" of the resin and must be considered when selecting resin type and concentration. Furthermore, one need not be limited to a single silicate resin as it may be beneficial to employ a combination of resins in a single composition to achieve desired performance.

The silicate resins useful in the present invention include those resins composed of the following structural units M, D, T, and Q, and combinations thereof For example, MQ silicate resins, MQD silicate resins, and MQT silicate resins which also may be referred to as copolymeric silicate resins and which preferably have a number average molecular weight of about 100 to about 50,000, more preferably about 500 to about 10,000 and generally have methyl substituents. The silicate resins include both nonfunctional and functional resins, the functional resins having one or more functionalities including, for example, silicon-bonded hydrogen, silicon-bonded alkenyl, and silanol. MQ silicate resins are copolymeric silicate resins having $R'_3SiO_{1/2}$ units and $SiO_{4/2}$ units. Such resins are described in, for example, *Encyclopedia of Polymer Science and Engineering*, vol. 15, John Wiley & Sons, New York, (1989), pp 265–270, and U.S. Pat. No. 2,676,182, U.S. Pat. No. 3,627,851, U.S. Pat. No. 3,772,247, and U.S. Pat. No. 5,248,739, wherein such descriptions are incorporated herein by reference. MQ silicate resins having functional groups are described in U.S. Pat. No. 4,774,310 that has silyl hydride groups, U.S. Pat. No. 5,262,558 that has vinyl and trifluoropropyl groups, and U.S. Pat. No. 4,707,531 that has silyl hydride and vinyl groups, wherein the description from each reference is incorporated herein by reference. The above-described resins are generally prepared in solvent. Dried, or solventless, MQ silicate resins can be prepared, as described in U.S. Pat. No. 5,319,040, U.S. Pat. No. 5,302,685, and U.S. Pat. No. 4,935,484, wherein such descriptions are incorporated herein by reference. MQD silicate resins are terpolymers having $R'_3SiO_{1/2}$ units, $SiO_{4/2}$ units, and $R'_2SiO_{2/2}$ units such as are taught in U.S. Pat. No. 2,736,721 wherein such description is incorporated herein by reference. MQT silicate resins are terpolymers having $R'_3SiO_{2/1}$ units, $SiO_{4/2}$ units and $R'SiO_{3/2}$ units such as are taught in U.S. Pat. No. 5,110,890 wherein such description is incorporated herein by reference and Japanese Kokai HE 2-36234.

Commercially available silicate resins include SR-545, MQ resin in toluene, available from General Electric Co., Silicone Resins Division, Waterford, N.Y.; MQOH resins, which are MQ resins available from PCR, Inc. Gainesville, Fla.; MQR-32-1, MQR-32-2, and MQR-32- 3 which are MQD resins in toluene, available from Shin-Etsu Silicones of America, Inc., Torrance, Calif., and PC-403 a hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying and the like, or steam separation to provide a silicate resin at substantially 100% nonvolatile content for use in compositions of the present invention. Also useful in compositions of the present invention are blends of two or more silicate resins.

The optional polydiorganosiloxane oligourea segmented copolymer component of this invention provides yet another means of varying the modulus of copolymeric compositions containing this component. Similar to the function of the polydiorganosiloxane polyamine, the optional polydiorganosiloxane oligourea segmented copolymer can serve to either increase or decrease the modulus of the resultant copolymer, depending upon the particular polydiorganosiloxane mono- and di-amines employed in the preparation of the polydiorganosiloxane oligourea segmented copolymer.

The composition preferably contains about 20 to 80 parts by weight polydiorganosiloxane polyurea segmented copolymer, more preferably about 25 to 75 parts by weight, most preferably about 30 to 70 parts by weight. The composition preferably contains about 20 to 80 parts by weight silicate resin, more preferably about 25 to 75 parts by weight, most preferably about 30 to 70 parts by weight. The total parts by weight of the polydiorganosiloxane polyurea segmented copolymer and the silicate resin equal 100.

The composition may optionally contain polydiorganosiloxane oligourea segmented copolymer which, when present, is preferably present in an amount of from about 5 to 50 parts per 100 total parts of polydiorganosiloxane polyurea segmented copolymer and silicate resin.

The optional polydiorganosiloxane oligourea segmented copolymers can be represented by Formula V, as follows:

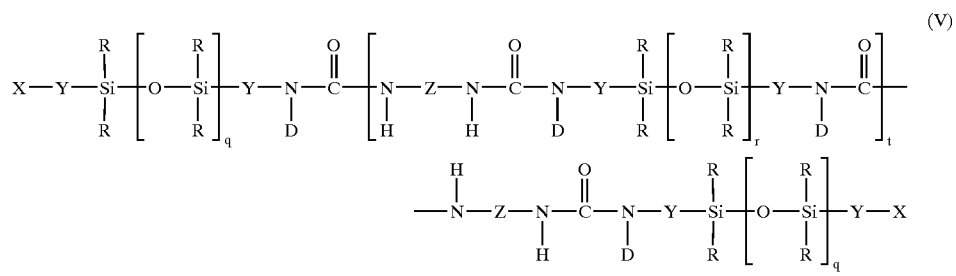

(V)

where: Z, Y, R, and D are previously described;
  each X is a monovalent moiety which is not reactive under moisture curing or free radical curing conditions and which independently is an alkyl moiety preferably having about 1 to 12 carbon atoms and which may be substituted with, for example, trifluoroalkyl or vinyl groups or an aryl moiety preferably having about 6 to 20 carbon atoms and which may be substituted with, for example, alkyl, cycloalkyl, fluoroalkyl and vinyl groups;
  q is 5 to 2000 or larger;
  r is 1 to 2000 or larger; and
  t is 0 or 1 to 8 or larger.

The optional polydiorganosiloxane urea segmented oligomer components of Formula V may be made by either a solvent process or a solventless process similar to that used for making polydiorganosiloxane urea segmented polymer except the input materials comprise:
  (A) at least one diisocyanate represented by Formula IV;
  (B) at least one polydiorganosiloxane monoamine represented by Formula VI as follows:

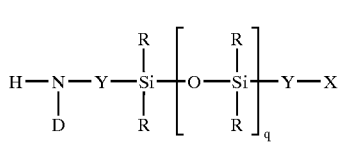

VI where R, Y, D, X, and q are defined above; and
  (C) optionally, at least one polydiorganosiloxane diamine represented by Formula II except that p is an integer greater than 0.

In general approximately one mole of (A) is used for every two moles of (B) and approximately an additional mole of (A) is used for each mole of (C) that is used. In the process for making polydiorganosiloxane oligourea segmented copolymers, the polydiorganosiloxane monoamine are mixed in a reactor and allowed to react to form the polydiorganosiloxane polyurea segmented copolymer that can then be removed from the reaction vessel.

In the process of the invention, the following reaction occurs:

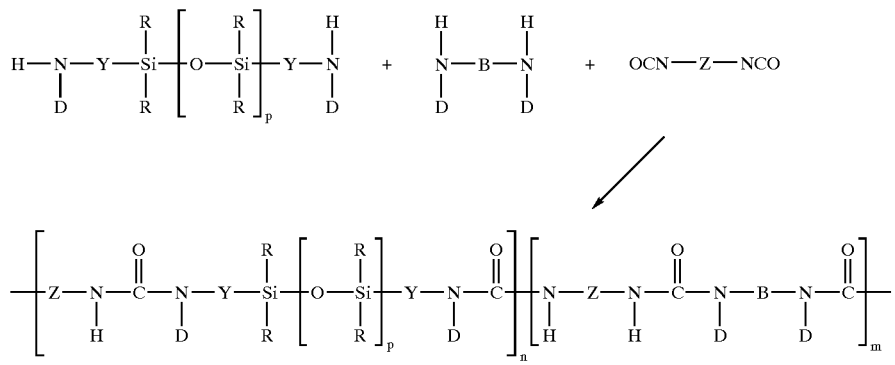

(s), isocyanate(s), and optionally polydiorganosiloxane diamine(s) are mixed in a reaction vessel and allowed to react to form the polydiorganosiloxane oligourea segmented copolymer which can then be removed from the reaction vessel.

The composition of the present invention may also optionally contain various fillers and other property modifiers. Fillers such as fumed silica, carbon fibers, carbon black, glass beads, glass bubbles, glass fibers, mineral fibers, clay particles, organic fibers, e.g., nylon, KEVLAR™, metal particles, and the like which can be added in amounts up to about 50 parts per 100 parts of polydiorganosiloxane urea segmented polymer and silicate resin, provided that if and when incorporated, such additives are not detrimental to the function and functionality of the final polymer product. Other additives such as dyes, pigments, flame retardants, stabilizers, antioxidants, compatibilizers, antimicrobial agents such as zinc oxide, electrical conductors, thermal conductors such as aluminum oxide, boron nitride, aluminum nitride, and nickel particles, and the like can be blended into these systems in amounts of from about 1 to 50 volume percent of the composition.

The compositions and constructions of the present invention can be made by solvent processes known to the art, by a continuous solventless process or by a combination of the two. Examples of solvent processes by which the polyorganosiloxane polyurea segmented copolymer useful in the present invention can be prepared include: Tyagi et al., "Segmented Organosiloxane Copolymers: 2. Thermal and Mechanical Properties of Siloxane-Urea Copolymers," Polymer, vol. Dec. 25, 1984 and U.S. Pat. No. 5,214,119 (Leir et al.) which is incorporated herein for that purpose. The silicate resin can then be added to the solvent solution of the polyorganosiloxane polyurea segmented polymer to form the composition useful in the constructions and methods of bonding, corrosion protection, or vibrationally damping an article of the present invention.

In the process of the present invention, reactants, including at least one polyamine, wherein such polyamine is at least one polydiorganosiloxane diamine or a mixture of at least one polydiorganosiloxane diamine and at least one organic polyamine and at least one polyisocyanate diamine Properties of the compositions of the present invention result from the copolymer molecular weight and architecture. Flexibility of the process of the present invention leads to interesting materials, some of which, though they may not be fully soluble in solvents for inherent viscosity or molecular weight determination, may nevertheless be quite useful materials in terms of physical properties and can still be extrudable. One skilled in the art can expect the optimum material for a particular application to be a function of isocyanate-to-amine ratio, polyisocyanate and polyamine architecture, order of reactant addition mixing speed, temperature, reactor throughput, reactor configuration and size, residence time, residence time distribution, and whether any fillers, additives, or property modifiers are added. This process allows the freedom to vary the molecular weight and architecture over quite a wide range, thus enabling one to tailor the properties to suit a variety of applications.

Any reactor that can provide intimate mixing of polyamine and polyisocynate and the reaction products there of is suitable for use in invention. The reaction may be carried out as a batch process using, for example, a flask equipped with a mechanical stirre, provided the product of the reaction has a sufficiently low viscosity at the processing temperature to permit mixing, or as a continuous process using, for example, a single screw or twin screw extruder. Preferably, the reactor is a wiped surface counter-rotating or co-rotating twin screw extruder.

The temperature in the reactor should be sufficient to permit h reaction between the polyisocyanate and the polyamine to occur. The temperature should also be sufficient to permit conveying of the materials through the reactor, and any subsequent processing equipment such as, for example, feed locks and deis. For conveying al, the reacted material, temperature should preferably be in the range of bout 140 to 250° C., more preferably in the range of about 160 to 220° C. Residence time in the reactor typically varies from about 5 seconds to 8 minutes, more typically from about 15 seconds to 3 minutes.

The residence time depends on several parameters, including, for example, the length to diameter ratio of the reactor, mixing rates, overall flowrates, reactants, and the need to blend in additional materials. For materials involving reaction with minimal or no blending of a nonreactive component, the reaction can easily take place in as little as 5:1 length to diameter units of a twin screw extruder.

When a wiped surface reactor is used, it preferably has relatively close clearances between the screw flight lands and the barrel, with this value typically lying 0.1 to about 2 mm. The screws utilized are preferably fully or partially intermeshing or fully or partially wiped in the zones where a substantial portion of the reaction takes place.

Because of the rapid reaction which occurs between the polyamine and the polyisocyanate, both reactants are preferably fed into an extruder at unvarying rates, particularly when using higher molecular weight polyamines, i.e., with molecular weights of about 50,000 and higher. Such feeding generally reduces undesirable variability of the final product.

One method of ensuring the continuous feeding into the extruder when a very low flow polyisocyanate stream isused is to allow the polyisocyanate feed line to touch or very nearly touch the passing threads of the screws. Another method would be to utilize a continuous spray injection device which produces a continuous stream of fine droplets of the polyisocyanates into the reactor.

Typically, in formulating polydiorganosiloxane polyurea segmented block copolymers with additives such as tackifying resins, inorganic fillers, or other materials essentially non-reactive with the polydiorganosiloxane polyurea segmented copolymer reactants, the additives to be blended are added further downstream in the reactor after a substantial portion of the reaction of the polyamine and polyisocyanate has taken place.

The silicate resin which is blended with the polydiorganosiloxane polyurea segmented block copolymer and the optional inorganic fillers, or other materials which are essentially non-reactive with the polydiorganosiloxane polyurea segmented copolymer reactants, can also be added further downstream in the reactor after a substantial portion of the reaction of the polyamine and polyisocyanate has taken place. Another suitable order of addition is introduction of the polyamine first, the silicate resin and the other materials second, and the polyisocyanate third, with the polyisocyanate fed in a continuous manner. If the silicate resin and other additives can be conveyed in the reactor, it can be added into the reactor first with the polyamine and polyisocyanate following separately at later stages in the process. Various streams can also be blended together before addition, such as blending in small amounts of fumed silica with the polyamine.

However, the various reactants and additives can be added in any order provided the addition of an additive does not interfere with the reaction of the reactants. An additive that is particularly reactive with a polyisocyanate reactant typically would not be added until after the reaction of the polyisocyanate with a polyamine reactant. Further, the reactants can be added simultaneously or sequentially into the reactor and in any sequential order, for example, the polyisocyanate stream can be the first component added into the reactor in a manner such as mentioned above. Polyamine can then be added downstream in the reactor. Alternately, the polyisocyanate stream can also be added after the polyamine has been introduced into the reactor.

The process of the present invention has several advantages over conventional solution polymerization processes for making polydiorganosiloxane polyurea segmented copolymers such as (1) the ability to vary the isocyanate to amine ratio to obtain materials with properties superior to solution polymerized materials, (2) the capability of polymerizing high molecular weight compositions that cannot be easily produced using solution polymerization, (3) the ability to directly produce shaped articles with reduced heat histories, (4) the ability to directly blend in fillers, tackifying resins, plasticizers, and other property modifiers, and (5) the elimination of solvent.

The flexibility of altering the isocyanate to amine ratio in the continuous process is a distinct advantage. This ratio can be varied above and below the theoretical value of 1:1 quite easily. In solution, ratios much above about 1.05:1 and below 0.95:1 yield lower molecular weight copolymers. In the process of the present invention, polydiorganosiloxane polyurea segmented copolymers with ratios up to as high as 1.3:1, depending upon the titrated number average molecular weight of the polydiorganosiloxane diamine, can be produced. Such polymers possess inherent viscosities well above those made with conventional solution processes but can still be melt processed. These polymers can also possess superior mechanical properties when compared to solution polymerized copolymers. At some ratios, resultant polymers can become insoluble, precluding the possibility of inherent viscosity determination, but the material can be melt processable and can also possess high strength.

The ability to make high molecular weight compositions that cannot be produced by solution polymerization due to the insolubility of the forming polymer in the solvent medium, leads to useful, unique compositions. When the chain extension of the polyamine is carried out in solution with certain polyisocyanates such as polycarbodiimide-modified diphenylmethane diisocyanate, available, for example, from Dow Chemical Co. as ISONATE™ 143L, newly forming polymer may precipitate out of solution, thus not enabling the formation of high molecular weight copolymer. When this composition is prepared using the solventless method of the present invention, high strength solvent resistant materials are formed. In a similar manner, materials made from a mixture of two widely dissimilar molecular weights of polyamine polymerized with a polyisocyanate using the solventless process of the present invention can be made with high inherent viscosities.

In general, long exposure to heat degrades polydiorganosiloxane polyurea segmented copolymers and leads to a degradation of physical properties. The degradation experienced by many of the solution polymerized polydiorganosiloxane polyurea segmented copolymers upon drying and subsequent hot melt extrusion is also overcome by the continuous process of the present invention because reactively extruded polydiorganosiloxane polyurea segmented copolymers can be extruded directly from the polymerization zone through a die to form shaped articles such as tubing and films without the additional heat history associated with solvent removal and the subsequent polymer reheating.

The ability to eliminate the presence of solvent during the reaction of polyamine and polyisocyanate yields a much more efficient reaction. The average residence time using the process of the present invention is typically 10 to 1000 times shorter than that required in solution polymerization. A small amount of non-reactive solvent can be added, if necessary, for example, from about 0.5% up to about 5% of the total composition, in this process either as a carrier for injecting otherwise solid materials or in order to increase stability of an otherwise low flowrate stream of material into the reaction chamber.

While the continuous solventless process for making the compositions of the material has many advantages over the solvent process, there may be some situations where the solvent process is preferred or where a combination of the two is preferred. In the latter case, polydiorganosiloxane urea segmented copolymer could be made by the continuous process and subsequently mixed in solvent with the silicate resin, optional polydiorganosiloxane urea oligomer, and optional filler components.

The compositions of the present invention, depending on specific formulation can be used to make pressure-sensitive adhesive tapes, pressure-sensitive adhesive transfer tapes, pressure sensitive spray adhesives, pressure-sensitive adhesive medical tapes, including for example transdermal drug delivering devices, or pressure-sensitive adhesive coatings directly onto desired articles.

Pressure-sensitive adhesive articles are made by applying the pressure-sensitive adhesive by well known hot melt or solvent coating process. Any suitable substrates that can by used, including, but not limited to, for example, cloth and fiber-glass cloth, metalized films and foils, polymeric films, nonwovens, paper and polymer coated paper, and foam backings. Polymer films include, but are not limited by, polyolefins such as polypropylene, polyethylene, low density polyethylene, linear low density polyethylene and high density polyethylene; polyesters such as polyethylene terephthalate; polycarbonates; cellulose acetates; polyimides such as KAPTON™. Nonwovens, generally made from randomly oriented fibers, include, but are not limited by, nylon, polypropylene, ethylene-vinyl acetate copolymer, polyurethane, rayon and the like. Foam backings include, but are not limited by acrylic, silicone, polyurethane, polyethylene, neoprene rubber, and polypropylene, and may be filled or unfilled. Backings that are layered, such as polyethylene-aluminum membrane composites, are also suitable.

In the case of pressure-sensitive tapes, these materials are typically applied by first making a tape construction which comprises a layer of the pressure-sensitive adhesive material coated on a backing. The exposed surface of the PSA coating may be subsequently applied to a surface from which it could be released later or directly to the desired substrate.

A transfer tape can be made by coating the composition between two liners both of which are coated with a release coating. The release liners often comprise a clear polymeric material such as polyolefin or polyester that is transparent to ultraviolet radiation. Preferably, each release liner is first coated with a release material for the pressure-sensitive adhesive utilized in the invention.

The compositions of the present invention are also useful in medical applications including transdermal drug delivery devices. Transdermal drug delivery devices are designed to deliver a therapeutically effective amount of drug through or to the skin of a patient. Transdermal drug delivery provides significant advantages; unlike injection, it is noninvasive, unlike oral administration, it avoids hepatic first pass metabolism, it minimizes gastrointestinal effects, and it provides stable blood levels.

A variety of transdermal drug delivery devices has been described. Devices known to the art include matrix devices in which the drug is placed within a nonadhesive polymeric material; reservoir devices in which the drug is placed in a liquid and delivered to the skin through a rate controlling membrane; drug-in-adhesive devices in which the drug is placed within an adhesive polymer; and more complex multilaminate devices involving several distinct layers, e.g. layers for containing drug, for containing excipients, for controlling the rate of release of the drug and excipients, and for attaching the device to the skin.

All of the devices incorporate a drug formulation, an adhesive to maintain contact with the patient's skin, a release liner that protects the device during storage and is removed prior to the application of the device to the skin, and a backing that protects the device from external factors while in use.

Figure 2:
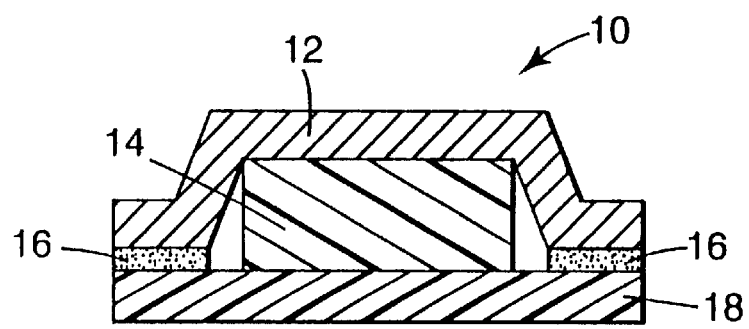
FIG. 2 is a cross-sectional view of a transdermal matrix device of the present invention.

A matrix device is shown in FIG. 2. Device 10 comprises a backing 12, a matrix 14 containing the drug and optionally excipients, a concentric adhesive layer 16 surrounding the matrix 14, and a release liner 18.

Figure 3:
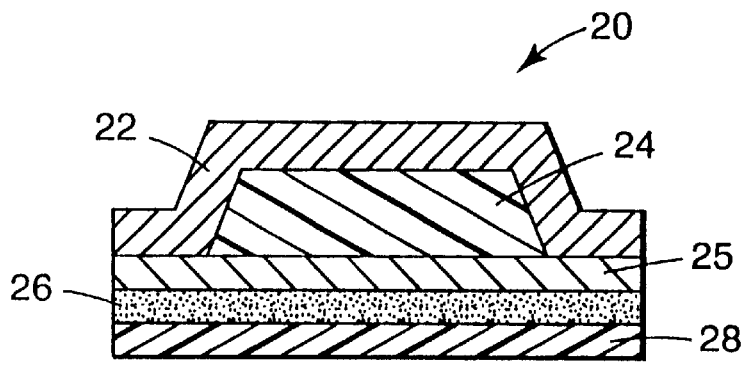
FIG. 3 is a cross-sectional view of a transdermal reservoir device of the present invention.

A reservoir device is shown in FIG. 3. Device 20 comprises a backing 22, a liquid formulation 24 containing the drug and optionally excipients, a membrane 25 for controlling the rate at which the drug and excipients are delivered to the skin, an adhesive layer 26, and a release liner 28. The adhesive layer may also be present as a concentric ring as depicted in connection with the matrix device (FIG. 2).

Figure 4:
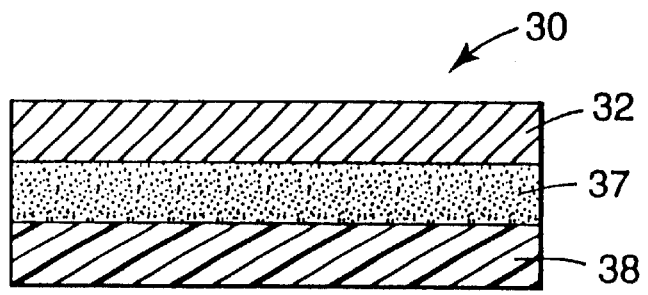
FIG. 4 is a cross-sectional view of a transdermal drug-in-adhesive device of the present invention.

A drug-in-adhesive device is shown in FIG. 4. Device 30 comprises a backing 32, an adhesive layer 37 containing drug and optionally excipients, and a release liner 38.

Figure 5:
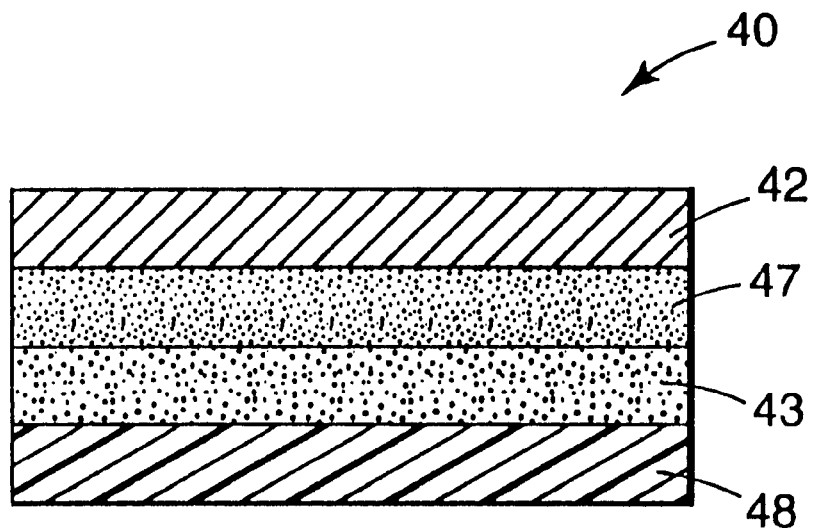
FIG. 5 is a cross-sectional view of a transdermal multilaminate device of the present invention.

A multilaminate device is shown in FIG. 5. Device 40 comprises a backing 42, an adhesive layer 47 containing drug and optionally excipients, a second adhesive layer 43 that controls the rate at which the drug and excipients are delivered to the skin, and a release liner 48.

Figure 6:
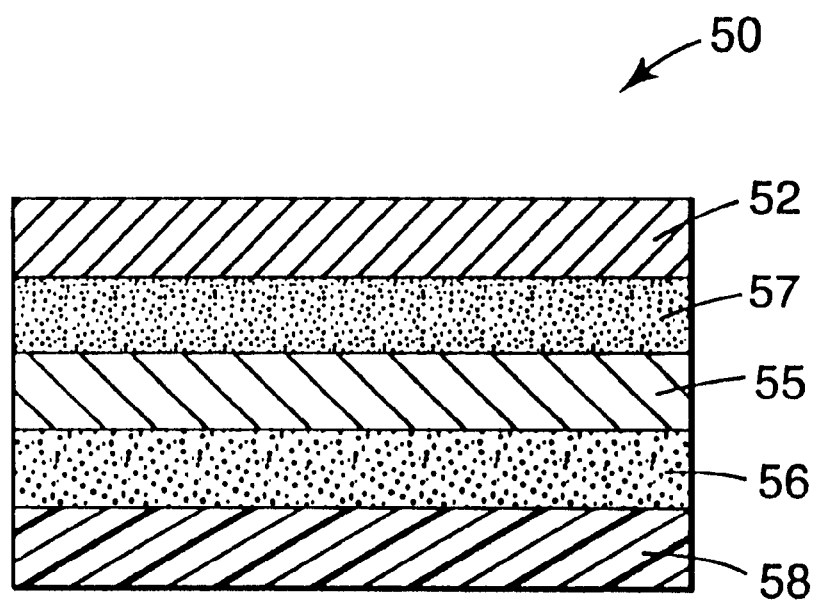
FIG. 6 is a cross-sectional view of an alternative embodiment of a transdermal multilaminate device of the present invention.

A second embodiment of a multilaminate device is shown in FIG. 6. Device 50 comprises a backing 52, an adhesive layer 57 containing drug and optionally excipients, a membrane 5, a second adhesive layer 56, and a release line 58. The membrane may be selected to control the rate at which the drug and excipients are delivered to the skin or to provide physical stability to the device.

Skin adhesion is a critical requirement of any transdermal drug delivery system. Because drug delivery is directly proportional to the skin contact area, the device must establish and maintain sufficient skin adhesion until it is removed. Adhesives that are used in skin contacting layers will preferably exhibit the following properties: good initial skin adhesion, i.e. tack; adequate adhesion during the wear period; clean release from the skin; and skin compatibility (nonirritating and nonsensitizing). It is important that these properties be maintained when the adhesive is exposed to the particular drug and excipients being used in a given device.

Adhesives used in layers that either contain drug and excipients or through which drug and excipients pass must also be compatible with the drug and excipients. Preferably the adhesives will not react chemically with the drug or excipients. In many instances, it is also preferable that the drug be dissolved in the adhesive rather than dispersed in it. It will often be desirable or even necessary to customize the adhesive for a particular drug/excipient combination.

The transdermal delivery devices can be made in the form of an article such as a tape, a patch, a sheet, a dressing or any other form known to those skilled in the art. Generally the device will be in the form of a patch of a size suitable to deliver a preselected amount of the drug. Suitable release liners include those enumerated above in connection with the preparation of PSA tapes.

The composition of the present invention are also useful for adhering pavement marking sheet materials and pavement markers to pavement surfaces such as concrete and asphalt. Pavement marking sheet materials generally comprise a top layer, a composite laminate layer, and an adhesive layer or layers for adherence to pavement. The materials for the top layer and the adhesive should be selected such that they bond strongly enough together to resist delamination under conditions to which the pavement marking is exposed. The top layer is typically a flexible polymeric layer which is preferably durable and wear resistant. Illustrative examples of materials from which top layers may be made include but are not limited to polyvinyls, polyurethanes, epoxy resins, polyamines, polyureas, and polyesters. Mixtures of such materials may also be used. Suitable polymeric materials may be either thermoplastic or thermosetting polymers.

Generally, the top layer also comprises a plurality of retroreflective particles and/or skid resistant particles embedded in the top layer with some particles protruding from the top surface. A base sheet may optionally be applied to the lower surface of the top layer to impart desired conformability and strength. The base sheet may contain particulate fillers to reduce cost and modify properties such as surface hardness or flexibility. Pigments may optionally be added to the top layer or the base sheet to impart desired coloration.

The pavement marking sheet materials generally have a layer of rubber resin adhesive applied to the lower surface for adherence to pavement. In the present invention, the polydiorganosiloxane polyurea segmented copolymer-based pressure-sensitive adhesive may be applied directly to the lower surface of the top layer if no base layer is present or it may be applied to the lower surface of the base layer, if present. Further, the adhesive can be advantageously applied to the lower surface of the rubber resin pressure-sensitive adhesive.

The polydiorganosiloxane polyurea segmented copolymer is preferably applied as a 100% solids hot-melt coatable composition and may be applied by various methods including knife coating or extrusion coating. Alternatively, the pressure-sensitive adhesive of the invention is formed as an adhesive layer between release coated liners, i.e., a transfer tape, one release coated liner is removed and the adhesive is adhered to the top layer, base layer or rubber resin pressure-sensitive adhesive of the pavement marking material as appropriate. The other release liner, now on the lower surface of the pavement marking material may then be removed before application to a pavement surface.

The pavement marking sheet materials of the present invention possess excellent adhesion to various pavement surfaces, stable peel force values over time, and excellent performance over broad temperature ranges and under high moisture conditions.

The composition of the present invention may also be used in pressure-sensitive adhesives that readily attach to prepared and unprepared surfaces, especially metals, providing a highly conformable, continuous interfacial silicone coating that prevents ingress of environmental contaminants that corrosively attack unprotected surfaces. The invention addresses a market need for a protective coating which can be applied outside of controlled laboratory or factory conditions. The coating will adhere to cold, wet or rusty metal as well as to existing protective coatings such as epoxy, polyethylene and polypropylene on oil and gas pipelines. A non-exhaustive list of applications includes: permanent repair of coating defects or holidays; coating of pipe ends which have been stripped for joining; protection of parts which must be bare before in field assembly; a removable means of preventing flash rust of bare metal before further processing; and as a protective adhesive between adjacent coated or uncoated steel parts, as in a rebar mat.

A pressure sensitive adhesive patch typically consists of a protective silicones pressure sensitive adhesive and optionally a barrier or edge adhesive, layers of conformable barrier or backing materials, or combinations of these materials. For some applications it is preferable that the backing does not shield electric field lines, making an open structure backing more preferable to solid films of, for example, polyethylene or PVC. A tapered or profiled adhesive layer to better match surface topology may be preferred when patching some surfaces.

The composition of the present invention may also be used as pressure-sensitive adhesives or hot melt adhesives for heat shrink tubes. These constructions provide a single article that can withstand the high temperatures experienced during the heat shrink operation and provide an environmental seal after cooling. The rheology, heat stability, tack, and clarity of these materials make them especially suitable for this application.

The compositions of the invention can also be coated onto a differential release liner, i.e., a release liner having a first release coating on one side of the liner and a second release coating coated on the opposite side. The two release coatings preferably have different release values. For example, one release coating may have a release value of 5 grams/cm (that is, 5 grams of force is needed to remove a strip of material 1 cm wide from the coating) while the second release coating may have a release value of 15 grams/cm. The material can be coated over the release liner coating having the higher release value. The resulting tape can be wound into a roll. As the tape is unwound, the pressure-sensitive adhesive adheres to the release coating with the higher release value. After the tape is applied to a substrate, the release liner can be removed to expose an adhesive surface for further use.

Useful release liners that can be used in the above constructions include those that are suitable for use with silicone adhesives. One example is the polyfluoropolyether coated liner described in European Patent Publication No. 433070. Other useful release liner release coating compositions are described in European Patent Publication No. 378420, U.S. Pat. No. 4,889,753, and European Patent Publication No. 311262. Commercially available liners and compositions include Dow Corning SYL-OFF™ Q2-7785 fluorosilicone release coating, available from Dow Corning Corp., Midland, Mich., X-70-029NS fluorosilicone release coatings available from Shin-Etsu Silicones of America, Inc., Torrance, Calif.; S TAKE-OFF™ 2402 fluorosilicone release liner from Release International, Bedford Park, Ill. and the like.

Hot melt adhesives are compositions that can be used to bond nonadhering surfaces together into a composite. During application to a surbstrate, hot melt adhesives should be sufficiently fluid to wet the surface completely and leave no voids, even if the surface is rough. Consequently, the adhesvie must be low in viscosity at the time of application. However, the bonding adhesive generally sets into a solid to develop sufficient cohesive strength to remain adhered to the substrate under stressful conditions.

For hot melt adhesives, the transition from fluid to solid may be accomplished in several ways. First, the hot melt adhesive may be a thermoplastic that softens and melts when heated and becomes hard again when cooled. Such heating results in sufficiently high fluidity to achieve successful wetting Alternatively, the hot melt adhesive may be dissolved in a solvent or carrier that lowers the viscosity of the adhesive sufficiently to permit satisfactory wetting and raises the adhesive viscosity when the solvent or carrier is removed. Such an adhesive can be heat activated, if necessary.

The compositions of the present invention may also be used: as vibration damping materials alone, that is, free layer treatment, or in conjunction with a stiff layer, that is, as part of a constrained-layer treatment. Vibration-damping materials are most efficiently used if they are sandwiched between the structure/device to be damped and a relatively stiff layer, such as thin-sheet metal. This forces the viscoelastic material to be deformed in shear as the panel vibrates, dissipating substantially more energy than when the material deforms in extension and compression, as occurs in a free layer treatment. Preferably, constrained-layer constructions consist of a laminate of one or more stiff layers and one or more layers of the vibration damping material.

Constrained-layer constructions can be prepared by several processes. In one process, a layer of the vibration damping material is coated onto a release liner by conventional solution coating or hot melt coating techniques known in the art. The layer of resulting viscoelastic material is transferred to a stiff backing and adhered thereto, thereby providing a constrained-layer construction. In another process, a layer of vibration damping material is coated directly onto a stiff backing by conventional solution coating or hot melt coating techniques known in the art. In each case, the constrained-layer construction is then affixed to the structure requiring damping. The construction may be attached in any manner provided that the constraining layer is only fixed to the vibrating structure via the viscoelastic material interface, i.e. free of mechanical attachment. When the structure subsequently vibrates under the influence of an internally or externally applied force, the vibration is-damped.

Another application of the vibration damping materials of the present invention is in a bidirectional damping unit such as described in Neilsen, E. J. et al, "Viscoelastic Damper Overview For Seismic and Wind Applications," Structural Engineering Association of California, Tahoe Olympiad, October, 1994. Bi-directional, or large displacement, damping is the transference of subsonic oscillations of a structure, such as a building, into the shear deformation of a viscoelastic material for the purpose of damping the oscillations of the structure. In this application, materials which have maximum vibration damping capability preferably have shear storage moduli, $G^1$, between about $6.9 \times 10^3$ Pa to $3.45 \times 10^7$ Pa, more preferably $3.45 \times 10^4$ Pa to $1.4 \times 10^7$ Pa, most preferably $3.45 \times 10^5$ Pa to $6.9 \times 10^6$ Pa at the use temperature, and have a tan δ as high as possible over the use temperature and frequency range. The materials also preferably have-an-elongation in tension of at least 100 percent or a shear strain capability of at least 100 percent within their use range of temperature and frequency.

When-the vibration damping material has pressure-sensitive adhesive properties, the material can usually be adhered to a stiff layer without the use of an additional bonding agent. However, it is sometimes necessary to use a thin layer, for example, 20–50 $\mu$m in thickness, of a high strength adhesive, such as, for example, an acrylic adhesive, an epoxy adhesive, or a silicone adhesive, all of which are well-known to those skilled in the art, to bond the vibration damping composition of the invention to a structure.

For most applications, the layer of vibration damping material has a thickness of at least 0.01 mm up to about 100 mm, more preferably 0.05 to 100 mm. The damping material can be applied by any of the techniques known in the art such as by spraying, dipping, knife, or curtain coating, or molding, laminating, casting, or extruding.

As mentioned above, a stiff layer is an essential part of constrained-layer vibration-damping constructions of the present invention. A suitable material for a stiff layer preferably has a stiffness of at least about 100 times the stiffness, i.e., storage modulus, of the vibration damping material, the stiffness of the stiff layer being measured in extension. The desired stiffness of the stiff layer can be varied by adjusting the thickness of this layer, for example, from about 25 micrometers to 5 centimeters, depending on the modulus of the stiff layer. Examples of suitable stiff materials for use in a constrained-layer construction include, for example, metals such as iron, steel, nickel, aluminum, chromium, cobalt, and copper, and alloysthereof and stiff polymeric materials such as polystyrene; polyester; polyvinyl chloride; polyurethane; polycarbonate; polyimide; and polyepoxide; fiber-reinforced plastics such as glass fiber-reinforced, ceramic fiber-reinforced, and metal fiber-reinforced polyester; glasses; and ceramics.

The vibration damping compositions of the present invention are useful in a variety of applications that demand effective damping over a broad range of temperature and frequency, with the additional requirement that minimum and/or maximum modulus requirements, over a specified range of temperatures, also be satisfied. It is often desirable that the region of maximum damping, that is, the point at which the loss factor is near a maximum occurs in the center of the desired damping temperature and frequency range. Designing the optimum damping material for a specific application requires understanding the effect the polydiorganosiloxane polyurea segmented copolymer, the silicate resin, optional polydiorganosiloxane oligourea segmented copolymer and filler, and concentration of each have on damping performance.

Compositions of the invention, dependent on specific formulation used, can be pressure-sensitive adhesive materials, heat activated adhesive vibration damping materials, and non adhesive materials. To employ non adhesive vibration damping materials requires the use of a bonding agent, i.e., a material to affix the damping material to either a constraining layer and/or a resonating structure depending on the particular use geometry desired.

In the case of vibration damping materials providing pressure-sensitive adhesive properties, these materials are typically applied by first making a tape construction which comprises a layer of the vibration damping material coated between two liners at least one of which is coated with a release material. A transfer tape can be made by coating the composition between two liners both of which are coated with a release coating. The release liners typically comprise polymeric material such as polyester, polyethylene, polyolefin and the like, or release coated paper or polyethylene coated paper. Preferably, each release liner is first coated or primed with a release material for the vibration damping materials utilized in the invention.

The vibration damping materials of the invention having pressure-sensitive adhesive qualities adhere well to polyesters, polycarbonates, polyolefins such as polyethylene and polypropylene, and TEFLON™ of which the latter two classes of materials are traditionally known to be difficult materials to bond.

The present invention is further illustrated by the following examples which are not intended to limit the scope of the invention. In the examples all parts and percentages are by weight unless otherwise indicated. All molecular weights reported are number average molecular weights in g/mol.

Titration of Polydiorganosiloxane and Organic Polyamines

The actual number average molecular weight of polydiorganosiloxane or organic polyamines were determined by the following acid titration. Sufficient diamine to yield about 1 milliequivalent of amine is dissolved in 50/50 tetrahydrofuran/isopropyl alcohol to form a 10% solution. This solution is titrated with 0.1N hydrochloric acid with bromophenyl blue as an indicator to determine number average molecular weight. However, when the diamines were polydiorganosiloxane diamines, the molecular weights of these diamines were dependent on the exact ratio of the reactants used in the diamine synthesis and the extent of stripping cyclic siloxanes. Remaining cyclics are diluents which increase the apparent molecular weight of polydiorganosiloxane diamine.

Preparation of Polydiorganosiloxane Diamines

Polydimethylsiloxane Diamine A

A mixture of 4.32 parts bis(3-aminopropyl)tetramethyl disiloxane and 95.68 parts octamethylcyclotetrasiloxane was placed in a batch reactor and purged with nitrogen for 20 minutes. The mixture was then heated in the reactor to 150° C. Catalyst, 100 ppm of 50% aqueous cesium hydroxide, was added and heating continued for 6 hours until the bis(3-aminopropyl) tetramethyl disiloxane had been consumed. The reaction mixture was cooled to 90° C. neutralized with excess acetic acid in the presence of some triethylamine, and heated under high vacuum to remove cyclic siloxanes over a period of at least five hours. The material was cooled to ambient temperature, filtered to remove any cesium acetate which had formed, and titrated with 1.0N hydrochloric acid to determine number average molecular weight. Four lots were prepared. The molecular weights of Polydimethylsiloxane Diamine A were Lot 1: 5280, Lot 2: 5330, Lot 3: 5570, and Lot 4:5260.

Polydimethylsiloxane Diamine B

Polydimethylsiloxane diamine was prepared as described for Polydimethylsiloxane Diamine A except 2.16 parts bis (3-aminopropyl)tetramethyl disiloxane and 97.84 parts octamethylcyclotetrasiloxane were used. Two lots were prepared. The molecular weights of Polydimethylsiloxane Diamine B were Lot 1: 10,700 and Lot 2: 10,700.

Polydimethylsiloxane Diamine C

A mixture of 21.75 parts Polydimethylsiloxane Diamine A and 78.25 parts octamethylcyclotetrasiloxane was placed in a batch reactor, purged with nitrogen for 20 minutes and then heated in the reactor to 150° C. Catalyst, 100 ppm of 50% aqueous cesium hydroxide, was added and heating continued for 3 hours until equilibrium concentration of cyclic siloxanes was observed by gas chromatography. The reaction mixture was cooled to 90° C., neutralized with excess acetic acid in the presence of some triethylamine, and heated under high vacuum to remove cyclic siloxanes over a period of at least 5 hours. The material was cooled to ambient temperature, filtered, and titrated with 1.0N hydrochloric acid to determine number average molecular weight. Three lots were prepared. The molecular weights of Polydimethylsiloxane Diamine C were Lot 1: 22,300, Lot 2: 22,000, and Lot 3: 19,000.

Polydimethylsiloxane Diamine D

Polydimethylsiloxane diamine was prepared as described for Polydimethylsiloxane Diarnine C except 12.43 parts Polydiorganosiloxane Diamine A and 87.57 parts octamethylcyclotetrasiloxane were used. Three lots were prepared. The molecular weights of Polydimethylsiloxane Diamine D were Lot 1: 37,800, Lot 2: 35,700 and Lot 3: 34,800.

Polydimethylsiloxane Diamine E

Polydimethylsiloxane diamine was prepared as described for Polydimethylsiloxane Diamine C except that 8.7 parts Polydimethylsiloxane Diamine A and 91.3 parts octamethylcyclotetrasiloxane were used. Three lots were prepared. The molecular weights of Polydimethylsiloxane Diamine E were Lot 1: 58,700, Lot 2: 52,900, and Lot 3: 50,200.

Polydimethylsiloxane Diamine F

Polydimethylsiloxane diamine was prepared as described for Polydimethylsiloxane Diamine C except that 5.8 parts Polydimethylsiloxane Diamine A and 94.2 parts octamethylcyclotetrasiloxane were used. The molecular weight of Polydimethylsiloxane Diamine F was 71,000.

Polydimethylsiloxane Diamine G

Polydimethylsiloxane diamine was prepared as described for Polydimethylsiloxane Diamine C except that 4.35 parts Polydimethylsiloxane Diamine A and 95.65 parts octamethylcyclotetrasiloxane were used. The molecular weight of Polydimethylsiloxane Diamine G was 105,000.

Polydimethylsiloxane Diamine H

Polydimethylsiloxane diamine was prepared by placing in a batch reactor under nitrogen purge and with stirring 1.98 parts bis(3-aminopropyl)tetramethyldisiloxane and 9.88 parts octamethylcyclotetrasiloxane. The mixture was heated to 91° C. and a trace (about 0.15 parts) of 3-aminopropyldimethyltetramethylammonium silanolate catalyst was added. To the resultant mixture was added dropwise over a 5 hour period 88.0 parts octamethylcyclotetrasiloxane. The reaction mixture was maintained at 91° C. for an additional 7 hours and was then heated to 149° C. for 30 minutes to decompose the catalyst. The product was then stripped at 91° C. and 2700 N/M² (2700 Pa) for about 120 minutes to remove volatile materials. The molecular weight of the resulting Polydimethylsiloxane Diamine H was 9970.

Polydiphenyldimethylsiloxane Diamine I

To a 3-necked round bottom flask fit with mechanical stirrer, static nitrogen atmosphere, oil heating bath, thermometer, and reflux condenser, were added 75. I parts octamethylcyclotetrasiloxane, 22.43 parts octaphenylcyclotetrasiloxane, and 2.48 parts bis(3-aminopropyl)tetramethyldisiloxane. Under static nitrogen atmosphere, the reactants were heated to 150° C. and degassed under aspirator vacuum for 30 seconds before restoring static nitrogen atmosphere. A charge of 0.02 parts cesium hydroxide solution (50% aqueous) was added to the flask and heating continued for 16 hours at 150° C. The flask was cooled to ambient temperature and then 2 mL triethylamine and 0.38 mL acetic acid were added. With good agitation flask was placed under a vacuum of 100 N/m2 (100 Pa), heated to 150° C., and maintained at 15° C. foe 5 hours to remove volatile materials. After 5 hours heat was removed and contents cooled to ambient temperature. The molecular weight of Polydiphenyldimethyl siloxane Diamine I was 9620.

Polydimethylsiloxane Diamine J

Polydimethylsiloxane diamine was prepared by placing in a batch reactor under nitrogen purge and with stirring 4.42 parts bis(3-aminopropyl)tetra-methyldisiloxane and 22.25 parts octamethylcyclotetrasiloxane. The mixture was heated to 91° C. and a trace (about 0.03 parts) of 3-aminopropyldimethyl-tetramethylamrnonium silanolate catalyst was added. To the resultant mixture was added dropwise over a 5 hour period 73.30 parts octamethylcyclotetrasiloxane. The reaction mixture was maintained at 91° C. for an additional 7 hours and was then heated to 149° C. for 30 minutes to decompose the catalyst. The product was then stripped at 91° C. and 2700 N/m²(2660 Pa) for about 120 minutes to remove volatile materials. The molecular weight of Polydimethylsiloxane Diamine I was 4930.

Preparation of Polydiorganosiloxane Polyurea Segmented Copolymers

The following polydiorganosiloxane polyurea segmented copolymers were prepared either by a solvent based process or by a solventless process as described below. All polyisocyanates were used as received and the polyisocyanate-:polyamine ratios were calculated using the polyisocyanate molecular weight reported by the polyisocyanate supplier and the polydiorganosilicone diamine molecular weight as determined by acid titration.

Polydimethylsilaxane Polyurea Segmented Copolymer A

Methylenedicyclohexylene-4,4'-diisocyanate was fed at a rate of 1.20 g/min (0.00458 mol/min) into the sixth zone of a Leistritz 18 mm diameter twin screw extruder under nitrogen atmosphere and Polydimethylsiloxane Diamine X-22-161 A, Lot 112052 (from Shin-Etsu Silicones of America, Inc., Torrance, Calif.), molecular weight of 1620, was injected at a rate of 7.7 g/min (0.00475 mol/min) into the seventh zone. The feed line of the methylenedicyclohexylene-4,4'-diisocyanate was placed close enough to the screw that each passing of the screw threads took a small amount of diisocyanate into the screw, resulting in a complete wetting of the screw forward of this addition point and dry screws behind this point. The extruder was used in co-rotating mode with double-start fully intermeshing screws throughout the entire length of the barrel, rotating at 150 revolutions per minute. The temperature profile for each of the 90 mm long zones was: zones 1 through 5—40° C.; zone 6—60° C.; zone 7—100° C.; zone 8—154° C.; and endcap—170° C. The resultant polydimethylsiloxane polyurea segmented copolymer which had an inherent viscosity of 0.19 dL/g was extruded into a strand, cooled in air, and collected.

Polydimethylsiloxane Polyurea Segmented Copolymer B

Polydimethylsiloxane Diamine C, Lot 1, molecular weight 22,300, was injected at a rate of 25.9 g/min (0.00118 mol/min) into the fifth zone of a Leistritz 34 min diameter 8 zone counter-rotating twin screw extruder and methylenedicyclohexylene-4,4'-diisocyanate was added at a rate of 0.335 g/min (0.00128 mol/min) into the sixth zone with the feed line brushing the screws. The screws were fully intermeshing screws rotating at 47 revolutions per minute. The temperature profile for each of the 120 mm long zones was: zones 1 through 4—25° C.; zone 5—50° C.; zone 6—75° C.; zone 7—120° C.; zone 8—150° C.; and endcap—180° C. The resultant polydimethylsiloxane polyurea segmented copolymer was extruded into a strand, cooled in air, and collected.

Polydimethylsiloxane Polyurea Segmented Copolymer C

Polydimethylsiloxane Diamine D, Lot 1, molecular weight 37,800, was injected at a rate of 22.5 g/min (0.000595 mol/min) into the second zone of a Leistritz 34 mm diameter counter-rotating twin screw extruder and methylenedicyclohexylene-4,4'-diisocyanate was fed at a rate of 0.206 g/min (0.000786 mol/min) into the eighth zone of the extruder. The screws were fully intermeshing double start 12 mm pitch elements rotating at 50 revolutions per minute. The temperature profile for each of the 120 mm long zones was: zone 1—30° C.; zone 2—50° C.; zone 3—80° C.; zone 4—130° C.; zone 5—160° C.; zone 6—170° C; and zones 6 through 10 and endcap—180° C. The resultant polydimethylsiloxane polyurea segmented copolymer was extruded into a strand, cooled in air, and collected.

Polydimethylsiloxane Polyurea Segmented Copolymer D

Polydimethylsiloxane Polyurea Segmented Copolymer D was prepared as Polydimethylsiloxane Polyurea Segmented Copolymer B, except Polydimethylsiloxane Diamine G, molecular weight 105,000, was used in place of Polydimethylsiloxane Diarine C and was fed at a rate of 13.6 g/min (0.000130 mol/min), methylenedicyclohexylene-4,4'-disocyanate was fed at a rate of 0.033 g/min (0.000126 mol/min), and the screw speed was 25 revolutions per minute. The resultant polydimethylsiloxane polyurea segmented copolymer which had an inherent viscosity of 2.51 dL/g was extruded into a strand, cooled in air, and collected.

Polydimethylsiloxane Polyurea Segmented Elastomer E 3-isocyanatomethyl-3,5,5-trimethylcyclohexyl isocyanate was fed at a rate of 0.338 g/min (0.00152 mol/min) into the first zone of a Leistritz 18 mm diameter twin screw extruder under nitrogen atmosphere with the feed line brushing the screws and Polydimethylsiloxane Diamine A, Lot 2, molecular weight 5330, was injected at a rate of 8.0 g/min (0.00150 mol/min) into the second zone. The extruder was used in co-rotating mode with double-start fully intermeshing screws throughout the entire length of the barrel, rotating at 100 revolutions per minute. 20 mm long sections of kneading blocks were placed in zones 3, 4, and 5. The temperature profile for each of the 90 mm long zones was: zone 1—30° C.; zone 2—75° C.; zone 3—120° C.; zone 4—130° C. zone 5—140° C.; zone 6—150° C.; zone 7—155° C.; zone 8—170° C.; and encap—170° C. The resultant polydimethylsiloxane polyurea segmented copolymer which had an inherent viscosity of 1.89 dL/g was extruded into a strand, cooled in air, and collected.

Polydimethylsiloxane Polyurea Segmented Copolymer F

Polydimethylsiloxane Diamine A, Lot 1, molecular weight 5280, was fed at a rate of 227 g/min (0.0430 mol/min) into zone seven of a Berstorff 40 mm diameter co-rotating twin screw extruder and methylenedicyclohexylene-4,4'-diisocyanate and was fed at a rate of 11.26 g/min (0.0430 mol/min) into zone eight. Double-start fully intermeshing screws were used throughout the entire length of the barrel, rotating at 20 revolutions per minute. The temperature profile for each of the 160 mm long zones was: zone 1—20° C.; zones 2 through 6—50° C.; zones 7 and 8—55° C.; zone 115° C.; zone 10—152° C.; endcap and melt pump—180° C. The resultant polydimethylsiloxane polyurea segmented copolymer was extruded into a strand, cooled in a water bath, pelletized, and collected.

Polydimethylsiloxane Polyurea Segmented Copolymer G

Polydimethylsiloxane Diarine A, Lot 2, molecular weight 5330, was injected at a rate of 76.1 g/min (0.0143 mol/min)

into zone two of a Berstorff 40 mm diameter co-rotating twin screw extruder and tetramethyl-m-xylylene diisocyanate was fed at a rate of 3.97 g/min (0.0163 mol/min) into zone 8 of with the feed line brushing the screws. Double-start fully intermeshing screws were used throughout the entire length of the barrel, rotating at 100 revolutions per minute. The temperature profile for each of the 160 mm long zones was: zone 1—27° C.; zones 2 through 8—60° C.; zone 9—120° C.; zone 10—175° C.; and endcap—180° C. The resultant polydimethylsiloxane polyurea segmented copolymer which had an inherent viscosity of 0.46 dL/g was extruded into a strand, cooled in a water bath, pelletized, and collected.

Polydimethylsiloxane Polyurea Segmented Copolymer H

Polydimethylsiloxane Polyurea Segmented Copolymer H was prepared as Polydiorganosiloxane Polyurea Segmented Copolymer E, except a blend of 50 parts by weight of methylenedicyclohexylene-4,4'-diisocyanate and 50 parts by weight of tetramethyl-m-xylylene diisocyanate was substituted for the 3-isocyanatomethyl-3,5,5-trimethylcyclohexyl isocyanate and fed at a rate of 0.425 g/min (0.00168 mol/min) into zone six, Polydimethylsiloxane Diamine J, molecular weight 4930, was substituted for the Polydimethylsiloxane Diamine A and fed at a rate of 7.8 g/min (0.00158 mol/min) into zone seven, kneading blocks were not placed in zones 3, 4, and 5, and the temperature profile for each of the 90 mm long zones was: zones 1 through 5-temperatures not controlled; zone 6—55° C.; zone 7—85° C.; zone 8—150° C.; and endcap—180° C. The resultant polydimethylsiloxane polyurea segmented copolymer which had an inherent viscosity of 0.51 dL/g was extruded into a strand, cooled in air, and collected.

Polydimethylsiloxane Polyurea Segmented Copolymer I

A blend of 450 parts Polydimethylsiloxane Diamine A, Lot 1, molecular weight 5280, 511 parts Polydimethylsiloxane Diamine B, Lot 1, molecular weight 10,700, 450 parts Polydimethylsiloxane Diamine C, Lot 2, molecular weight 22,000, 450 parts Polydimethylsiloxane Diarnine D, Lot 2, molecular weight 35,700, 450 parts Polydimethylsiloxane Diamine E, Lot 1, molecular weight 58,700, 462 parts Polydimethylsiloxane Diamine F, molecular weight 71,000, and 454 parts Polydimethylsiloxane Diamine G, molecular weight 105,000, with a calculated average molecular weight of 17,500 was fed at a rate of 7.93 g/min (0.000453 mol/min) into the back of the third zone (open port) of a Leistritz 18 mm diameter twin screw extruder and methylenedicyclohexylene-4,4'-dijsocyanate was fed at a rate of 0.118 g/min (0.000450 mol/min) into the forward portion of the third zone. The extruder was used in co-rotating mode with double-start fully intermeshing screws throughout the entire length of the barrel, rotating at 50 revolutions per minute. The temperature profile for each of the 90 mm long zones was: zones 1 through 3—30° C.; zone 4—45° C.; zone—95° C.; zone 6—120° C.; zone 7—160° C.; and zone 8 and The resultant polydimethylsiloxane polyurea segmented copolymer which had an inherent viscosity of 1.26 dL/g was extruded into a strand, cooled in air, and collected.

Polydimethylsiloxane Polyurea Segmented Copolymer J

To a 3-necked round bottom flask fitted with static nitrogen atmosphere and mechanical stirrer was added 30 parts Polydimethylsiloxane Diamine D Lot 1, molecular weight 37,800. The flask contents were heated with a heat gun to 65–70° C. and placed under aspirator vacuum for 2 minutes to degas. Vacuum was released and the flask cooled to ambient temperature under static nitrogen atmosphere. At ambient temperature, 170 parts toluene was added with agitation followed by 0.212 parts methylenedicyclohexylene-4,4'-diisocyanate. The flask remained stirring for 3 days to complete the preparation. This provided a polydimethylsiloxane polyurea segmented copolymer solution at approximately 15 weight percent solids.

Polydimethyldiphenylsiloxane Polyurea Segmented Copolymer K

To a 3-necked round bottom flask fitted with oil heating bath, static nitrogen atmosphere, thermometer, and mechanical stirrer was added 50 parts Polydiphenyldimethylsiloxane Diamine I having a molecular weight of 9620 and 154.3 parts isopropanol. At ambient temperature, 1.42 parts methylenedicyclohexylene-4,4'-diisocyanate was added to the stirred flask and allowed to react for 20 minutes before the flask was heated to 70° C. and maintained at that temperature for 2 hours to allow completion of the reaction. This provided a clear, viscous polydiphenyldimethylsiloxane polyurea segmented copolymer solution at approximately 25 weight percent solids.

Preparation of Polydiorganosiloxane Monoamines

The following polydiorganosiloxane monoarnines were prepared for various examples according to the procedures of U.S. Pat. No. 5,091,483, which is incorporated herein by reference. The terminating agent used in preparing the monoamines was prepared according to Example 6 of U.S. Pat. No. 5,091,483. The actual number average molecular weight of the different lots was determined using the acid titration as described with regard to the polydiorganosiloxane and organic polyamines.

Aminopropyidimethylfluorosilane Terminating Agent

To a 3 L 3-necked round bottom flask were added 279.6 gl, 3-bis(3-aminopropyl)tetramethyldisiloxane, 177.6 g ammonium fluoride, and about 2 L cyclohexane. This mixture was azeotroped with water until clear and then stripped under vacuum While heating under reflux, water was removed using a Dean-Stark trap. The clear, colorless solution was transferred while warm to a 3 L 1-neck round bottom flask. The solvent was removed on a rotary evaporator to provide 990 grams of white solid. The solid was dissolved in 2 L methylene chloride, 193.2 grams of hexamethyl disiloxane was added, and the mixture was stirred and heated under reflux for 16 hours. The solvent was removed under aspirator vacuum. The product was distilled (boiling point of 70° C.) under aspirator vacuum to provide 3-aminopropyldimethylfluorosilane as a clear, colorless oil. The yield was 293.0 g (100%), which was determined to be pure by vapor phase chromatography. The structure was confirmed by NMR spectroscopy.

Polydimethylsiloxane Monoamine A

To 1.6 parts by weight of 2.5 Mn-butyl lithium were added 7.4 parts by weight of octamethylcyclotetrasiloxane which had been purged with argon and the mixture was then stirred for 30 minutes. 500 ppm of 50% hexamethylcyclotrisiloxane in dry tetrahydrofuran was added and the reaction mixture stirred at room temperature for 18 hours until polymerization was complete. To the resulting viscous syrup was added 3.4 parts by weight (1 molar part) 3-aminopropyldimethyl fluorosilane terminating agent. The viscosity rapidly decreased. After stirring for 2 hours, the solvent was distilled off using a rotary evaporator. The product was filtered to remove lithium fluoride and provided polydimethylsiloxane monoamine as a clear, colorless oil. Titration with 1.0 N HCl gave a number average molecular weight of 9830.

Polydimethylsiloxane Monoamine B

To 1.6 parts by weight of 2.5 Mn-butyl lithium were added 7.4 parts by weight of octamethylcyclotetrasiloxane which had been purged with argon and and the mixture was then stirred for 30 minutes; 750 ppm of 50% hexamethylcyclotrisiloxane in dry tetrahydrofuran was added and the reaction mixture stirred at room temperature for 18 hours until polymerization was complete. To the resulting viscous syrup was added 3.4 parts by weight (1 molar part) 3-aminopropyldimethyl fluorosilane terminating agent. The viscosity rapidly decreased. After stirring for 2 hours, the solvent was distilled off on a rotary evaporator. The product was filtered to remove lithium fluoride and provided polydimethylsiloxane monoamine as a clear, colorless oil. Titration with 1.0 N HCl gave a number average molecular weight of 14,760.

Preparation of Polydiorganosiloxane Oligourea Segmented Copolymers

The following polydiorganosiloxane oligourea segmented copolymers were prepared as described below.

Polydimethylsiloxane Oligourea Segmented Copolymer A

To a 250 mL round bottom flask fitted with mechanical stirrer and static nitrogen atmosphere were added 25 g Polydimethylsiloxane Monoamine A, molecular weight 9830. While stirring, the contents of the flask were heated under aspirator vacuum to 65–70° C., and after degassing for 2 minutes were cooled to ambient conditions under static nitrogen atmosphere before adding 50 mL toluene and stirring until uniform. A solution containing 0.33 g methylenedicyclohexylene-4,4'-diisocyanate and 20 mL toluene was added dropwise over a period of 1 minute to the stirred flask, and stirring continued for 24 hours. The solution of polydimethylsiloxane oligourea segmented copolymer containing about 30% solids was packaged in a glass bottle.

Polydimethylsiloxane Oligourea Segmented Copolymer B

To a 250 mL round bottom flask fitted with mechanical stirrer and static nitrogen atmosphere were added 25 g Polydimethylsiloxane Monoamine B, molecular weight 9830. While stirring, the contents of the flask were heated under aspirator vacuum to 65–70° C., and after degassing for 2 minutes were cooled to ambient conditions under static nitrogen atmosphere before adding 35 mL toluene and stirring until uniform. A solution containing 0.22 g methylenedicyclohexylene-4,4'-diisocyanate and 10 mL toluene was added dropwise over a period of 1 minute to the stirred flask. Stirring continued for 24 hours. The solution of polydimethylsiloxane oligourea segmented copolymer containing about 40% solids was packaged in a glass bottle.

Polydimethylsiloxane Oligourea Segmented Copolymer C

To a 250 mL round bottom flask fitted with mechanical stirrer and static nitrogen atmosphere was added 16.7 g Polydimethylsiloxane Monoamine A, molecular weight 9830, and 8.3 g Polydimethylsiloxane Diamine B, Lot 2, molecular weight 10,700. With mechanical agitation the contents of the flask were heated under aspirator vacuum to 65–70° C., and after degassing for 2 minutes were cooled to ambient conditions under static nitrogen atmosphere before adding 50 mL toluene and stirring until uniform. A solution containing 0.44 g methylenedicyclohexylene-4,4'-diisocyanate and 20 mL toluene was added dropwise over a period of 1 minute to the stirred flask, and stirring continued for 24 hr before the solution of polydimethylsiloxane oligourea segmented copolymer at about 30% solids was packaged in a glass bottle.

Test Methods

The following test methods were used to characterize the polydiorganosiloxane polyurea segmented copolymer based compositions produced in the following examples.

180° Peel Adhesion

Polydiorganosiloxane polyurea segmented copolymer based pressure-sensitive adhesive coatings on polyester film were covered with a release liner and cut into 12.7 mm (0.5 inch) by 15 cm (6 inch) strips. The release liner was removed and the strip adhered to a 10 cm (4 inch) by 20 cm (8 inch) clean, solvent washed glass coupon using a 2 kg (4½ pound) roller passed twice over the strip. The bonded assembly dwelled at room temperature for about twenty minutes and was tested for 180° peel adhesion using an I-Mass peel tester at a separation rate of 30.5 cm/minute (12 inches/minute) over a 10 second data collection time. Two samples were tested; the reported adhesion value is an average of the two samples. Preferably, the pressure-sensitive adhesive tapes have an 180° peel adhesion of at least about 5.5 N/dm (5 oz/inch), more preferably at least about 21.8 N/dm (20 oz/inch).

Shear Strength

Polydiorganosiloxane polyurea segmented copolymer based pressure-sensitive adhesive coatings on polyester film were covered with a release liner and cut into 12.7 mm (0.5 inch) by 15 cm (6 inch) strips. The release liner was removed and the strip adhered to a stainless steel panel such that a 12.7 mm by 12.7 mm portion of each strip was in firm contact with the panel and one end portion of the tape being free. The panel with coated strip attached was held in a rack such that the panel formed an angle of 178° with the extended tape free end which was tensioned by application of a force of one kilogram applied as a hanging weight from the free end of the coated strip. The 2° less than 180° was used to negate any peel forces, thus ensuring that only shear forces were measured, in an attempt to more accurately determine the holding power of the tape being tested. The time elapsed for each tape example to separate from the test panel was recorded as the shear strength. Unless otherwise noted, all shear failures reported herein were cohesive failures of the adhesive.

Accelerated Shear Creep

Samples were prepared as for the Shear Strength test except a 500 gram weight and aluminum panels were used, the contact area was 12.7 mm by 25.4 mm, and the rack was in a forced air oven at 70° C. If the sample was still attached to the aluminum panel after 10,000 minutes, the distance that the sample slid on the aluminum plate was measured and recorded as the shear creep.

Gel Permeation Chromatography

The number average molecular weight of each polydimethylsiloxane polyurea segmented copolymer was determined via gel permeation chromatography with an HP 1090 Chromatograph, an HP 1047A Refractive Index Detector, and an HP Diode Array Ultraviolet Detector set at 254 nanometers prior to addition of tackifying resin. The copolymer was dissolved in tetrahydrofuran at 0.5%, filtered with a 0.2 mm Teflon filter, and 50 microliters were injected into two columns in series, a Jordi Association Mixed Bed Column and a Waters 100A. The elution rate was 1.0 milliliter per minute. The molecular weight given was based on polystyrene standards obtained from Pressure Chemical Company, Pittsburgh, Pa.

Inherent viscosity

Inherent viscosities were measured at 30° C. using a Canon-Fenske viscometer (Model No. 50 P296) with chloroform solutions at 30° C. at concentrations of between 0.18 and 0.26 g/dL. Inherent viscosities of the materials of the invention were found to be essentially independent of concentration in the range of 0.1 to 0.4 g/dL.

Moisture Vapor Transport Rate (MVTR)

The Moisture Vapor Transmission Rate—Upright (MvTR$_{up}$) was measured on samples using a modified ASTM E 96–80. A sample assembly was made by first laminating a thirty-five millimeter diameter sample of a 0.025 cm thick film of the adhesive to a 0.0275 cm thick polyurethane web having a MVTR$_{up}$ of 2000 to 2400 g/m$^2$/24 hours measured at 40° C. and a relative humidity differential of 80 percent. Then the laminated sample was sandwiched between the adhesive surfaces of two axially aligned foil adhesive rings having 2.54 cm diameter holes. The sample was pulled to ensure a flat, wrinkle-free and void-free foil/sample/foil laminate. Next a four-ounce (0.14 liters) glass jar was filled with distilled water. The jar was fitted with a screw-on cap having a 3.8 cm diameter hole concentrically aligned with a rubber washer having a 4.445 cm outside diameter and a 2.84 cm inside diameter. The foil/sample/foil laminate was concentrically positioned on the rubber washer and the sample-containing sub-assembly was screwed loosely onto the jar.

The sample in the assembly was then tested. The assembly equilibrated by being placed into a chamber maintained at a temperature of 40° C. and 20 percent relative humidity. After four hours, the assembly was then removed from the chamber and weighed to the nearest 0.01 gram (W$_1$), the cap was screwed tightly onto the jar without bulging the sample, and the assembly was immediately returned to the chamber for 18 more hours. The assemble was then removed and weighed to the nearest 0.01 gram (W$_2$).

The MVTR$_{up}$ of the laminated sample (measured in grams of water transmitted per square meter of sample area over a twenty-four hour period) was then calculated according to the formula set forth below:

$$MVTR_{up} = (W_1 - W_2)(4.74 \times 10^4)/t$$

where:
  W$_1$ is the initial weight of the assembly (grams),
  W$_2$ is the final weight of the assembly (grams), and
  t is the time period between W$_1$ and W$_2$ (hrs).

Three samples of each adhesive were run and the average of the three samples reported.

The Moisture Vapor Transmission Rate—Inverted (MVTR$_{invt}$) was measured in the same manner as MVTR$_{up}$ except that the assembly was inverted inside the chamber once the cap was tightly screwed onto the jar so that the water directly contacted the foil/sample/foil laminate while the assembly was within the chamber.

Skin Adhesion Test

Skin adhesion testing was carried out by placing tape samples 2.5 cm wide by 5 cm long on the back of a human subject. Each tape was rolled down with one forward and one reverse pass using a 2 Kg roller moved at a rate of about 30 cm/min. Adhesion to the skin was measured as the peel force required to remove the tape at 180° angle at a 15 cm/min rate of removal. Adhesion was measured immediately after initial application (T$_o$) and after 24 hours (T$_{24}$). Preferred skin adhesives generally exhibit a T$_o$ of between about 50 to 100 grams (1.9 to 3.8 N/dm) and a T$_{24}$ of between about 150 to 300 grams (5.8 to 11.5 N/dm). Results of 9 tests were averaged to yield the reported value.

Skin Adhesion Lift Test

When the 24 hour skin adhesion test was performed, the tape sample was examined for the amount of area that was lifted (released) from the skin prior to removal of the tape and ratings were given as:
  0 no visible lift
  1 lift only at edges of tape
  2 lift over 1% to 25% of test area
  3 lift over 25% to 50% of test area
  4 lift over 50% to 75% of test area
  5 lift over 75% to 100% of test area Results of 9 tests were averaged to yield the reported value. Preferred skin adhesives will generally exhibit an average rating below about 2.5

Skin Adhesive Residue Test

When the 24 hour skin adhesion test was performed, the skin underlying the tape sample was visually inspected to determine the amount of adhesive residue on the skin surface and was rated as:
  0 no visible residue
  1 residue only at edges of tape
  2 residue covering 1% to 25% of test area
  3 residue covering 25% to 50% of test area
  4 residue covering 50% to 75% of test area
  5 residue covering 75% to 100% of test area Results of 9 tests were averaged to yield the reported value. Preferred skin adhesives will generally exhibit an average rating below about 2.5.

Damping Properties (Storage modulus and Loss factor)

Samples were prepared at a thickness of about 750 μm using one of the following methods:
  1) coating a solution of vibration damping material, using a knife coater with orifice set between about 250 to 380 μ3 m, on 50 µm polyethylene terephthalate release liner and drying for 1 minute at 70° C. followed by 10 minutes at 175° C. and laminating several pieces of the resulting vibration damping layer together under pressure through a nip roller to obtain a sample of appropriate thickness, 2) casting a solution of the vibration damping material directly onto a release liner in the bottom of a shallow reservoir and allowing it to dry for at least 2 days at ambient condition to obtain a sample of appropriate thickness, or 3) by melt pressing a sample of the neat vibration damping material between parallel aluminum plates, lined with fluorosilicone coated 50 µm polyethylene terephthalate release liner, at 160° C. to obtain a sample of appropriate thickness.

The storage modulus, G', and the loss factor, tan δ, were determined using a Polymer Laboratories Dynamic Mechanical Thermal Analyzer (DMTA) Mark II and a technique of multiplexing frequency during a thermal scan, i. e., properties were measured while both frequency and temperature were changing. The temperature was varied from −100° C. to 200° C. at a rate of 2° C./minute continuous at a strain setting of 1. Measurements were reported at a frequency of 1.0 Hz and were taken at about 3° C. to 50° C. intervals and interpolated to obtain measurements at 10° C. intervals for reporting purposes.

In these examples, the storage modulus, G', utility window refers to the temperature range over which the storage modulus is between $3.45 \times 10^5$ Pa and $6.9 \times 10^6$ Pa. The loss factor, tan δ, utility window refers to the temperature range over which the loss factor is greater than or equal to 0.4. The useful temperature range refers to the temperature range over which storage modulus, G', is between $3.45 \times 10^5$ Pa and $6.9 \times 10^6$ Pa and the loss factor, tan δ, is greater than 0.4. When so indicated, melt flow means the sample exhibited melt flow at high temperature. Melt flow is generally undesirable for damping applications. Thus, materials that exhibit melt flow must be utilized below the melt flow temperature.

Heat Activated Adhesive Bonding Test

Polydiorganosiloxane polyurea segmented copolymers were tested as heat activated adhesives by creating overlap shear specimens, between two steel members, having an overlap area of about 1.61 cm² and pulling the overlap shear sample in an H-frame style Sintech testing machine at a cross head rate of 50.8 cm/min to assess adhesion. Samples were prepared for testing as follows. Steel members measuring 0.32 cm×1.27 cm×5.08 cm were cleaned by sandblasting. A 30 mil thick layer of polydiorganosiloxane polyurea segmented copolymer measuring about 1.3 cm per side, prepared using the methods described in the "Damping Properties" section, was placed at one end of a steel member and trimmed to create a bond area measuring 1.27 cm on each side. Bond thickness was controlled by placing two parallel strands of 12 mil diameter copper wire, oriented in the cross direction with respect to the long dimension of the steel, on the polydiorganosiloxane polyurea segmented copolymer about 0.2 cm from the edges of the adhesive. The bond was covered with a second piece of steel and held in place with a small spring steel binder clip. The overlap shear sample was placed in a forced air oven for 10 minutes at 180° C., removed, allowed to cool to ambient conditions in air, and tested as described above. The maximum stress at break is reported in MN/m².

Electrochemical Impedence Spectroscopy (EIS) Measurements

EIS measurements yield information on the level of corrosion protection provided by coatings over metal, providing a convenient method for studying pressure-sensitive adhesives in one aspect of the invention. Detailed information for this type of impedence measurement exists in an article by M. Kendig and J. Scully ("Corrosion", vol. 46, No. 1, pages 22–29 (1990)). Measurements were made according to ASTM -G 106 with a 3% NaCl in deionized water solution.

Corrosion Protection Dry Adhesion Test

Cold rolled steel panels were cleaned by abrading with steel grit followed by removal of excess grit. A pressure-sensitive adhesive tape was made by extrusion coating 0.2 mm of the pressure-sensitive adhesive onto a 0.1 mm thick polyester film. 30×1.9 cm strips of this construction were then placed against the steel, and two passes of a 2 kg roller effected uniform application of the strip to the steel. The laminate was then allowed to condition for one hour at room temperature. Peel testing was performed at an angle of 180° and a rate of 30.5 cm/min.

Corrosion Protection Wet Adhesion Test

After the steel grit abrasion, as described under Corrosion Protection Dry Adhesion Test, the steel test panel was subjected to three cycles of alternately soaking, then drying the steel to develop rust on the test surface. The pressure-sensitive adhesive tape was then applied to the surface of the plate through tap water, followed by two hours of conditioning, and finally peel testing.

Corrosion Protection Static Shear Test

Static shears were performed according to ASTM D3654–78, PSTC-7. Pressure-sensitive adhesive coatings were solution coated at 25 to 38 µm.

In the following examples, all polyisocyanates and organic polyamines were used as received and the isocyanate to amine ratios were calculated using the polyisocyanate molecular weight reported by the polyisocyanate supplier and the polydiorganosiloxane and organic polyamine molecular weights, wherein the molecular weights were determined by acid titration and/or reported by the supplier.

EXAMPLES

Examples 1–7

In Example 1, dried MQ tackifying resin containing 1.3% toluene, obtained from GE Silicone Products Division, Waterford, NY, as experimental material #1170-002, was fed into the first zone of a Leistritz 18 mm diameter twin screw extruder at a rate of 6.33 g/min. Polydimethylsiloxane Diamine A, Lot 1, molecular weight 5280, was fed into the back of the fourth zone of the extruder at a rate of 6.22 g/min (0.00118 mol/min). Methylenedicyclohexylene-4,4'-diisocyanate was fed into the forward portion of the fourth zone at a rate of 0.321 g/min (0.00123 mol/min). The feed line of the diisocyanate was placed sufficiently close to the screw such that each passing of the screw threads took a small amount of diisocyanate onto the screw. The extruder was used in co-rotating mode with double-start fully interneshing screws rotating at 75 revolutions per minute. The temperature profile for each of the 90 mm long zones was: zone 1—30° C.; zone 2—34° C.; zone 3—43° C.; zone 4—66° C.; zone 5—120° C.; zones 6 and 7—150° C.; zone 8—180° C.; and endcap—190° C. The resultant pressure-sensitive adhesive was extruded into a strand, cooled in air, and collected. The pressure-sensitive adhesive was later dissolved in toluene/isopropyl alcohol (50/50) to 30 percent solids, coated onto 38 μm (1.5 mil) thick polyethylene terephthalate film with a knife coater, and air dried.

In Example 2, a polydiorganosiloxane polyurea based pressure-sensitive adhesive was prepared as in Example 1 except that Polydimethylsiloxane Diarine B, Lot 1, molecular weight 10,700, was substituted for Polydimethylsiloxane Diarnine A and was fed at a rate of 6.22 g/min (0.000581 mol/min), the methylenedicyclohexylene-4,4'-iisocyanate was fed at a rate of 0.170 g/min (0.000649 mol/min), and the temperature profile was zone 1—30° C.; zone 2—32° C.; zone 3—38° C.; zone 4—56° C.; zone 5—100° C.; zone 6—140° C., and 7—150° C.; zone 8~180° C.; and endcap—190° C. The resultant adhesive was collected and solution coated as described in Example 1.

In Example 3, the polydiorganosiloxane polyurea based pressure-sensitive adhesive was prepared as in Example 2 except that Polydimethylsiloxane Diamine C, Lot 1, molecular weight 22,300, was used and was fed at a rate of 6.22 g/min (0.000279 mol/min), and the methylenedicyclohexylene-4,4'-diisocyanate was fed at a rate of 0.0850 g/min (0.000324 mol/min). The resultant pressure-sensitive adhesive was collected and solution coated as described in Example 1.

In Example 4, the 18 mm extruder used in Example 1 was used in counter-rotating mode. Polydimethylsiloxane Diamine F, molecular weight 71,000, was fed into the first zone of the extruder at a rate of 6.40 g/min (0.0000901 mol/min). Dried MQ tackifying resin, dried to about 1% toluene by evaporation of the toluene in SR-545 in trays at ambient temperature for four days, then further drying under vacuum at 55° C. for 16 hours, was fed into the second zone of the extruder at 6.4 g/min. Methylenedicyclohexylene-4, 4'-diisocyanate was fed into zone 6 of the extruder at 0.0225 g/min (0.0000859 mol/min). Screw rotation was 120 revolutions per minute. The temperature profile for each of the 90 mm long zones was: zone 1—30° C.; zones 2–5—500; zone 6—70° C.; zones 7–8 and endcap—145° C. The extrudate was cooled air and collected. The resulting polydiorganosiloxane polyurea based pressure-sensitive adhesive was collected and solution coated as described in Example 1.

In Example 5, dried MQ tackifing resin, spray dried to 1% toluene from SR-545 under nitrogen, was fed at a rate of 77.2 g/min into the first zone of a 10 zone Berstorff 40 mm diameter, 1600 mm length, co-rotating twin screw extruder fitted with fully self-wiping double-start screws. Polydimethylsiloxane Diamine H, molecular weight 9970, was injected at a rate of 75.5 g/min (0.00757 mol/min) into the second zone. Tetramethyl-m-xylylene diisocyanate was fed into zone 8 of this extruder at a rate of 2.01 g/min (0.00824 mol/min) with the feed line brushing the screws. The extruder screw speed was 100 revolutions per minute and the temperature profile for each of the 160 mm zones was: zone 1—27° C.; zones 2 through 8—60° C.; zone 9—120° C.; zone 10—175° C.; and endcap—180° C. The inherent viscosity of the polydimethylsiloxane oligourea segmented copolymer portion of the pressure-sensitive adhesive, collected before the MQ resin was added to the extruder, was 0.83 dL/g. The resultant pressure-sensitive adhesive was collected and solution coated as described in Example 1.

In Example 6, tetramethyl-m-xylylene diisocyanate was fed at a rate of 0.079 g/min (0.000324 mol/min) into the first zone of a Leistritz 34 mm diameter 1200 mm long counter-rotating extruder with the feed line lightly brushing the screw threads. The extruder was fitted with fully intermneshing double-start screws rotating at 125 revolutions per minute. Polydimethylsiloxane Diamine E, Lot 2, molecular weight 52,900, was injected into the second zone of the extruder at a rate of 17.0 g/min (0.000321 mol/min). MQ resin, dried as in Example 5, was fed at a rate of 16.9 g/min into the fifth zone of the extruder. The temperature profile was: zone 1—20° C.; zone 2—50° C.; zone 3—80° C.; zone 4—130° C.; zone 5—170° C.; zones 6 through 10 and endcap—180° C. The extrudate was cooled in air and collected. The resultant pressure-sensitive adhesive was collected and solution coated as described in Example 1.

In Example 7, dry MQ resin, dried as in Example 4 and Polydimethylsiloxane Diarnine C, Lot 2, molecular weight 22,000, were fed at a rate of 14.7 g/min (0.000668 mol/min) into the first zone of a Leistritz 34 mm diameter 1200 mm long counter-rotating twin screw extruder. 3-isocyanato-methyl-3,5,5-trimethylcyclohexyl isocyanate was fed at a rate of 0.182 g/min (0.000820 mol/min) into the fifth zone of the extruder with the feed line off of the screw threads. The double-start fully intermeshing screws rotated at 30 revolutions per minute. The temperature profile for each of the 120 mm zones was: zone 1—30° C.; zones 2 through 5—50° C.; zone 6—100° C.; zones 7 and 8—50° C.; zones 9 and 10—60° C.; and endcap—180° C.; Vaccum was pulled on zone 8. The resultant pressure-sensitive adhesive was collected and solution coated as described in Example 1.

Each of the pressure-sensitive adhesive tapes of Examples 1–7 had a thickness of about 0.025 mm (1 mil). Each tape was tested for 180° peel adhesion and shear strength. The results are set forth in Table 1

TABLE 1

| Example | 180° Peel Strength (N/dm) | Shear Strength (min) |
|---|---|---|
| 1 | 34 | >10,000 |
| 2 | 40 | >10,000 |
| 3 | 43 | 3200 (popoff) |
| 4 | 69 | 7270 |
| 5 | 50 | 10,000 |
| 6 | 39 | 8 |
| 7 | 48 | 1200 |

As can be seen from data in Table 1, increasing the molecular weight of the diamine in Examples 14 from 5280 to 10,000 to 22,300 to 71,000, respectively, and using methylenedicyclohexylene-4,4'-diisocyanate caused an increase in 180° peel strength and some reduction in shear strength. Examples 2 and 5 show that for diamines with similar molecular weight, substituting tetramethyl-m-xylylene diisocyanate for the methylenedicyclohexylene-4, 4'-diisocyanate caused an increase in 1800 peel strength. Increasing the molecular weight of the diamine in Examples 5 and 6 from 9970 to 52,900 and using tetramethyl-m-xylylene diisocyanate, peel values decreased somewhat and shear strength was reduced. Examples 3 and 7 demonstrate that for similar molecular weight diamines, substituting 3-isocyanatomethyl-3,5,5-trimethylcyclohexyl isocyanate for the methylenedicyclohexylene-4,4'-diisocyanate causes an increase in 180° peel strength.

Examples 8–12

In Example 8, SR-545 MQ was dried as in Example 5 and fed into the first zone of a Werner-Pfleiderer 1350 mm long, 30 mm diameter co-rotating twin screw extruder at a rate of 39.4 g/min. Polydimethylsiloxane Diamine D, Lot 2, molecular weight 3 h 5,700, was injected into the third zone of the extruder at a rate of 38.8 g/min (0.00109 mol/min). Methylenedicyclohexylene-4,4'-diisocyanate was fed at a rate of 0.290 g/min (0.00111 mol/min) with the diisocyanate feed line lightly brushing the screw threads. All screws were fully intermeshing double-start screws, and the rotational speed was 200 revolutions per minute. The temperature profile of each of the 90 mm zones was: zones 1 through 3—50° C.; zones 4 through 6—60° C.; zones 7 and 8—115° C.; zones 9 through 13—170° C.; zone 14—180° C.; and zone 15—151° C. Vacuum was pulled on zone 13. The resultant pressure-sensitive adhesive was extruded into a 3 mm diameter strand, cooled in a water bath, and collected. The pressure-sensitive adhesive was later hot melt coated with a 1.9 cm diameter (¾ inch) single screw extruder (Haake) rotating at 40 revolutions per minute. The temperature profile of the extruder was: zone 1—not controlled; zone 2—163 ° C.; and zone 3—188° C. Neck tube and die (12.7 cm wide ) temperatures were 210° C. The extrudate was cast between nip rolls with a 35.6 gm (1.4 mil) polyethylene terephthalate film on one roll and a release liner on the other.

In Example 9, dried SR-545 MQ resin, dried as in Example 5, in a manner similar to Example 7 was added at a rate of 13.0 g/min into the first zone of a Leistritz 34 mm diameter 1200 mm long counter-rotating extruder fitted with fully intermeshing double-start screws rotating at 250 revolutions per minute. Polydimethylsiloxane Diamine F, molecular weight 71,000, was injected into the second zone of the extruder at a rate of 13.2 g/min (0.000186 mol/min). Methylenedicyclohexylene-4,4'-diisocyanate was fed at a rate of 0.0550 g/min (0.000210 mol/min) into the eighth zone of the extruder with the feed line lightly brushing the screw threads. The temperature profile was: zone 1—60° C.; zone 2—50° C.; zones 3 through 7—60° C.; zone 8—95° C.; zone 9—120° C.; zone 10—160° C.; and endcap—190° C. The resulting adhesive was collected and hot melt coated as described in Example 8.

In Example 10, the polydiorganosiloxane polyurea based pressure-sensitive adhesive was prepared as in Example 9 except that the SR-545 MQ powder was fed in at a rate of 16.1 g/min.

In Example 11, the polydiorganosiloxane polyurea based pressure-sensitive adhesive was prepared as in Example 10 except that the dried SR-545 MQ resin was added at a rate of 14.4 g/min, Polydimethylsiloxane Diamine G, molecular weight 105,000, was injected at a rate of 14.1 g/min (0.000134 mol/min), the methylenedicyclohexylene-4,4'-diisocyanate was fed at a rate of 0.0440 g/min (0.000168 mol/min), and the temperature profile was: zone 1—40° C.; zone 2—59° C.; zone 3—53° C.; zone 4—61° C.; zone 5—57° C.; zone 6—54° C.; zones 7—66° C.; zone 8—95° C.; zone 9—20° C.; zone 10—60° C.; and endcap—90° C. The inherent viscosity of the polydimethylsiloxane oligourea segmented copolymer portion of the pressure-sensitive adhesive, collected before the MQ was added to the extruder, was 1.82 dL/g.

In Example 12, a homogeneous mixture of 25 percent Polydimethylsiloxane Diamine A, Lot 1, molecular weight 5,280, and 75 percent Polydimethylsiloxane Diamine E, Lot 1, molecular weight 58,700, was prepared. This diamine mixture was fed at a rate of 16.0 g/min (0.000962 mol/min) into the first zone of a Leistritz 34 mm diameter 1224 mm long counter-rotating extruder fitted with fully intermeshing double-start screws rotating at 50 revolutions per minute. SR-545 MQ resin dried in a manner similar to Example 4 was added into the second zone of the extruder at a rate of 15.7 g/min. Methylenedicyclo-hexylene-4,4'-diisocyanate was fed into the sixth zone of the extruder at a rate of 0.270 g/min (0.00103 mol/min) with the feed line lightly brushing the screw threads. The extruder temperatures were: zone 1—20° C.; zone 2—35° C.; zone 3—35° C.; zone 4—50° C.; zone 5—50°C.; zone 6—86° C.; zone 7—150° C.; zone 8—170° C.; zone 9—180° C.; zone 10—180° C.; and endcap—170° C. The resulting adhesive was collected and hot melt coated as described in Example 8.

Each of the hot melt coated pressure-sensitive adhesive tapes of Examples 8–12 was tested for 180° peel adhesion and shear strength. The adhesive thickness of the tapes was about 38 μm (1.5 mil) for Examples 8, 10 and 12 and about 50 μm (2 mils) for Examples 9 and 11. The results are set forth in Table 2.

TABLE 2

| Example | 180° Peel Strength (N/dm) | Shear Strength (min) |
|---|---|---|
| 8 | 38 | 3990 (popoff) |
| 9 | 38 | 6700 |
| 10 | 55 | >10,000 |
| 11 | 56 | >10,000 |
| 12 | 24 | >10,000 |

As can be seen from the data in Table 2, increasing diamine molecular weight from 35,700 in Example 8 to 105,000 in Example 11, using blends of two diamines with different molecular weights in Example 12, or varying the silicate tackifying resin concentration in Examples 9 and 10 all resulted in satisfactory 180° peel strength and shear strength.

Examples 13–17

In Example 13, a polydiorganosiloxane polyurea based pressure-sensitive adhesive was prepared as in Example 3 except that Polydimethylsiloxane Diamine E, Lot 1, molecular weight 58,700, was substituted for Diamine C at a rate of 14.7 g/min (0.000250 mol/min) and SR-545 MQ resin, dried as in Example 4, at a rate of 14.8 g/min, were fed into the first zone of the extruder. A solution of 18.0 parts methylenedicyclohexylene-4,4'-diisocyanate, 72.9 parts octamethylcyclo-tetrasiloxane, and 9.1 partstetrahydrofuran was fed into the seventh zone of the extruder such that the flowrate of the methylenedicyclohexylene-4,4'-diisocyanate was 0.063 g/min (0.00024 mol/min). The screw speed was 60 revolutions per minute, and the temperature profile was: zone 1—30° C.; zones 2 through 7—150° C.; zones 8 and 9—160° C.; and zone 10 and endcap—180° C. No vacuum was pulled on this sample. The resulting adhesive was collected and solvent coated as described in Example 1.

In Example 14, the polydiorganosiloxane polyurea based pressure-sensitive adhesive was prepared as in Example 13 except that a solution containing 18.5 parts 3-isocyanatomethyl-3,5,5-trimethylcyclohexyl isocyanate, 74.1 parts octamethylcyclotetrasiloxane and 7.4 partstetrahydrofuran was substituted for the methylenedicyclohexylene-4,4'-diisocyanate solution and fed into zone 7 at a rate of 0.054 grams diisocyanate/min (0.00024 mol/min) and the dried MQ resin was fed into the first zone, (dried MQ tackifying resin containing less than 0.1% toluene, obtained from GE Silicone Products Division, Waterford, N.Y.), and the temperature of zone 10 and the endcap were 180° C. The resulting adhesive was collected and solvent coated as described in Example 1.

In example 15, the polydiorganosiloxane polyurea based pressure-sensitive adhesive was prepared as in Example 14 except that SR-545 MQ resin, dried as in Example 4, was added at a rate of 17.4 g/min. The resulting adhesive was collected and solvent coated as described in Example 1.

In Example 16, the polydiorganosiloxane polyurea based pressure-sensitive adhesive prepared in Example 15 was dissolved, cast, and dried following the of Example 1 and subsequently exposed to electron-beam irradiation (0.75 MRad).

Example 17, a polydiorganosiloxane polyurea based pressure-sensitive adhesive was prepared as in Example 13 except that a solution containing 18.5 parts 3-isocianatomethyl-3,5,5-trimethylcyclohexyl isocyanate, 74.1 parts octamethylcyclotetrasiloxane, and 7.4 partstetrahydrofuran was substituted for the methylenedicyclohexylene-4,4'-diisocyanate solution and used at a rate of 0.054 grams diisocyanate/min (0.00024 mol/min) and the temperature profile in zone 10 and the endcap was 160° C. The resulting adhesive was collected and solvent coated as described in Example 1.

Each pressure-sensitive adhesive tape had an adhesive thickness of about 25 μm (1 mil) and was tested for 180° peel adhesion and shear strength. The results are set forth in Table 3.

TABLE 3

| Example | 180° Peel Strength (N/dm) | Shear Strength (min) |
| --- | --- | --- |
| 13 | 37 | 330 |
| 14 | 55 | 515 |
| 15 | 66 | 3310 |
| 16 | 60 | 10,000 |
| 17 | 58 | 2340 |

As can be seen from the data in Table 3, Examples 13–15 demonstrate that diluents can be used. Example 16 demonstrates that crosslinking the adhesive using electron beam radiation only slightly affects 180° peel adhesion while shear strength is improved.

Examples 18–21

In Example 18, methylenedicyclohexylene-4,4'-diisocyanate was fed at a rate of 0.59 g/min (0.0023 mol/min) into the back of the first zone of a Leistritz 34 mm diameter 1200 mm long counter-rotating twin screw extruder and Polydimethylsiloxane Diamine A, Lot 4, molecular weight 5,260, was added into the forward portion of zone 1 of the extruder at a rate of 10.9 g/min (0.00207 mol/min). The screws were fully intermeshing double start 12 mm pitch elements rotating at 150 revolutions per minute. The temperature profile for each of the 120 mm zones was: zone 1—30° C.; zone 2—150° C.; zone 3—160° C.; zones 4 through 10 and endcap—170° C. The resultant polydimethylsiloxane polyurea segmented copolymer product was cooled and collected. Subsequently, 6.0 g polydimethylsiloxane urea segmented copolymer, 14.7 g SR-545 MQ resin solution, 4.8 g toluene, and 4.5 g 2-propanol were introduced into a glass jar, agitated slowly to dissolve the copolymer and obtain a uniform composition, and then coated onto a 50 μm 2 mil) thick polyethylene terephthalate film using a knife coater and allowed to dry at ambient conditions for 15 minutes followed by 15 minutes at 70° C. in a forced air oven, to provide a pressure-sensitive adhesive coating thickness of 50 μm (2 mil). 180° peel adhesion was 30 N/dm.

In Example 19, polydimethylsiloxane polyurea segmented elastomer was prepared as in Example 18 except that the methylenedicyclohexylene-4,4'-disocyanate was fed at a rate of 0.26 g/min (0.00099 mol/min), Polydimethylsiloxane Diamine C, Lot 3, molecular weight 19,000, was fed at a rate of 18.1 g/min (0.000953 mol/min), the screw speed was 100 revolutions per minute, and the temperature profile was: zone 1—30° C.; zone 2—155° C.; zone 3—175° C.; zones 4 through 8—200° C., zone 9—220° C.; and zone 10 and endcap—200° C. A pressure-sensitive adhesive solution was prepared as in Example 18, except that the viscosity of the solution was adjusted by adding 7.5 g 70/30 toluene/2-propanol blend (by weight) to obtain a coatable viscosity. The solution was coated to produce the same dry coating thickness as Example 18. 180° peel adhesion was 58 N/dm.

In Example 20, methylenedicyclohexylene-4,4'-diisocyanate at 0.0715 g/min (0.000273 mol/min) and Polydimethylsiloxane Diamine D, Lot 1, 37,800 molecular weight, at 7.96 g/min (0.000211 mol/min), were fed into the first zone of a Leistritz 18 mm twin screw extruder. The extruder was used in co-rotating mode with double-start fully intermeshing screws throughout the entire length of the barrel, rotating at 100 revolutions per minute. The temperature profile for each of the 90 mm zones was: zone 1—30° C.; zone 2—77° C.; zone 3—120 ° C.; zone 4—130° C.; zone 5—140° C.; zone 6—155° C.; zone 7—165° C.; zone 8—175° C.; and endcap—180° C. A pressure-sensitive adhesive solution was prepared as in Example 18, except that an additional 45 g 70/30 toluene/2-propanol mixture (by weight) was added to obtain a coatable viscosity. The solution was coated to produce the same dry coating thickness as Example 18. 180° peel adhesion was 72 N/dm.

In Example 21, the polydimethylsiloxane polyurea segmented copolymer was prepared as in Example 18 except that the methylenedicyclohexylene-4,4'-diisocyanate was fed at a rate of 0.060 g/min (0.00023 mol/min), the Polydimethylsiloxane Diamine E, Lot 1, molecular weight 58,700,was fed at a rate of 13.1 g/min (0.000223 mol/min), and the screw speed was 50 revolutions per minute. 66.7 g of a pressure-sensitive adhesive solution composed of 150 parts of the polydimethylsiloxane urea segmented copolymer and 600 parts of 70/30 toluene/2-propanol (by weight) and 32.5 g SR-545 MQ resin solution were introduced into an 8 oz glass jar and agitated slowly to dissolve the copolymer and obtain a uniform composition. A coating was prepared as in Example 18. 180° peel adhesion was 97 N/dm.

The pressure-sensitive adhesive tapes prepared in Examples 18–21 illustrate that reactively extruded polydimethylsiloxane polyurea segmented copolymers derived from polydimethylsiloxanes of a variety of molecular weights ranging from about 5,000 to 60,000 provide pressure-sensitive adhesives when tackified with MQ resin in solution. As the molecular weight of the diamine used increases, the 180° peel adhesion also increases.

Example 22

In Example 22, methylenedicyclohexylene 4,4'-diisocyanate was fed into the first zone of a Leistritz 18 mm co-rotating twin screw extruder at a rate of 0.190 g/min (0.000725 mol/min) under nitrogen atmosphere and a homogeneous blend of 25.0 percent by weight Diamine A, Lot 3, 5,570 molecular weight, and 75.0 percent by weight Diamine E, Lot 3, 50,200 molecular weight, mixed one day in advance of the reaction and having a calculated number average molecular weight of 16,700, was injected into the second zone at a rate of 11.3 g/min (0.000677 mol/min). The extruder had double-start fully intermeshing screws throughout the entire length of the barrel, rotating at 100 revolutions per minute. The temperature profile for each of the 90 mm zones was: zone 1—30° C.; zone 2—75° C.; zone 3—20° C.; zone 4—30° C.; zone S—140° C.; zone 6—150° C.; zone 7—155° C.; zone 8—170° C.; and endcap—170° C. Sixteen grams of the polydimethylsiloxane polyurea segmented copolymer, 25.9 g of SR-545 MQ resin solution, and 33 g of 70/30 toluene/2-propanol were introduced into a glass jar and slowly stirred overnight to dissolve the copolymer and provide a uniform solution. A coating was prepared as in Example 18. 180° peel adhesion was 97 N/dm. The composition prepared in this example illustrates that reactively extruded polydimethylsiloxane polyurea segmented copolymers derived from a blend of polydimethylsiloxanes diamines of two different molecular weights provide a pressure-sensitive adhesive when tackified with MQ resin in solution.

Examples 23–29

In Example 23, Polydimethylsiloxane Diamine D, Lot 1, 37,800 molecular weight, was fed at a rate of 22.5 g/min (0.000595 mol/min) into zone 2 of a Leistritz 34 mm diameter 1224 mm long counter-rotating extruder and methylenedicyclohexylene-4,4'-diisocyanate was added at a rate of 0.206 g/min (0.000786 mol/min) into zone eight with the feed line lightly brushing the screws. The extruder was fitted with fully intermeshing double-start screws rotating at 50 revolutions per minute. The temperature profile was: zone 1—30° C.; zone 2—50° C.; zone 3—80° C.; zone 4—130° C.; zone 5—160° C.; zone 6—170° C.; and zones 7 through 10 and endcap—180° C. The polydimethylsiloxane polyurea segmented copolymer product was cooled and collected. Then 150 g of polydimethylsiloxane urea segmented copolymer and 600 g toluene/2-propanol (70/30 by weight) were agitated slowly in a glass jar to form a polydimethylsiloxane polyurea segmented copolymer solution. Then, 81.3 g copolymer solution, 14.2 g SR-545 MQ resin solution, and 4.6 g toluene/2-propanol (70/30 by weight) were mixed to obtain a homogeneous solution. Coatings were made as in Example 18. Peel adhesion and accelerated shear creep results are set forth in Table 4.

In Example 24, a polydimethylsiloxane polyurea segmented copolymer based pressure-sensitive adhesive was made as in Example 23, except 75.0 g of the copolymer solution of Example 23 was added to 16.2 g SR-545 solution and 8.2 g toluene/2-propanol. The sample was coated as in Example 23. Results are set forth in Table 4.

In Example 25, a polydimethylsiloxane polyurea segmented copolymer based pressure-sensitive adhesive was made as in Example 23, except 68.7 g of the copolymer solution of Example 23 was added to 18.2 g SR-545 solution and 13.0 g toluene/2-propanol. The sample was coated as in Example 23. Results are set forth in Table 4.

In Example 26, a polydimethylsiloxane polyurea segmented copolymer based pressure-sensitive adhesive was made as in Example 23, except 62.5 g of the copolymer solution of Example 23 was added to 20.2 g SR-545 solution and 17.3 g toluene/2-propanol. The sample was coated as in Example 23. Results are set forth in Table 4.

In Example 27, a polydimethylsiloxane polyurea segmented copolymer based pressure-sensitive adhesive was made as in Example 23, except 56.3 g of the copolymer solution of Example 23 was added to 22.3 g SR-545 solution and 21.5 g toluene/2-propanol. The sample was coated as in Example 23. Results are set forth in Table 4.

In Example 28, a polydimethylsiloxane polyurea segmented copolymer based pressure-sensitive adhesive was made as in Example 23, except 50.0 g of the copolymer solution of Example 23 was added to 24.3 g SR-545 solution and 25.7 g toluene/2-propanol. The sample was coated as in Example 23. Results are set forth in Table 4.

In Example 29, a polydimethylsiloxane polyurea segmented copolymer based pressure-sensitive adhesive was made as in Example 23, except 43.8 g of the copolymer solution of Example 23 was added to 26.3 g SR-545 solution and 30.0 g toluene/2-propanol. The sample was coated as in Example 23. Results are set forth in Table 4.

TABLE 4

| Example | % MQ Resin | Peel Adhesion (N/dm) | Shear Creep (mm) |
| --- | --- | --- | --- |
| 23 | 35 | 6.2 | 0.5 |
| 24 | 40 | 15 | 0.5 |
| 25 | 45 | 30 | 1.0 |
| 26 | 50 | 40 | 1.0 |
| 27 | 55 | 50 | 1.3 |
| 28 | 60 | 44 | 2.0 |
| 29 | 65 | 39 | 2.1 |

The compositions prepared in Examples 23–29 illustrate that a wide range of MQ resin concentrations effectively tackify reactively extruded polydimethylsiloxane polyurea segmented copolymer to provide polydimethylsiloxane polyurea segmented copolymer based pressure-sensitive adhesives. As the amount of MQ tackifying resin increased to 55 weight percent, the 180° peel values increased. The shear creep increased with increasing amounts of MQ resin.

Examples 30–31

In Example 30, Polydimethylsiloxane Diamine C, Lot 1, 22,300 molecular weight, was injected at a rate of 25.9 g/min (0.00116 mol/min) into zone of a Leistritz 34 mm 8 zone counter-rotating fully internshing twin screw extruder and methylenedicyclohexylene-4,4'-diisocyanate was added into open zone 6 at a rate of 0.335 g/min (0.00128 mol/min) with the feed line brushing the screws. The temperature profile for each of the 160 mm long zones was: zone 4—25° C.; zone—50° C.; zone 6—75° C.; zone 7—120° C.; zone 8—150° C.; and endcap—180° C. The screw speed was 45 revolutions per minute. 50.0 g of the polydimethylsiloxane polyurea segmented copolymer, 79.0 g SR-545 solution, and 193.5 g toluene/2-propanol (70/30 by weight) was introduced into a glass jar and agitated slowly to obtain a homogeneous solution. A coating was prepared as in Example 18. The 180° peel adhesion was 41 N/dm.

In Example 31, polydimethylsiloxane polyurea segmented copolymer was prepared as in Example 30 except that the Polydimethylsiloxane Diamine C, Lot 1, molecular weight 22,300, was fed at a rate of 25.4 g/min (0.00114 mol/min), and the tetramethyl-m-xylene diisocyanate was fed at a rate of 0.306 g/min (0.00125 mol/min). Then 48.0 g of polydimethylsiloxane polyurea segmented copolymer, 78.2 g SR-545 solution, 186.3 g toluene/2-propanol (70/30 by weight) were added to a glass jar and agitated slowly to obtain a homogeneous solution. A coating was prepared as in Example 18. The 180° peel adhesion was 45 N/dm.

The compositions of Examples 30 and 31 demonstrate that a variety of diisocyanates may be employed in preparing polydimethylsiloxane polyurea segmented copolymers via reactive extrusion for use in polydimethylsiloxane polyurea segmented copolymer based pressure-sensitive adhesive compositions. Also the MQ resin can be added to the polydimethylsiloxane polyurea segmented copolymer subsequent to the polymerization of the copolymer.

Examples 32—34

In Example 32, 75 g of the polydimethylsiloxane polyurea segmented copolymer solution of Example 200 was mixed with 26.7 g MQR-32-1 (an MQD tackifying resin having 2 weight percent dimethylsiloxane units supplied at 70 weight percent solids in toluene, available from Shin-Etsu Silicones of America, Inc., Torrance Calif.) to form an homogeneous solution. This solution was coated as in Example 18 to form a pressure-sensitive adhesive tape with 55% MQD resin. The 180° peel adhesion was 79 N/dm.

In Example 33, a pressure-sensitive adhesive was prepared as in Example 32 except 26.1 g MQR-32-2 (an MQD tackifying resin having 5 weight percent dimethylsiloxane units supplied at 70 weight percent solids in toluene, available from Shin-Etsu Silicones of America, Inc., Torrance Calif.) was substituted for the MQR-32-1 to form an homogeneous solution. This solution was coated as in Example 18 to form a pressure-sensitive adhesive tape with 55% MQD resin. The 180° peel adhesion was 74 N/dm.

In Example 34, a pressure-sensitive adhesive was prepared as in Example 32 except 26.1 g MQR-32-3 (an MQD tackifying resin having 8 weight percent dimethylsiloxane units supplied at 70 weight percent solids in toluene, available from Shin-Etsu Silicones of America, Inc., Torrance Calif.) was substituted for the MQR-32-1 to form an homogeneous solution. This solution was coated as in Example 18 to form a pressure-sensitive adhesive tape with 55% MQD resin. The 180° peel adhesion was 61 N/dm.

Examples 32–34 illustrate that reactively extruded polydimethylsiloxane polyurea segmented copolymerstackified with various MQD resins provide polydimethylsiloxane polyurea segmented copolymer based pressure-sensitive adhesives. Increasing amounts of the dimethylsiloxane units in the MQD resin reduced the 180° peel adhesion, although each of the adhesives of Examples 32–34 exhibited good 180° peel adhesion.

Examples 35–37

In Example 35, 40.5 g SR-545 MQ tackifying resin solution and 36.4 g MQR-32-1 MQD tackifying resin solution were mixed to form a resin solution. 33.3 g of this resin solution and 58.3 g of the polydimethylsiloxane polyurea segmented copolymer solution of Example 20 were then mixed to form a homogeneous solution. The pressure-sensitive adhesive solution was coated as in Example 18 to form a pressure-sensitive adhesive tape that was applied to a polypropylene coupon, 3 mm thick, 5.1 cm wide and 12.7 cm long, which had been washed 3 times with 2-propanol and dried as in Example 18. Samples were tested for 180° peel adhesion after 20 minutes dwell. 180° peel adhesion to the polypropylene was 104 N/dm.

In Example 36, 80.9 g SR-545 MQ tackifying resin solution and 71.2 g MQR-32-2 MQD tackifying resin solution were mixed to form a resin solution. 33.0 g of this resin solution and 58.3 g of the polydimethylsiloxane polyurea segmented copolymer solution of Example 20 were mixed, coated, and tested as in Example 35. The 180° peel adhesion to polypropylene was 100 N/dm.

In Example 37, 65.3 g SR-545 MQ tackifying resin solution and 55.6 g MQR-32-3 MQD tackifying resin solution were mixed to form a resin solution. 32.1 g of this resin solution and 58.3 g of the polydimethylsiloxane polyurea segmented copolymer solution of Example 20 were mixed, coated, and tested as in Example 35. Peel adhesion to polypropylene was 84 N/dm.

The compositions prepared in Examples 35–37 illustrate that reactively extruded polydimethylsiloxane polyurea segmented copolymers can be tackified with blends of MQ and MQD tackifying resins to provide polydimethylsiloxane polyurea segmented copolymer based pressure-sensitive adhesives. As in Examples 32–34, the compositions prepared using MQD resins with lesser amounts of the dimethylsiloxane units had higher 180° peel adhesion.

Examples 38–39

In Example 38, methylenedicyclohexylene-4,4'-diisocyanate was fed into the first zone of an 18 mm Leistritz co-rotating twin screw extruder having a 40:1 length:diameter ratio at a rate of 0.0590 g/min (0.000225 mol/min) with nitrogen atmosphere purge. Polydimethylsiloxane Diamine D, Lot 1, 37,800 molecular weight, was injected into the second zone at a rate of 8.0 g/min (0.000212 mol/min). The extruder had double-start fully intermeshing screws throughout the entire length of the barrel, rotating at 100 revolutions per minute. The temperature profile for each of the 90 mm zones was: zone 1—30° C.; zone 2—75° C.; zone 3—120° C.; zone 4—130° C. zone—140° C.; zone 6—150° C.; zone 7—155° C.; zone 8—170° C.; and encap—170° C. 20 parts by weight polydimethylsiloxane polyurea segmented copolymer and 80 parts by weight toluene/2-propanol (70/30 by weight) were mixed and agitated to form a homogeneous solution. Then 50 g of this copolymer solution, 15.9 g SR-545 MQ resin solution, and 34.1 g toluene/2-propanol (70/30 by weight) were mixed, coated, and tested as in Example 35 to obtain a pressure-sensitive adhesive.

In Example 39, a polydimethylsiloxane polyurea segmented copolymer based pressure-sensitive adhesive was prepared and tested as in Example 38 except the methylenedicyclohexylene-4,4'-diisocyanate was fed at a rate of 0.700 g/min (0.000267 mol/min).

Copolymer molecular weight and inherent viscosity, 180° peel adhesion to polypropylene and shear strength were determined. The results are set forth in Table 5.

TABLE 5

| Example | Copolymer Molecular Weight | Copolymer Inherent Viscosity (dL/g) | Peel Adhesion (N/dm) | Shear (min) |
|---|---|---|---|---|
| 38 | 140,000 | 1.3 | 38 | 147 |
| 39 | 840,000 | 3.8 | 37 | >10,000 |

As can be seen from the data in Table 5, use of the adhesive containing the copolymer having the higher molecular weight (Example 39) provided much greater shear strength than did the adhesive prepared with the lower molecular weight copolymer (Example 38).

Pavement Marking Composite Laminate Layers

Pavement marking composite laminate layers were prepared from polydiorganosiloxane polyurea segmented copolymers as follows.

Composite Laminate Layer A

Pellets of a calcium carbonate filled ultra low density polyethylene, Spectrum Color 1080906 EUV, available from Reed Spectrum Division of Sandoz Chemicals Corporation, Minneapolis, Minn. were dried and extruded using a Killion single screw extruder equipped with a film die onto a carrier web of polyester scrim, BAYEX XP 482 available from BAYEX Division of Bay Mills Limited, St. Catharines, Ontario, Canada, to form a 10.5 mil (267 micrometer) thick sheet of composite conformable sheet material on a scrim carrier web. Pellets of Nucrel 699 ethylene-methacrylic acid (EMAA) copolymer available from Dupont and of a pigment concentrate (50% by weight titanium dioxide pigment in ethylene-acrylic acid (EAA) copolymer, Spectratech IM 88947, available from USI Division of Quantum Chemical Company, Clinton, Mass.), were tumbled in a pail tumbler to provide a uniformly distributed pellet mixture with a titanium dioxide content of 20%, an EAA content of 20% and an EMAA content of 60%. This mixture was extruded through a film die onto a web of the composite conformable sheet material to provide a pigmented top layer for the conformable marking sheet. This composite conformable marking sheet web was carried over the surface of a hot can heated to a temperature of 210° C., (e.g. sufficiently hot to bring the pigmented top layer material to a softened, nearly molten condition, but not so hot that the carrier web would melt. While in contact with the hot can at the elevated temperature, glass microbeads (200 to 600 micrometers in size, 1.9 refractive index, surface treated with UNION CARBIDE™ A-1100 brand gamma-aminopropyl-triethoxy silane) and small particles of aluminum oxide grit (30 Grit) were sprinkled onto the hot surface of the top layer. The pigmented top layer with particles on its surface was maintained at the high temperature by wrapping it around the hot can with the web moving at a speed of 0.02 m/sec (4 fpm) so that the particles could partially sink into the surface of the polymer and that the polymer could wet the surface of the particles while still in the nearly molten state. The web was then passed over a cooler roll to re-solidify the film containing the reflective elements and anti-skid particles in the top surface. The carrier web was stripped from the lower surface of the composite laminate sheet and the sheet was wound up into a roll of conformable marking sheet.

p Composite Laminate Layer B

A composite layer of adhesive was prepared by saturating and subsequently coating a fibrous web, 1.6 ounce/yard$^2$ (57 g/m$^2$) Typar Spunbonded Polypropylene available from Reemay, Inc., Old Hickory, Tennessee, with a rubber resin pressure-sensitive adhesive as described in U.S. Pat. No. 4,299,874 which is incorporated herein by reference. The composite layer of adhesive had a thickness of 16 mils (400 micrometers). The composite layer of rubber resin pressure-sensitive adhesive was laminated to the lower surface of Composite Laminate Layer A to provide a composite laminate sheet with an adhesive coated lower surface.

Composite Laminate Layer C

A composite laminate was prepared as in Example 8 of U.S. Pat. No. 5,194,113 which is incorporated herein by reference.

Composite Laminate Layer D

A composite laminate was prepared as in Example of U.S. Pat. No. 5,194,113.

Composite Laminate Layer E

A composite layer of adhesive was prepared by saturating and subsequently coating a fibrous web, 2.4 ounce/yard$^2$ (86 g/m$^2$) REEMAY™ nonwoven polyester available from Reemay, Inc., Old Hickory, Tenn., with a rubber resin pressure-sensitive adhesive as described in U.S. Pat. No. 4,299,874. The composite layer of adhesive had a thickness of 15 mils (375 µm). The composite layer of rubber resin pressure-sensitive adhesive was laminated to the lower surface of a pavement marking backing sheet like that disclosed in Table I of U.S. Pat. 4,490,432, incorporated herein by reference, having a rubber layer with a thickness of 18 mils (450 µm) and a vinyl top layer with a thickness of 2 to 3 mils (50 to 75 µm), to provide a composite laminate sheet with an adhesive coated lower surface.

Examples 40 to 47

In Example 40, Polydimethylsiloxane Diamine E, Lot 2, molecular weight 52,900, was fed at a rate of 15.5 g/min (0.000293 mol/min) into the first zone of a Leistritz 34-mm diameter 1200 mm long counter-rotating twin screw extruder. SR-545 MQ resin, dried as in Example 7, was fed into zone two at a rate of 15.4 g/min. Methylenedicyclohexylene-4,4'-diisocyanate was fed at a rate of 0.075 g/min (0.00029 mol/min) into zone six of the extruder with the feed line lightly brushing the screws. The extruder was fitted with fully intermeshing screws throughout, rotating at 50 revolutions per minute. The temperature profile of the each of the 120 mm long zones was: zones 1 and 2—30° C.; zone 3—35° C.; zones 4 and 5—50° C.; zone 6—100° C.; zone 7—170° C.; zones 8 through 10—180° C.; and endcap—140° C. The extrudate was cooled in air and collected to provide a polydimethylsiloxane polyurea segmented copolymer-based pressure-sensitive adhesive that was hot melt coatable at 100% solids.

This polydimethylsiloxane polyurea segmented copolymer-based pressure-sensitive adhesive was coated as in Example 8 on to the rubber resin pressure-sensitive adhesive coated side of Composite Laminate Layer C at thickness of 50 µm (2 mils) to provide a pavement marking sheet having a bottom layer of polydimethylsiloxane polyurea segmented copolymer-based pressure-sensitive adhesive. A release liner, 50 µm (2 mil) thick clear polyester, available as S TAKE-OFF™ 2402 available from Release International, Bedford Park, Ill., was laminated to the polydimethylsiloxane polyurea segmented copolymer-based pressure-sensitive adhesive surface.

In Example 41, a pavement marking sheet was prepared as in Example 40 except the polydimethylsiloxane polyurea segmented copolymer-based pressure-sensitive adhesive was applied to the adhesive coated lower surface of Composite Laminate Layer B.

In Example 42, a pavement marking sheet was prepared as in Example 40 except the polydimethylsiloxane polyurea segmented copolymer-based pressure-sensitive adhesive was coated onto the aluminum foil side of Composite Laminate Layer D at a thickness of 125 µm (5 mils).

In Example 43, a pavement marking sheet was prepared as in Example 40 except the polydimethylsiloxane polyurea segmented copolymer-based pressure-sensitive adhesive was coated onto the lower surface of Composite Laminate Layer A at a thickness of 125 µm (5 mils).

In Example 44, a pavement marking sheet was prepared as in Example 40 except the polydimethylsiloxane polyurea segmented copolymer-based pressure-sensitive adhesive was prepared with the following modifications. The MQ resin was fed at a rate of 18.4 g/min and the methylenedicyclohexylene-4,4'-diisocyanate was fed at a rate of 0.072 g/min (0.00027 mol/min).

In Example 45, a pavement marking sheet was prepared as in Example 41 except the polydimethylsiloxane polyurea segmented copolymer-based pressure-sensitive adhesive of Example 44 was substituted for that of Example 40.

In Example 46, a pavement marking sheet was prepared as in Example 42 except the polydimethylsiloxane polyurea segmented copolymer-based pressure-sensitive adhesive of Example 44 was substituted for that of Example 40.

In Example 47, a pavement marking sheet was prepared as in Example 43 except the polydimethylsiloxane polyurea segmented copolymer-based pressure-sensitive adhesive of Example 44 was substituted for that of Example 40.

The release liners were removed from samples of dimension 304 cm by 10 cm (10 feet by 4 inches) of marking sheets of Examples 40–47 and these samples were applied to a concrete pavement surface having a temperature of about 1° C. (34° F.). The samples were tamped against the surface using a 3M Roller Tamper Cart (model RTC-2 available from the 3M Company, St. Paul, Minn.) with a 90 Kg (200 lbs) load. The adhesion of the marking sheets of Examples 40 through 47 to dry pavement was excellent. The pressure-sensitive adhesives of the marking sheets of Examples 40 through 47 exhibited surprisingly good tackiness and ease of bonding to the concrete pavement surface at the low temperature of 1° C. (34° F.).

Examples 48–59

In Example 48, the polydimethylsiloxane polyurea segmented copolymer-based pressure-sensitive adhesive of Example 17 was coated as in Example 8 on to the release coated side of S TAKE-OFF™ 2402 release liner at thickness of 125 µm (5 mils). A second release liner, 3M SCOTCHPAK™ 1022 Release Liner, available from 3M Company, St. Paul, Minn., was laminated at the nip to the surface of the pressure-sensitive adhesive. A Composite Laminate layer was prepared by laminating together by hand at light pressure four layers of a 875 µm (35 mil) thick foamed acrylic pressure-sensitive adhesive, Acrylic Foam Tape Y4253 Type 40 available from 3M Company, St. Paul, Minn., to produce a layer 3.5 mm (140 mils) thick. The Composite Laminate layer was laminated by hand to the bottom surface of the marker body of a 3M Brand 280 Series Raised Pavement Marker, available from 3M Company, St. Paul, Minn. The S TAKE-OFF™ 2402 release liner was peeled from the surface of the polydimethylsiloxane polyurea segmented copolymer-based pressure-sensitive adhesive and the pressure-sensitive adhesive was laminated to the bottom surface of the Composite Laminate layer attached to the marker body to produce a pavement marker having a bottom layer polydimethylsiloxane polyurea segmented copolymer-based pressure-sensitive adhesive. The 3M SCOTCHPAK™ 1022 Release Liner was removed from the lower surface of the pavement marker and replaced with a further sheet of S TAKE-OFF™ 2402 release liner.

In Example 49, a polydimethylsiloxane polyurea segmented copolymer-based pressure-sensitive adhesive was coated on a release liner as in Example 48 and a second release liner was laminated at the nip to the surface of the pressure-sensitive adhesive as in Example 48. The S TAKE-OFF™ 2402 release liner was peeled from the surface of the pressure-sensitive adhesive and the pressure-sensitive adhesive was laminated to the rubber resin adhesive coated lower surface of SCOTCHLANE™ 620 Series pavement marking tape available from 3M Company, St. Paul, Minn., to provide a pavement marking sheet.

The 3M SCOTCHPAK™ 1022 release liner was removed from the lower surface of the pavement marking sheet and the composite laminate pavement marking tape was applied to an asphalt traffic bearing pavement surface and tamped into place as in Examples 44–47, except that the air temperature was about 22° C. and the pavement surface temperature was about 28° C. After six days, the marking sheet was peeled from the pavement surface at a peel angle of 90 degrees at a constant rate of 47.5 cm/min (18.7 inches/min) and the peel force was measured. The peel force was 1.3–1.4 N/cm width (3–3.25 lb./4 in width) and the pavement surface under the marking sheet was dry on removal of the marking.

In Example 50, SR-545 MQ resin, dried as in Example 1, was fed at a rate of 9.35 g/min into zone 1 of a Berstorff 25 mm diameter 737.5 mm long co-rotating twin screw extruder. Polydimethylsiloxane Diamine G, molecular weight 105,000, was injected into zone two at a rate of 9.35 g/min (0.0000890 mol/min). Methylenedicyclohexylene-4, 4'-diisocyanate was fed at a rate of 0.0403 g/min (0.000154 mol/min) into zone six of the extruder with the feed line lightly brushing the screws. The extruder was fitted with fully intermeshing double-start screws throughout, rotating at 125 revolutions per minute. The temperature profile of each of the 125 mm long zones (except for 112.5 mm zone 1) was: zone 1—27° C.; zones 2 and 3 —32° C.; zone 4—50° C.; zone—100° C.; zone 6—60° C.; and endcap—179° C. The extrudate was cooled in air and collected to provide a polydimethylsiloxane polyurea segmented copolymer-based pressure-sensitive adhesive that was hot melt coatable at 100% solids. This polydimethylsiloxane polyurea segmented copolymer-based pressure-sensitive adhesive was used to make a pavement marking sheet in the manner of Example 40, coated at a thickness of 76 µm (3 mils) onto the adhesive coated lower surface of Composite Laminate Layer E.

In Example 51, a pavement marking sheet was prepared as in Example 50, except that the polydimethylsiloxane polyurea segmented copolymer-based pressure-sensitive adhesive was coated at a thickness of 32 µm (1.25 mils).

In Example 52, a pavement marking sheet was prepared as in Example 51 except that the polydimethylsiloxane polyurea segmented copolymer-based pressure-sensitive adhesive was coated onto the adhesive coated lower surface of STAMARK™ 5730 Series pavement marking sheet available from 3M Company, St. Paul, Minn.

In Example 53, a pavement marking sheet was prepared as in Example 50 except that the polydimethylsiloxane polyurea segmented copolymer-based pressure-sensitive adhesive used was prepared with an MQ resin flowrate of 11.4 g/min.

In Example 54, a pavement marking sheet was prepared as in Example 53 except the pressure-sensitive adhesive was coated at a thickness of 32 µm (1.25 mils).

In Example 55, the release liner was stripped from the surface of the pavement marking sheet of Example 50. The pressure-sensitive adhesive surface was then exposed to electron beam radiation. The electron beam source was a 300 KeV Electrocurtain available from Energy Sciences, Incorporated, Woburn, Mass. with a voltage setting of 200 KV, a line speed of 7.6 m/min (25 fpm) and the current adjusted so as to provide an electron beam radiation dose of 3 Mrad to crosslink the pressure-sensitive adhesive. After irradiation, a release liner, S TAKE-OFF™ 2402 was laminated to the pressure-sensitive adhesive surface of the pavement marking sheet.

In Examples 56–59, the pavement marking sheets of Examples 51–54, respectively, were subjected to electron beam radiation as in Example 5.

Samples of marking sheets 152 cm by 10 cm (5 feet by 4 inches) from Examples 50–59 were applied to an asphalt pavement surface. Air temperature was about 32° C. (90° F.) and the pavement temperature was about 38° C. (100° F.). The samples were tamped as in Examples 40–47. About one hour after application to the pavement surface, a 30 cm (12 inch) length of each marking sheet was peeled from the pavement surface at a peel angle of 90 degrees at a constant rate of 47.5 cm/min (18.7 inches/min) and the peel force was measured. After two weeks, the peel test was repeted. The results of initial and two week peel force measurements are set forth in Table 6.

TABLE 6

| Example | Initial Peel Force N/cm width | lb/4 inch width | Two Week Peel Force N/cm width | lb/4 inch width |
|---|---|---|---|---|
| 50 | 1.32 | 3 | 0.84 | 1.9 |
| 51 | 0.88 | 2 | 0.62 | 1.4 |
| 52 | 1.10 | 2.5 | 1.06 | 2.4 |
| 53 | 1.54 | 3.5 | 1.50 | 3.4 |
| 54 | 1.32 | 3 | 1.28 | 2.9 |
| 55 | 0.88 | 2 | 0.75 | 1.7 |
| 56 | 0.88 | 2 | 0.70 | 1.6 |
| 57 | 1.10 | 2.5 | 0.92 | 2.1 |
| 58 | 1.32 | 3 | 1.28 | 2.9 |
| 59 | 1.10 | 2.5 | 1.14 | 2.6 |

The data in Table 6 show the marking sheets of Examples 50–59 to have very stable peel force values over the two week period.

The surfaces of two 30 cm by 30 cm (12 inch by 12 inch) concrete patio blocks 5 cm (2 inches) thick were sandblasted to expose a fresh surface of concrete and aggregate. Both blocks were dry and at room temperature of approximately 21° C. (70° F.). Pieces 30 cm (12 inches) in length and 5 cm (2 inches) in width of pavement king tapes of Examples 51 and 56 were applied to the top surface of each of the concrete patio blocks and tamped in place using a 3M Roller Tamper Cart Model RTC-2 loaded with 200 lbs (90 Kg). One of the blocks was completely immersed in a tub of water. The second block was placed in a tub of water with the water level such that the 5 cm (two inch) thick block was halfway immersed in the water, i.e., the water depth was approximately 2.5 cm (1 inch) to allow the water to percolate through and saturate the block, but not to cover the top surface of the block to which the markings were attached. After about two hours both blocks appeared to be saturated with water. At that time, the adhesion of the markings to the blocks was assessed qualitatively by manually peeling the markings from the blocks. Each of the pavement marking sheets Examples 51 and 56 were adhered to the surfaces of each block and exhibited some resistance to being peeled.

Examples 60–70

In Examples 60–67, pavement marking sheets were prepared by coating various polydimethylsiloxane polyurea segmented copolymer-based pressure-sensitive adhesives were applied to the adhesive coated lower surfaces of various pavement marking sheet materials available from 3M Company, St. Paul, Minn., using the procedure of Example 40. The pavement marking sheet materials, the pressure-sensitive adhesive and adhesive thickness are set forth in Table 7.

TABLE 7

| Example | Pavement Marking Sheet Material | Pressure-Sensitive Adhesive | Pressure-Sensitive Adhesive Thickness |
|---|---|---|---|
| 60 | SCOTCHLANE ™ 620 | Example 42 | 76 μm (3 mils) |
| 61 | SCOTCHLANE ™ 620 | Example 42 | 32 μm (1.25 mils) |
| 62 | STAMARK ™ 420 | Example 42 | 32 μm (1.25 mils) |
| 63 | STAMARK ™ 380 | Example 42 | 32 μm (1.25 mils) |
| 64 | SCOTCHLANE ™ 620 | Example 43 | 76 μm (3 mils) |
| 65 | SCOTCHLANE ™ 620 | Example 43 | 32 μm (1.25 mils) |
| 66 | STAMARK ™ 380 | Example 43 | 32 μm (1.25 mils) |
| 67 | STAMARK ™ 420 | Example 43 | 32 μm (1.25 mils) |

In Examples 68–70, samples of pavement marking sheet materials of Examples 60, 62 and 63, respectively, were subjected to electron beam irradiation as in Example 55

Samples 152 cm by 10 cm (5 feet by 4 inches) of marking sheets from Examples 50–70 were applied to the edge line area of an asphalt roadway pavement surface late in the fall season. Air and pavement temperatures were about 9° C. (45° F.). The samples were adhered to the asphalt using the procedures as in Example 40–47. After 5 months exposure through a winter season in Minnesota, the marking sheets of Examples 50–70 were in place and well adhered to the roadway surface.

Example 71

In Example 71, MQ resin powder containing less than 1% toluene (GE Silicones, material 1170-002, lot EF002) was fed at a rate of 30.1 g/min into the back portion of zone 1 of a Berstorff 40 mm diameter 1600 mm length corotating twin screw extruder and Polydimethylsiloxane Diamine D, Lot 3, 34,800 molecular weight, was fed at a rate of 29.9 g/min (0.000859 mol/min) into the forward portion of zone 1. A mixture of 10 parts by weight DESMODUR N-3300 (polyisocyanate with NCO equivalent weight of 195, Bayer, Pittsburgh, Pa. 15205) and 90 parts by weight methylenedicyclohexylene-4,4'-diisocyanate was fed at a rate of 0.233 g/min (0.00172 equivalents NCO/min) into zone 8 to provide an NCO:NH2 ratio of 1.00:1.00. The diisocyanate feed line was placed close to the screw threads as in Example 1. Double start fully intermeshing screws, rotating at 100 revolutions per minute, were used throughout the entire length of the barrel. The temperature profile for each of the 160 mm zones was: zones 1 through 7 set at 50° C.; zone 8—60° C.; zone 9—120° C.; zone 10—180° C.; endcap and melt pump—180° C. The resultant pressure-sensitive adhesive was collected and solution coated as described in Example 1. Peel strength was 44 N/dm.

Example 72

In Example 72, a polydimethylsiloxane polyurea based pressure-sensitive adhesive was prepared as in Example 71, except that a mixture of 10 parts by weight MONDUR 489 (polyisocyanate with NCO equivalent weight of 137, Bayer, Pittsburgh, Pa. 15205) and 90 parts by weight methylenedicyclohexylene-4,4'-diisocyanate was fed at a rate of 0.226 g/min (0.00172 equivalents NCO/min) to provide an NCO NH2 ratio of 1.00:1.00. The resultant pressure-sensitive adhesive was collected and solution coated as described in Example 1. Peel strength was 44 N/dm.

Example 73

In Example 73, a filled, polydimethylsiloxane polyurea based pressure-sensitive adhesive was prepared as in Example 71. MQ resin powder was fed at a rate of 21.6 g/min. Three parts by weight Polydimethylsiloxane Diamine D, Lot 3, molecular weight 34,800, was mixed with 4 parts by weight Al$_2$O$_3$ powder and fed at a rate of 56.6 g/min (0.000697 mol diamine/min). Methylenedicyclohexylene-4, 4'-diisocyanate was fed at a rate of 0.183 g/min (0.00699 mol/min) into zone 8 to provide an NCO:NH2 ratio of 1.00:1.00. The resultant pressure-sensitive adhesive was collected in hot melt coated as described in Example 8. Peel strength was 4.1 N/dm. Thermal conductivity, measured by ASTM method C518, was 0.16 W/m°K. A similar elastomer with no filler or MQ had a conductivity of 0.10 W/m°K.

Examples 74–78

In Example 74, the polydimethylsiloxane polyurea based pressure-sensitive adhesive of Example 40 was coated as in Example 8 at a thickness of 38 μm (1.5 mil) onto a release liner and laminated to a nonwoven rayon fiber backing to form a pressure-sensitive adhesive tape. The backing was formed by first passing 2.5 to 5 cm long, 1.5 denier viscose-rayon staple fibers through a twin cylinder card (available from Spinnbau GmbH, Bremen, Germany) to form a fluffy fiber web with a fiber weight of between 41 g/m$^2$ and 54 g/m$^2$. The fluffy fiber web was compacted to a tissue-like condition and sized by being fed through the nip of a pair of horizontal squeeze rolls, the lower one of which dipped in an aqueous bath of fiber-binding rubbery acrylate sizing latex (RHOPLEX™ B-15, available from Rohm and Haas Co.), diluted with water to provide a size weight approximately equal to the weight of the fiber) and then dried.

In Example 75, a pressure-sensitive adhesive tape was made as in Example 74 with the polydimethylsiloxane polyurea based pressure-sensitive adhesive of Example 44.

In Example 76, a pressure-sensitive adhesive tape was made as in Example 74 with a polydimethylsiloxane polyurea based pressure-sensitive adhesive prepared as in Example 40 with the following modifications. Polydimethylsiloxane Diamine F, molecular weigh t 71,000 was injected at a rate of 15.9 g/min (0.000224 mol/min). The MQ resin powder was fed at a rate of 15.7 g/min. Methylenedicyclohexylene-4,4'-diisocyanate was fed at a rate of 0.054 g/min (0.000206 mol/min). The temperatures of zones 7 and 8 were 170° C. and zones 9 and 10 were 190° C.

In Example 77, a pressure-sensitive adhesive tape was made as in Example 74 with a polydimethylsiloxane polyurea based pressure-sensitive adhesive prepared as in Example 50 but with the following modifications. The MQ resin powder was fed at a rate of 18.9 g/min. Polydimethylsiloxane Diamine E, Lot 2, molecular weigh t 52,900 was injected at a rate of 18.9 g/min (0.000357 mol/min). Methylenedicyclohexylene-4,4'-diisocyanate was fed at a rate of 0.114 g/min (0.000435 mol/min).

In Example 78, a pressure-sensitive adhesive tape was made as in Example 74 with the polydimethylsiloxane polyurea based pressure-sensitive adhesive of Example 50.

The pressure-sensitive adhesive tapes were tested for upright t and inverted MVTR, skin adhesion immediately after application, T$_0$, and after 24 hours, T$_{24}$, skin adhesion lift after 24 hours, T$_{24}$ lift, skin adhesion residue after 24 hours, T$_{24}$ residue and skin adhesion to a wet surface immediately after application, T$_0$ wet. The results are set forth in Table 8.

TABLE 8

| Example | MVTR upright | MVTR inverted | T$_0$ (N/dm) | T$_{24}$ (N/dm) | T$_{24}$ Lift | T$_{24}$ Residue | T$_0$ Wet (N/dm) |
|---|---|---|---|---|---|---|---|
| 74 | 1178 | 4529 | 2.6 | 4.4 | 2.3 | 0.0 | 1.4 |
| 75 | 1152 | 6853 | 3.3 | 5.4 | 1.7 | 0.0 | 2.2 |
| 76 | 981 | 7235 | 3.9 | 7.9 | 1.3 | 0.0 | 2.0 |
| 77 | — | — | 1.7 | 3.6 | 1.9 | 0.0 | — |
| 78 | — | — | 2.4 | 4.9 | 1.9 | 0.0 | — |

The data in Table 8 for Examples 74–78 present the results of adhesion tests, moisture vapor transmission rate, residue, and lift tests for the medical pressure-sensitive adhesives of the present invention. All examples display the desired minimal lift off of and no residue remaining on skin after tape removal. The upright t and inverted MVTR of the tested samples controllably change values in opposing directions. The adhesion build upon aging against skin for 24 hours nearly doubles, and can be formulated to be within the optimum range for medical applications.

Examples 79 and 80 and Comparative Examples C1 and C2

In Example 79, Polydimethylsiloxane Diamine F, 71,000 molecular weight, was fed at a rate of 32.1 g/min (0.000452 mol/min) with dried MQ tackifying resin, spray dried to 1% toluene from SR-545 under nitrogen, at a rate of 32.0 g/min, into zone 1 of a Berstorff 40 mm diameter 1600 mm length corotating twin screw extruder. Methylenedicyclohexylene-4,4'-diisocyanate was fed at a rate of 0.105 g/min (0.000401 equivalents NCO/min) into zone 4 to provide an NCO:NH2 ratio of 0.89:1.00. The diisocyanate feed line was placed close to the screw threads as in Example 1. Double start fully intermeshing screws, rotating at 100 revolutions per minute, were used throughout the entire length of the barrel. Vacuum was pulled on zone 8. The temperature profile for each of the 160 mm zones was: zone 1—20° C.; zones 2 and 3—50° C.; zone 4—60° C.; zone 5—100° C.; zone 6—130° C.; zone 7—160° C; zone 8—180° C.; zone 9—160° C.; zone 10—160° C.; endcap and melt pump—60° C. This polydimethylsiloxane polyurea based pressure-sensitive adhesive was collected and coated onto a nonwoven rayon fiber backing at 41 μm (1.6 mil) thickness as in Example 74.

In Example 80, the polydimethylsiloxane polyurea based pressure-sensitive adhesive of Example 79 was coated on a backing prepared as described in Example 74 in a discontinuous pattern at a coating weight of 0.6 g/dm$^2$ as described in Example 1 in the patent application publication entitled "An Adhesive Sheet Material Suitable for Use on Wet Surfaces", U.S. Ser. No. 08/317,854, filed on Oct. 4, 1994.

In Comparative Examples C1 and C2, tackified block copolymer pressure-sensitive adhesive tapes with a continuous and discontinuous adhesive coating, respectively, were prepared as described in Example 1 of U.S. Ser. No. 08/317, 854, filed on Oct. 4, 1994.

The pressure-sensitive adhesive tapes were tested for skin adhesion immediately after application, T$_0$-Day, and skin adhesion to a wet surface immediately after application, T$_0$-Wet, and the percent of the wet adhesion to the dry adhesion was calculated. The results are set forth in Table 9.

TABLE 9

| Example | T$_0$ - Dry (N/dm) | T$_0$ - Wet (N/dm) | Wet/Dry Percent |
|---|---|---|---|
| 79 | 2.0 | 0.85 | 43 |
| 80 | 2.5 | 2.0 | 80 |
| C1 | 2.8 | 1.1 | 39 |
| C2 | 6.9 | 3.2 | 46 |

The data in Table 9 demonstrate that the pattern coated pressure-sensitive adhesive of the present invention performs exceptionally well under wet skin adhesion conditions, nearly doubling in Wet/Dry Percent, while the comparative example increases only slightly.

Example 81

In Example 81, a polydimethylsiloxane polyurea segmented copolymer was prepared in an 18 mm Leistritz as in Example 1 with the following modifications. The temperature profile for each of the 90 mm zones was: zones 1 to 3—30° C.; zone 4—50° C.; zone 5—80° C; zone 6—150° C.; zone 7—80° C.; zone 8—90° C; and encap—195° C. A 1:1 molar blend of Polydimethylsiloxane Diamine E, Lot 3, molecular weight 50,200, and Dytek Am™ (2-methyl-1,5-pentanediamine obtained from Dupont) was fed at a rate of 6.16 g/min (0.000242 mol/min) into zone 1 of the extruder. Screw rotation rate was 75 revolutions per minute. Methylenedicyclohexylene-4,4'-diisocyanate was fed into zone 4 at a rate of 0.0635 g/min (0.000242 mol/min). The resultant polydimethylsiloxane polyurea segmented copolymer was extruded into a 3 mm diameter strand, cooled in air, and collected. This polyurea was mostly soluble in 50/50 isopropanol/toluene. It was partially dissolved, blended with MQ tackifying resin at 50 parts polydimethylsiloxane polyurea segmented copolymer to 50 parts MQ resin, coarsely filtered, then coated to produce a pressure-sensitive adhesive tape as in Example 18, with the exception that the final adhesive thickness was about 3 mil. Peel testing was performed at a rate of 90 inches/min after the tape had dwelled on the glass plate for about one minute.

Examples 82–84

In Example 82, the twin screw extruder of Example 50 was used with the following modifications. The screw was operated at 100 revolutions per minute, and was constructed with double start fully intermeshing screws used in combination with partially intermeshing screws. One set of 25 mm length kneading blocks was located at the start of zone 4 and three sets located at the end of zone . The temperature profile for each of the zones was: zone 1—30° C.; zone 2—75° C.; zone 3—100° C.; zone 4—125° C.; zone—150° C.; zone 6—175° C.; endcap and melt pump—75° C. and necktube—190° C. The feedstock reagents were maintained under a nitrogen atmosphere. Polydimethylsiloxane Diamine A, Lot 1, 5280 molecular weight was fed at a rate of 4.84 g/min (0.000917 mol/min) into the first part of zone 1 and tetramethyl-m-xylylene diisocyanate (obtained from Cytec) was fed at a rate of 3.19 g/min (0.0131 mol/min) into the second part of zone 1. Jeffamine™ D4000 polyoxypropylenediamine (obtained from Huntsman Corporation, titrated molecular weight 4660 g/mol for Lot # was injected at 29.1 g/min (0.00624 mol/min) into zone 3. Dytek A™ (2-methyl-1,5-pentanediamine obtained from DuPont, titrated molecular weight 117 g/mol for Lot # was injected at zone 4 at a rate of 0.687 g/min (0.00587 mol/min). The polydimethylsiloxane polyurea segmented copolymer was collected, blended, and coated as in Example 81, with the exception that 7 parts copolymer and 3 parts MQ resin were employed, to produce a pressure-sensitive adhesive tape.

The number average molecular weight of the product was determined via gel permeation chromatography with a HP 1090 Chromatograph equipped with a HP 1037A Refractive Index detector, a Waters 590 pump, a Waters Wisp autoinjector, and a Kariba column oven at R.T. The copolymer was dissolved in DMF w/v 0.05% LiBr at 15 mg/5 mL, filtered with a 0.2 micron nylon filter, and 100 microliters were injected into a Jordi Mixed Bed column. The elution rate was 0.5 mL/min in DMF+0.05% w/v LiBr. Calibration was based on Polystryene standards from Pressure Chemical Company, Pittsburgh, Pa. thus reported molecular weights are the Polystyrene equivalents. The number average molecular weight was $5.9 \times 10^4$.

In Example 83, a pressure-sensitive adhesive tape was produced as in Example 82, except the tackifier was FORAL™ 85, available from Hercules Inc., at 50 parts tackifier to 50 parts polydimethylsiloxane polyurea segmented copolymer and the sample required heating to dissolve the tackifier.

In Example 84, a pressure-sensitive adhesive tape was produced as in Example 82, except 25 parts was FORAL™ 85, available from Hercules Inc., and 25 parts MQ resin were blended with 50 parts polydimethylsiloxane polyurea segmented copolymer and the sample required heating to dissolve the tackifier.

Pressure-sensitive adhesive tapes of Examples 81–84 were tested and the peel adhesion results are set forth in Table 10.

TABLE 10

| Example | peel adhesion (N/dm) |
| --- | --- |
| 81 | 81.5 |
| 82 | 9.7 |
| 83 | 11.9 |
| 84 | 25.0 |

The peel adhesion data found in Table 10 for Examples 81–84 show that the pressure-sensitive adhesive of Example 81 based on a polydimethylsiloxane polyurea segmented copolymer derived from an equimolar mixture of polydimethylsiloxane diamine of about 50,000 molecular weight and Dytek A™, available from Dupont, a short chain hydrocarbon diarnine, when tackified with MQ resin provides a pressure-sensitive adhesive. The peel adhesion data for Examples 82–84 show that pressure-sensitive adhesives of the present invention based on a polydimethylsiloxane polyurea segmented copolymer derived from a polydimethylsiloxane diamine of about 5300 molecular weight and two organic diamines; Jeffamine™ D-4000, a polypropylene oxide diamine having a molecular weight of about 4,500 and Dytek A™, a short chain hydrocarbon diamine having a molecular weight of about 100, where polypropylene oxide constitutes about 77 weight percent of the copolymer, when tackified with an MQ silicate resin, an organic tackifying resin, or a combination of MQ and organic tackifying resins provide useful pressure-sensitive adhesives.

Examples 85–88

In Examples 84–88, vibration damping materials were prepared by mixing various polydimethylsiloxane polyurea segmented copolymers, SR-545 (MQ silicate resin, 60 weight percent in toluene, available from General Electric Silicone Products Division, Waterford, N.Y.), toluene and isopropanol in the amounts shown in Table 11.

TABLE 11

| Example | Copolymer | Copolymer (parts) | SR-545 (parts) | Toluene (parts) | Isopropanol (parts) |
| --- | --- | --- | --- | --- | --- |
| 85 | A | 2.3 | 5.5 | 0 | 5.0 |
| 86 | B | 20.0 | 47.6 | 13.0 | 5.6 |
| 87 | C | 40.0 | 95.2 | 158.7 | 68.0 |
| 88 | D | 23.1 | 47.6 | 17.8 | 7.6 |

In Example 85, the solution was cast into a reservoir lined with a release liner and dried to form vibration damping material. In Examples 86–88, the solutions were coated onto a release liner and dried. The storage modulus, G', and loss factor, tan δ, mined and are reported in Table 12.

TABLE 12

| Temp (° C.) | Example 85 G'(Pa) | Tanδ | Example 86 G'(Pa) | Tanδ | Example 87 G'(Pa) | Tanδ | Example 88 G'(Pa) | Tanδ |
|---|---|---|---|---|---|---|---|---|
| −90 | $8.83 \times 10^7$ | 0.02 | $1.00 \times 10^8$ | 0.02 | $1.00 \times 10^8$ | 0.03 | $1.11 \times 10^8$ | 0.03 |
| −80 | $8.37 \times 10^7$ | 0.01 | $9.54 \times 10^7$ | 0.02 | $9.35 \times 10^7$ | 0.03 | $1.03 \times 10^8$ | 0.04 |
| −70 | $7.80 \times 10^7$ | 0.03 | $8.91 \times 10^7$ | 0.03 | $8.44 \times 10^7$ | 0.05 | $9.20 \times 10^7$ | 0.06 |
| −60 | $7.29 \times 10^7$ | 0.04 | $8.23 \times 10^7$ | 0.04 | $7.63 \times 10^7$ | 0.07 | $8.02 \times 10^7$ | 0.08 |
| −50 | $6.91 \times 10^7$ | 0.05 | $7.78 \times 10^7$ | 0.05 | $6.92 \times 10^7$ | 0.08 | $7.17 \times 10^7$ | 0.10 |
| −40 | $6.46 \times 10^7$ | 0.05 | $7.40 \times 10^7$ | 0.05 | $6.18 \times 10^7$ | 0.11 | $6.16 \times 10^7$ | 0.13 |
| −30 | $6.07 \times 10^7$ | 0.05 | $7.00 \times 10^7$ | 0.06 | $5.16 \times 10^7$ | 0.15 | $5.13 \times 10^7$ | 0.16 |
| −20 | $5.77 \times 10^7$ | 0.05 | $6.68 \times 10^7$ | 0.07 | $4.36 \times 10^7$ | 0.19 | $4.19 \times 10^7$ | 0.21 |
| −10 | $5.44 \times 10^7$ | 0.06 | $6.19 \times 10^7$ | 0.08 | $3.57 \times 10^7$ | 0.24 | $3.26 \times 10^7$ | 0.27 |
| 0 | $5.15 \times 10^7$ | 0.06 | $5.63 \times 10^7$ | 0.10 | $2.55 \times 10^7$ | 0.34 | $2.25 \times 10^7$ | 0.37 |
| 10 | $4.85 \times 10^7$ | 0.07 | $4.96 \times 10^7$ | 0.13 | $1.56 \times 10^7$ | 0.51 | $1.44 \times 10^7$ | 0.50 |
| 20 | $4.51 \times 10^7$ | 0.08 | $4.15 \times 10^7$ | 0.19 | $7.92 \times 10^6$ | 0.73 | $8.81 \times 10^6$ | 0.64 |
| 30 | $4.12 \times 10^7$ | 0.09 | $3.11 \times 10^7$ | 0.29 | $4.49 \times 10^6$ | 0.83 | $5.23 \times 10^6$ | 0.73 |
| 40 | $3.67 \times 10^7$ | 0.11 | $1.89 \times 10^7$ | 0.51 | $2.42 \times 10^6$ | 0.88 | $2.84 \times 10^6$ | 0.85 |
| 50 | $3.13 \times 10^7$ | 0.14 | $8.60 \times 10^6$ | 0.80 | $1.34 \times 10^6$ | 0.89 | $1.50 \times 10^6$ | 0.92 |
| 60 | $2.54 \times 10^7$ | 0.19 | $4.92 \times 10^6$ | 0.87 | $7.42 \times 10^5$ | 0.84 | $7.62 \times 10^5$ | 0.94 |
| 70 | $1.89 \times 10^7$ | 0.26 | $2.87 \times 10^6$ | 0.90 | $4.29 \times 10^5$ | 0.78 | $4.09 \times 10^5$ | 0.89 |
| 80 | $1.25 \times 10^7$ | 0.36 | $1.72 \times 10^6$ | 0.88 | $2.71 \times 10^5$ | 0.70 | $2.46 \times 10^5$ | 0.78 |
| 90 | $7.57 \times 10^6$ | 0.46 | $1.06 \times 10^6$ | 0.86 | $1.87 \times 10^5$ | 0.62 | $1.73 \times 10^5$ | 0.66 |
| 100 | $4.64 \times 10^6$ | 0.50 | $6.58 \times 10^5$ | 0.86 | $1.43 \times 10^5$ | 0.56 | $1.33 \times 10^5$ | 0.58 |
| 110 | $3.16 \times 10^6$ | 0.45 | $4.09 \times 10^5$ | 0.87 | $1.14 \times 10^5$ | 0.50 | $1.07 \times 10^5$ | 0.54 |
| 120 | $2.44 \times 10^6$ | 0.39 | $2.55 \times 10^5$ | 0.90 | $9.48 \times 10^4$ | 0.46 | $8.57 \times 10^4$ | 0.52 |
| 130 | $1.98 \times 10^6$ | 0.38 | $1.56 \times 10^5$ | 0.93 | $8.19 \times 10^4$ | 0.45 | $7.03 \times 10^4$ | 0.54 |
| 140 | $1.61 \times 10^6$ | 0.41 | $9.56 \times 10^4$ | 0.98 | $6.80 \times 10^4$ | 0.45 | $5.27 \times 10^4$ | 0.59 |
| 150 | $1.28 \times 10^6$ | 0.47 | $5.74 \times 10^4$ | 0.99 | $5.49 \times 10^4$ | 0.46 | $4.03 \times 10^4$ | 0.63 |
| 160 | $9.58 \times 10^5$ | 0.55 | $3.31 \times 10^4$ | 1.06 | $4.05 \times 10^4$ | 0.53 | $2.81 \times 10^4$ | 0.74 |
| 170 | $6.41 \times 10^5$ | 0.68 | $1.93 \times 10^4$ | 1.08 | $2.73 \times 10^4$ | 0.56 | $1.94 \times 10^4$ | 0.84 |
| 180 | $3.74 \times 10^5$ | 0.85 | — | — | $1.46 \times 10^4$ | 0.73 | — | — |
| 190 | $1.98 \times 10^5$ | 1.07 | — | — | — | — | — | — |

As can be seen from the data in Table 12, as the molecular weight of the diamine used to produce the polydimethylsiloxane polyurea segmented copolymer increased from 1620 to 105,000 the utility window for G' decreased from 92 to 181° C.

TABLE 12

| Temp (° C.) | Example 85 G'(Pa) | Tanδ | Example 86 G'(Pa) | Tanδ | Example 87 G'(Pa) | Tanδ | Example 88 G'(Pa) | Tanδ |
|---|---|---|---|---|---|---|---|---|
| −90 | $8.83 \times 10^7$ | 0.02 | $1.00 \times 10^8$ | 0.02 | $1.00 \times 10^8$ | 0.03 | $1.11 \times 10^8$ | 0.03 |
| −80 | $8.37 \times 10^7$ | 0.01 | $9.54 \times 10^7$ | 0.02 | $9.35 \times 10^7$ | 0.03 | $1.03 \times 10^8$ | 0.04 |
| −70 | $7.80 \times 10^7$ | 0.03 | $8.91 \times 10^7$ | 0.03 | $8.44 \times 10^7$ | 0.05 | $9.20 \times 10^7$ | 0.06 |
| −60 | $7.29 \times 10^7$ | 0.04 | $8.23 \times 10^7$ | 0.04 | $7.63 \times 10^7$ | 0.07 | $8.02 \times 10^7$ | 0.08 |
| −50 | $6.91 \times 10^7$ | 0.05 | $7.78 \times 10^7$ | 0.05 | $6.92 \times 10^7$ | 0.08 | $7.17 \times 10^7$ | 0.10 |
| −40 | $6.46 \times 10^7$ | 0.05 | $7.40 \times 10^7$ | 0.05 | $6.18 \times 10^7$ | 0.11 | $6.16 \times 10^7$ | 0.13 |
| −30 | $6.07 \times 10^7$ | 0.05 | $7.00 \times 10^7$ | 0.06 | $5.16 \times 10^7$ | 0.15 | $5.13 \times 10^7$ | 0.16 |
| −20 | $5.77 \times 10^7$ | 0.05 | $6.68 \times 10^7$ | 0.07 | $4.36 \times 10^7$ | 0.19 | $4.19 \times 10^7$ | 0.21 |
| −10 | $5.44 \times 10^7$ | 0.06 | $6.19 \times 10^7$ | 0.08 | $3.57 \times 10^7$ | 0.24 | $3.26 \times 10^7$ | 0.27 |
| 0 | $5.15 \times 10^7$ | 0.06 | $5.63 \times 10^7$ | 0.10 | $2.55 \times 10^7$ | 0.34 | $2.25 \times 10^7$ | 0.37 |
| 10 | $4.85 \times 10^7$ | 0.07 | $4.96 \times 10^7$ | 0.13 | $1.56 \times 10^7$ | 0.51 | $1.44 \times 10^7$ | 0.50 |
| 20 | $4.51 \times 10^7$ | 0.08 | $4.15 \times 10^7$ | 0.19 | $7.92 \times 10^6$ | 0.73 | $8.81 \times 10^6$ | 0.64 |
| 30 | $4.12 \times 10^7$ | 0.09 | $3.11 \times 10^7$ | 0.29 | $4.49 \times 10^6$ | 0.83 | $5.23 \times 10^6$ | 0.73 |
| 40 | $3.67 \times 10^7$ | 0.11 | $1.89 \times 10^7$ | 0.51 | $2.42 \times 10^6$ | 0.88 | $2.84 \times 10^6$ | 0.85 |
| 50 | $3.13 \times 10^7$ | 0.14 | $8.60 \times 10^6$ | 0.80 | $1.34 \times 10^6$ | 0.89 | $1.50 \times 10^6$ | 0.92 |
| 60 | $2.54 \times 10^7$ | 0.19 | $4.92 \times 10^6$ | 0.87 | $7.42 \times 10^5$ | 0.84 | $7.62 \times 10^5$ | 0.94 |
| 70 | $1.89 \times 10^7$ | 0.26 | $2.87 \times 10^6$ | 0.90 | $4.29 \times 10^5$ | 0.78 | $4.09 \times 10^5$ | 0.89 |
| 80 | $1.25 \times 10^7$ | 0.36 | $1.72 \times 10^6$ | 0.88 | $2.71 \times 10^5$ | 0.70 | $2.46 \times 10^5$ | 0.78 |
| 90 | $7.57 \times 10^6$ | 0.46 | $1.06 \times 10^6$ | 0.86 | $1.87 \times 10^5$ | 0.62 | $1.73 \times 10^5$ | 0.66 |
| 100 | $4.64 \times 10^6$ | 0.50 | $6.58 \times 10^5$ | 0.86 | $1.43 \times 10^5$ | 0.56 | $1.33 \times 10^5$ | 0.58 |
| 110 | $3.16 \times 10^6$ | 0.45 | $4.09 \times 10^5$ | 0.87 | $1.14 \times 10^5$ | 0.50 | $1.07 \times 10^5$ | 0.54 |
| 120 | $2.44 \times 10^6$ | 0.39 | $2.55 \times 10^5$ | 0.90 | $9.48 \times 10^4$ | 0.46 | $8.57 \times 10^4$ | 0.52 |
| 130 | $1.98 \times 10^6$ | 0.38 | $1.56 \times 10^5$ | 0.93 | $8.19 \times 10^4$ | 0.45 | $7.03 \times 10^4$ | 0.54 |
| 140 | $1.61 \times 10^6$ | 0.41 | $9.56 \times 10^4$ | 0.98 | $6.80 \times 10^4$ | 0.45 | $5.27 \times 10^4$ | 0.59 |
| 150 | $1.28 \times 10^6$ | 0.47 | $5.74 \times 10^4$ | 0.99 | $5.49 \times 10^4$ | 0.46 | $4.03 \times 10^4$ | 0.63 |
| 160 | $9.58 \times 10^5$ | 0.55 | $3.31 \times 10^4$ | 1.06 | $4.05 \times 10^4$ | 0.53 | $2.81 \times 10^4$ | 0.74 |
| 170 | $6.41 \times 10^5$ | 0.68 | $1.93 \times 10^4$ | 1.08 | $2.73 \times 10^4$ | 0.56 | $1.94 \times 10^4$ | 0.84 |
| 180 | $3.74 \times 10^5$ | 0.85 | — | — | $1.46 \times 10^4$ | 0.73 | — | — |
| 190 | $1.98 \times 10^5$ | 1.07 | — | — | — | — | — | — |

As can be seen from the data in Table 12, as the molecular weight of the diamine used to produce the polydimethylsiloxane polyurea segmented copolymer increased from 1620 to 105,000 the utility window for G' decreased from 92 to 181° C. for Example 85, 55 to 114° C. for Example 86, 22 to 74° C. for Example 87, and 25 to 73 ° C. for Example 88. At tan δ>0.4, Examples 85–88 had useful tan δ utility windows of 83 to 118° C., 36° C. to melt flow, 4° C. to melt flow and 2° C. to melt flow, respectively. Thus, a useful temperature range was seen at 92 to 118° C. for Example 85, and was the same as the G' utility window for Examples 86–88 as these values were narrower than the temperature ranges for tan δ.

Examples 89–92

In Examples 89–92, vibration damping materials were prepared as in Examples 85–88 using the amounts of various polydimethylsiloxane polyurea segmented copolymers, silicate resin, toluene and isopropanol as set forth in Table 13.

TABLE 13

| Example | Copolymer | Copolymer (parts) | SR-545 (parts) | Toluene (parts) | Isopropanol (parts) |
|---|---|---|---|---|---|
| 89 | E | 25.0 | 39.7 | 42.8 | 18.3 |
| 90 | F | 25.0 | 39.7 | 24.7 | 10.6 |
| 91 | G | 20.0 | 31.8 | 19.8 | 8.5 |
| 92 | H | 25 | 39.7 | 37.0 | 15.9 |

Examples 89 and 92, the solutions were coated onto a release liner and dried to form vibration damping material. In Examples 90 and 91, the solutions were cast into a reservoir lined with a release liner and dried to form a vibration damping material. Each sample was evaluated for storage modulus, G', and loss factor, tan δ at 1 Hz. The results are set forth in Table 14.

TABLE 14

| Temp (° C.) | Example 89 G'(Pa) | Tanδ | Example 90 G'(Pa) | Tanδ | Example 91 G'(Pa) | Tanδ | Example 92 G'(Pa) | Tanδ |
|---|---|---|---|---|---|---|---|---|
| −90 | $7.46 \times 10^7$ | 0.03 | $6.82 \times 10^7$ | 0.03 | $6.89 \times 10^7$ | 0.02 | $4.98 \times 10^7$ | 0.02 |
| −80 | $7.06 \times 10^7$ | 0.03 | $6.45 \times 10^7$ | 0.03 | $6.51 \times 10^7$ | 0.03 | $4.68 \times 10^7$ | 0.03 |
| −70 | $6.33 \times 10^7$ | 0.05 | $5.74 \times 10^7$ | 0.06 | $6.00 \times 10^7$ | 0.05 | $4.32 \times 10^7$ | 0.04 |
| −60 | $5.87 \times 10^7$ | 0.07 | $5.13 \times 10^7$ | 0.08 | $5.77 \times 10^7$ | 0.07 | $3.94 \times 10^7$ | 0.06 |
| −50 | $5.46 \times 10^7$ | 0.08 | $4.63 \times 10^7$ | 0.09 | $5.47 \times 10^7$ | 0.08 | $3.60 \times 10^7$ | 0.09 |
| −40 | $4.94 \times 10^7$ | 0.10 | $4.10 \times 10^7$ | 0.12 | $5.10 \times 10^7$ | 0.09 | $3.28 \times 10^7$ | 0.10 |
| −30 | $4.27 \times 10^7$ | 0.13 | $3.46 \times 10^7$ | 0.15 | $4.39 \times 10^7$ | 0.13 | $2.89 \times 10^7$ | 0.13 |
| −20 | $3.66 \times 10^7$ | 0.17 | $2.85 \times 10^7$ | 0.19 | $3.81 \times 10^7$ | 0.16 | $2.33 \times 10^7$ | 0.19 |
| −10 | $2.77 \times 10^7$ | 0.24 | $2.16 \times 10^7$ | 0.26 | $3.16 \times 10^7$ | 0.21 | $1.69 \times 10^7$ | 0.27 |
| 0 | $1.88 \times 10^7$ | 0.34 | $1.50 \times 10^7$ | 0.34 | $2.33 \times 10^7$ | 0.29 | $1.12 \times 10^7$ | 0.37 |
| 10 | $1.11 \times 10^7$ | 0.45 | $9.44 \times 10^6$ | 0.43 | $1.50 \times 10^7$ | 0.40 | $6.56 \times 10^6$ | 0.48 |
| 20 | $5.87 \times 10^6$ | 0.55 | $5.75 \times 10^6$ | 0.48 | $8.25 \times 10^6$ | 0.52 | $3.66 \times 10^6$ | 0.55 |
| 30 | $3.35 \times 10^6$ | 0.57 | $3.69 \times 10^6$ | 0.49 | $4.39 \times 10^6$ | 0.60 | $2.23 \times 10^6$ | 0.56 |
| 40 | $1.95 \times 10^6$ | 0.55 | $2.40 \times 10^6$ | 0.47 | $2.51 \times 10^6$ | 0.62 | $1.34 \times 10^6$ | 0.53 |
| 50 | $1.17 \times 10^6$ | 0.54 | $1.61 \times 10^6$ | 0.44 | $1.45 \times 10^6$ | 0.60 | $8.35 \times 10^5$ | 0.50 |
| 60 | $7.22 \times 10^5$ | 0.53 | $1.11 \times 10^6$ | 0.41 | $8.75 \times 10^5$ | 0.54 | $5.47 \times 10^5$ | 0.46 |
| 70 | $4.64 \times 10^5$ | 0.52 | $7.93 \times 10^5$ | 0.39 | $5.75 \times 10^5$ | 0.47 | $3.76 \times 10^5$ | 0.43 |
| 80 | $3.16 \times 10^5$ | 0.52 | $5.90 \times 10^5$ | 0.37 | $4.14 \times 10^5$ | 0.40 | $2.71 \times 10^5$ | 0.42 |
| 90 | $2.18 \times 10^5$ | 0.55 | $4.60 \times 10^5$ | 0.35 | $3.22 \times 10^5$ | 0.34 | $2.05 \times 10^5$ | 0.41 |
| 100 | $1.49 \times 10^5$ | 0.62 | $3.81 \times 10^5$ | 0.33 | $2.56 \times 10^5$ | 0.30 | $1.58 \times 10^5$ | 0.43 |
| 110 | $9.84 \times 10^4$ | 0.72 | $3.26 \times 10^5$ | 0.31 | $1.83 \times 10^5$ | 0.31 | $1.18 \times 10^5$ | 0.48 |
| 120 | $6.14 \times 10^4$ | 0.86 | $2.86 \times 10^5$ | 0.31 | $1.05 \times 10^5$ | 0.37 | $8.31 \times 10^4$ | 0.57 |
| 130 | $3.49 \times 10^4$ | 1.07 | $2.51 \times 10^5$ | 0.31 | $3.19 \times 10^4$ | 0.70 | $5.18 \times 10^4$ | 0.70 |
| 140 | $1.81 \times 10^4$ | 1.32 | $2.12 \times 10^5$ | 0.34 | $1.64 \times 10^3$ | 3.50 | $2.97 \times 10^4$ | 0.86 |
| 150 | $9.75 \times 10^3$ | 1.62 | $1.72 \times 10^5$ | 0.39 | $1.86 \times 10^3$ | 2.79 | $1.49 \times 10^4$ | 1.05 |
| 160 | — | — | $1.27 \times 10^5$ | 0.46 | $1.49 \times 10^3$ | 2.00 | $7.29 \times 10^3$ | 1.12 |
| 170 | — | — | $9.09 \times 10^4$ | 0.55 | $1.59 \times 10^3$ | 1.61 | $4.00 \times 10^3$ | 0.92 |
| 180 | — | — | $6.25 \times 10^4$ | 0.61 | $1.18 \times 10^3$ | 1.08 | — | — |
| 190 | — | — | $4.60 \times 10^4$ | 0.61 | — | — | — | — |

The data in Table 14 demonstrate that the vibration damping materials of Examples 89–92 which were prepared using polydimethylsiloxane polyurea segmented copolimers of polydimethylsiloxane diamines of about 5300 molecular weight and various diisocyanates, had similar useful temperature ranges of 17 to 78° C., 16 to 65° C., 23 to 79° C. and 9 to 73° C., respectively. Examples 91 and 92 were also evaluated as heat activated adhesives and afforded stress at break values of 0.99 MN/m² and 0.93 MN/m², respectively.

Examples 93–98

In Examples 93–98, Polydiphenyldimethylsiloxane Polyurea Segmented Copolymer K was mixed with SR-545 MQ silicate resin solution or dried SR-545 MQ silicate resin obtained by drying the resin in a forced air oven at 150° C. until the toluene content was less than 1%, under slow agitation until homogeneous in the amounts set Table 15.

TABLE 15

| Example | Copolymer K (parts) | SR-545 resin solution (parts) | SR-545 dried resin (parts) |
|---|---|---|---|
| 93 | 30 | 3.0 | — |
| 94 | 30 | 5.2 | — |
| 95 | 30 | 8.1 | — |
| 96 | 20 | — | 5 |
| 97 | 20 | — | 7.5 |
| 98 | 20 | — | 11.7 |

Each solution was coated onto a release liner and dried to form a vibration damping material. The storage modulus, G', and loss factor, tan δ, were determined sample at 1 Hz. The results are set forth in Table 16.

TABLE 16

| Temp | Example 93 | | Example 94 | | Example 95 | | Example 96 | | Example 97 | | Example 98 | |
|---|---|---|---|---|---|---|---|---|---|---|---|---|
| (° C.) | G'(Pa) | Tanδ | G'(Pa) | Tanδ | G'(Pa) | Tanδ | G'(Pa) | Tanδ | G'(Pa) | Tanδ | G'(Pa) | Tanδ |
| −90 | $9.29 \times 10^7$ | 0.10 | — | — | $1.13 \times 10^8$ | 0.01 | $1.01 \times 10^8$ | 0.01 | $9.12 \times 10^7$ | 0.01 | $8.02 \times 10^7$ | 0.01 |
| −80 | $4.86 \times 10^7$ | 0.30 | $4.17 \times 10^7$ | 0.26 | $9.12 \times 10^7$ | 0.05 | $9.36 \times 10^7$ | 0.03 | $8.66 \times 10^7$ | 0.02 | $7.72 \times 10^7$ | 0.02 |
| −70 | $1.35 \times 10^7$ | 0.49 | $1.90 \times 10^7$ | 0.40 | $5.69 \times 10^7$ | 0.12 | $8.07 \times 10^7$ | 0.04 | $7.83 \times 10^7$ | 0.04 | $7.15 \times 10^7$ | 0.03 |
| −60 | $4.57 \times 10^6$ | 0.48 | $6.91 \times 10^6$ | 0.52 | $3.12 \times 10^7$ | 0.20 | $6.42 \times 10^7$ | 0.09 | $6.94 \times 10^7$ | 0.05 | $6.64 \times 10^7$ | 0.04 |
| −50 | $2.13 \times 10^6$ | 0.38 | $2.55 \times 10^6$ | 0.56 | $1.67 \times 10^7$ | 0.27 | $5.13 \times 10^7$ | 0.13 | $6.22 \times 10^7$ | 0.06 | $6.26 \times 10^7$ | 0.04 |
| −40 | $1.44 \times 10^6$ | 0.27 | $1.33 \times 10^6$ | 0.47 | $8.70 \times 10^6$ | 0.37 | $4.06 \times 10^7$ | 0.17 | $5.59 \times 10^7$ | 0.07 | $5.83 \times 10^7$ | 0.05 |
| −30 | $1.18 \times 10^6$ | 0.22 | $8.70 \times 10^5$ | 0.37 | $3.99 \times 10^6$ | 0.47 | $2.90 \times 10^7$ | 0.24 | $4.95 \times 10^7$ | 0.09 | $5.39 \times 10^7$ | 0.05 |
| −20 | $1.00 \times 10^6$ | 0.18 | $5.82 \times 10^5$ | 0.28 | $1.70 \times 10^6$ | 0.57 | $1.55 \times 10^7$ | 0.41 | $4.06 \times 10^7$ | 0.13 | $4.94 \times 10^7$ | 0.07 |
| −10 | $9.30 \times 10^5$ | 0.16 | $4.81 \times 10^5$ | 0.23 | $9.45 \times 10^5$ | 0.59 | $7.18 \times 10^6$ | 0.61 | $3.31 \times 10^7$ | 0.18 | $4.72 \times 10^7$ | 0.08 |
| 0 | $9.03 \times 10^5$ | 0.14 | $4.24 \times 10^5$ | 0.19 | $6.27 \times 10^5$ | 0.57 | $3.47 \times 10^6$ | 0.73 | $2.44 \times 10^7$ | 0.27 | $4.47 \times 10^7$ | 0.09 |
| 10 | $9.00 \times 10^5$ | 0.12 | $3.87 \times 10^5$ | 0.17 | $4.55 \times 10^5$ | 0.52 | $1.6 \times 10^6$ | 0.77 | $1.51 \times 10^7$ | 0.42 | $4.13 \times 10^7$ | 0.12 |
| 20 | $9.05 \times 10^5$ | 0.12 | $3.60 \times 10^5$ | 0.15 | $3.53 \times 10^5$ | 0.46 | $8.32 \times 10^5$ | 0.74 | $7.14 \times 10^6$ | 0.68 | $3.49 \times 10^7$ | 0.15 |
| 30 | $8.89 \times 10^5$ | 0.13 | $3.43 \times 10^5$ | 0.15 | $2.92 \times 10^5$ | 0.40 | $4.76 \times 10^5$ | 0.66 | $3.17 \times 10^6$ | 0.89 | $2.70 \times 10^7$ | 0.21 |
| 40 | $8.40 \times 10^5$ | 0.17 | $3.20 \times 10^5$ | 0.16 | $2.52 \times 10^5$ | 0.35 | $3.08 \times 10^5$ | 0.57 | $1.30 \times 10^6$ | 1.05 | $1.92 \times 10^7$ | 0.29 |
| 50 | $7.54 \times 10^5$ | 0.21 | $2.94 \times 10^5$ | 0.19 | $2.24 \times 10^5$ | 0.31 | $2.21 \times 10^5$ | 0.48 | $5.60 \times 10^5$ | 1.10 | $1.08 \times 10^7$ | 0.46 |
| 60 | $6.47 \times 10^5$ | 0.26 | $2.72 \times 10^5$ | 0.25 | $2.02 \times 10^5$ | 0.28 | $1.72 \times 10^5$ | 0.40 | $2.71 \times 10^5$ | 1.04 | $5.16 \times 10^6$ | 0.70 |
| 70 | $5.37 \times 10^5$ | 0.30 | $2.59 \times 10^5$ | 0.28 | $1.82 \times 10^5$ | 0.25 | $1.43 \times 10^5$ | 0.33 | $1.50 \times 10^5$ | 0.93 | $2.23 \times 10^6$ | 0.95 |
| 80 | $4.44 \times 10^5$ | 0.32 | $2.59 \times 10^5$ | 0.24 | $1.65 \times 10^5$ | 0.25 | $1.27 \times 10^5$ | 0.29 | $9.64 \times 10^4$ | 0.77 | $9.10 \times 10^5$ | 1.18 |
| 90 | $3.71 \times 10^5$ | 0.33 | $2.34 \times 10^5$ | 0.21 | $1.47 \times 10^5$ | 0.24 | $1.14 \times 10^5$ | 0.27 | $7.13 \times 10^4$ | 0.63 | $3.68 \times 10^5$ | 1.32 |
| 100 | $3.12 \times 10^5$ | 0.34 | $2.08 \times 10^5$ | 0.21 | $1.32 \times 10^5$ | 0.25 | $1.03 \times 10^5$ | 0.27 | $5.63 \times 10^4$ | 0.50 | $1.68 \times 10^5$ | 1.33 |
| 130 | $1.84 \times 10^5$ | 0.40 | $1.49 \times 10^5$ | 0.22 | $8.36 \times 10^4$ | 0.28 | $6.88 \times 10^4$ | 0.33 | $3.73 \times 10^4$ | 0.28 | $3.65 \times 10^4$ | 0.92 |
| 140 | $1.53 \times 10^5$ | 0.41 | $1.38 \times 10^5$ | 0.21 | $7.11 \times 10^4$ | 0.30 | $5.68 \times 10^4$ | 0.34 | $3.48 \times 10^4$ | 0.26 | $2.66 \times 10^4$ | 0.75 |
| 150 | $1.26 \times 10^5$ | 0.42 | $1.24 \times 10^5$ | 0.20 | $5.93 \times 10^4$ | 0.32 | $4.82 \times 10^4$ | 0.37 | $2.82 \times 10^4$ | 0.28 | $1.98 \times 10^4$ | 0.60 |
| 160 | $9.74 \times 10^4$ | 0.43 | $1.13 \times 10^5$ | 0.19 | $4.79 \times 10^4$ | 0.35 | $3.77 \times 10^4$ | 0.41 | $2.36 \times 10^4$ | 0.31 | $1.48 \times 10^4$ | 0.56 |
| 170 | $7.57 \times 10^4$ | 0.48 | $1.04 \times 10^5$ | 0.18 | $3.79 \times 10^4$ | 0.38 | $3.13 \times 10^4$ | 0.44 | $1.60 \times 10^4$ | 0.32 | $1.29 \times 10^4$ | 0.40 |
| 180 | $5.83 \times 10^4$ | 0.52 | $9.39 \times 10^4$ | 0.18 | $2.79 \times 10^4$ | 0.38 | $2.72 \times 10^4$ | 0.40 | $1.36 \times 10^4$ | 0.27 | $8.85 \times 10^3$ | 0.44 |
| 190 | — | — | — | — | — | — | $1.99 \times 10^4$ | 0.32 | — | — | $6.02 \times 10^3$ | 0.35 |

As can be seen from the data in Table 16, increasing amounts of silicate resin in Examples 93 to 98, i.e., 20, 30, 40, 50, 60, and 70 weight percent, respectively, caused the useful temperature ranges to increase and broaden from —64 to —52° C. in Example 93 to 49 to 91° C. in Example 98. Examples 93 and 98 were also evaluated as heat activated adhesives and afforded stress at break values of 1.00 MN/M$^2$ and 1.47 MN/m$^2$, respectively.

Examples 99–100

In Example 99, a homogeneous mixture of 25 parts Polydimethylsiloxane Diamine E, Lot 1, molecular weight 58,700, and 75 parts Polydimethylsiloxane Diamine A, lot 1, molecular weight 5,280, was fed at a rate of 15.9 g/min (0.00233 mol/min) into the first zone of a Leistritz 34 mm diameter counter-rotating twin screw extruder. Dried SR-545 MQ silicate resin, prepared from SR-545 MQ silicate resin solution which was dried to about 13 percent toluene by evaporation of the toluene from the SR-545 resin solution for 4 day, then further drying under vacuum at 55° C. for 16 hours, was fed at a rate of 15.7 g/min into the second zone of the extruder. Methylenedicyclohexylene-4, 4'-diisocyanate was fed at a rate of 0.65 g/min (0.00248 mol/min) into the sixth zone of the extruder. The extruder was outfitted with fully intermeshing screws throughout, and the screws were rotating at 50 revolutions per minute. The temperature profile for each of the 120 mm long zones was: zone 1—25° C.; zones 2 and 3—35° C.; zones 4 and 5—50° C.; zone 6—86° C.; zone 7—150° C.; zone 8—170° C.; zones 9 and 10—180° C.; and endcap—170° C. The vibration damping material was cooled and collected. Subsequently, the polydimethylsiloxane polyurea segmented copolymer-based vibration damping material was melt pressed between parallel ⅛ inch thick aluminum plates, lined with release liner, at 160° C. to shape the vibration damping material.

In Example 100, 25 parts of the polydimethylsiloxane polyurea segmented copolymer-based vibration damping material of Example 99 and 25 parts of 70:30 parts toluene:isopropanol were slowly agitated in a glass jar until homogeneous. The solution was coated onto a release liner and dried to shape the vibration damping material.

The storage modulus, G', and loss factor, tan δ, measured at 1 Hz are set forth in Table 17.

TABLE 17

| Temp | Example 99 | | Example 100 | |
|---|---|---|---|---|
| (° C.) | G' (Pa) | Tan δ | G' (Pa) | Tan δ |
| −90 | $6.88 \times 10^7$ | 0.05 | $7.89 \times 10^7$ | 0.07 |
| −80 | $6.22 \times 10^7$ | 0.06 | $6.96 \times 10^7$ | 0.08 |
| −70 | $5.06 \times 10^7$ | 0.11 | $5.61 \times 10^7$ | 0.11 |
| −60 | $4.11 \times 10^7$ | 0.15 | $4.42 \times 10^7$ | 0.16 |
| −50 | $3.35 \times 10^7$ | 0.19 | $3.53 \times 10^7$ | 0.19 |
| −40 | $2.49 \times 10^7$ | 0.24 | $2.69 \times 10^7$ | 0.24 |
| −30 | $1.66 \times 10^7$ | 0.31 | $1.94 \times 10^7$ | 0.30 |
| −20 | $1.04 \times 10^7$ | 0.40 | $1.39 \times 10^7$ | 0.35 |
| −10 | $6.92 \times 10^6$ | 0.46 | $9.41 \times 10^6$ | 0.42 |
| 0 | $4.87 \times 10^6$ | 0.49 | $6.64 \times 10^6$ | 0.45 |
| 10 | $3.57 \times 10^6$ | 0.48 | $4.95 \times 10^6$ | 0.45 |
| 20 | $2.68 \times 10^6$ | 0.47 | $3.56 \times 10^6$ | 0.45 |
| 30 | $1.97 \times 10^6$ | 0.46 | $2.63 \times 10^6$ | 0.45 |
| 40 | $1.48 \times 10^6$ | 0.45 | $1.94 \times 10^6$ | 0.44 |
| 50 | $1.11 \times 10^6$ | 0.44 | $1.44 \times 10^6$ | 0.43 |
| 60 | $8.32 \times 10^5$ | 0.44 | $1.07 \times 10^6$ | 0.43 |
| 70 | $6.28 \times 10^5$ | 0.45 | $7.96 \times 10^5$ | 0.42 |
| 80 | $4.86 \times 10^5$ | 0.45 | $6.04 \times 10^5$ | 0.42 |
| 90 | $3.83 \times 10^5$ | 0.46 | $4.68 \times 10^5$ | 0.42 |
| 100 | $3.03 \times 10^5$ | 0.46 | $3.75 \times 10^5$ | 0.42 |
| 110 | $2.46 \times 10^5$ | 0.47 | $3.08 \times 10^5$ | 0.41 |
| 120 | $2.02 \times 10^5$ | 0.45 | $2.56 \times 10^5$ | 0.41 |
| 130 | $1.62 \times 10^5$ | 0.50 | $2.15 \times 10^5$ | 0.42 |
| 140 | $1.31 \times 10^5$ | 0.55 | $1.76 \times 10^5$ | 0.44 |
| 150 | $1.02 \times 10^5$ | 0.60 | $1.44 \times 10^5$ | 0.47 |
| 160 | $7.47 \times 10^4$ | 0.66 | $1.11 \times 10^5$ | 0.51 |
| 170 | $5.19 \times 10^4$ | 0.75 | $8.10 \times 10^4$ | 0.56 |

TABLE 17-continued

| Temp | Example 99 | | Example 100 | |
|---|---|---|---|---|
| (° C.) | G' (Pa) | Tan δ | G' (Pa) | Tan δ |
| 180 | $3.45 \times 10^4$ | 0.84 | $5.62 \times 10^4$ | 0.63 |
| 190 | — | — | — | — |

Table 17 shows that vibration damping compositions of the present invention used from an extruder, or resolvated and cast from solvent provide de similar broad useful temperature ranges, i.e., —10 to 94° C. for Example 99 and —2 to 104° C. for Example 100.

Example 101

In Example 101, 25.0 parts Polydimethylsiloxane Polyurea Segmented Copolymer I, 39.7 parts SR-545 MQ solution, and 35.3 parts of 70:30 parts toluene isopropanol were slowly agitated in a glass jar until homogeneous. The solution was coated onto a release liner and dried to form a vibration damping material.

The storage modulus, G', and loss factor, tan δ, measured at 1 Hz for Example 101 are set forth in Table 18.

TABLE 18

| Temp. | Example 101 | |
|---|---|---|
| (° C.) | G' (Pa) | Tan δ |
| −90 | $7.60 \times 10^7$ | 0.04 |
| −80 | $6.83 \times 10^7$ | 0.05 |
| −70 | $5.76 \times 10^7$ | 0.10 |
| −60 | $4.92 \times 10^7$ | 0.14 |
| −50 | $4.04 \times 10^7$ | 0.18 |
| −40 | $2.96 \times 10^7$ | 0.26 |
| −30 | $1.83 \times 10^7$ | 0.40 |
| −20 | $9.47 \times 10^6$ | 0.57 |
| −10 | $5.40 \times 10^6$ | 0.67 |
| 0 | $3.22 \times 10^6$ | 0.70 |
| 10 | $2.09 \times 10^6$ | 0.68 |
| 20 | $1.40 \times 10^6$ | 0.65 |
| 30 | $9.41 \times 10^5$ | 0.60 |
| 40 | $6.51 \times 10^5$ | 0.54 |
| 50 | $4.80 \times 10^5$ | 0.49 |
| 60 | $3.66 \times 10^5$ | 0.44 |
| 70 | $2.90 \times 10^5$ | 0.41 |
| 80 | $2.44 \times 10^5$ | 0.38 |
| 90 | $2.12 \times 10^5$ | 0.36 |

TABLE 18-continued

| Temp. | Example 101 | |
|---|---|---|
| (° C.) | G' (Pa) | Tan δ |
| 100 | $1.87 \times 10^5$ | 0.34 |
| 110 | $1.70 \times 10^5$ | 0.34 |
| 120 | $1.56 \times 10^5$ | 0.33 |
| 130 | $1.41 \times 10^5$ | 0.33 |
| 140 | $1.26 \times 10^5$ | 0.35 |
| 150 | $1.08 \times 10^4$ | 0.38 |
| 160 | $8.91 \times 10^4$ | 0.42 |
| 170 | $6.99 \times 10^4$ | 0.46 |
| 180 | $4.41 \times 10^4$ | 0.52 |
| 190 | $2.52 \times 10^4$ | 0.60 |

The data in Table 18 demonstrates that vibration damping compositions of the present invention, formulated using a polydimethylsiloxane polyurea segmented copolymer prepared using a blend of six polydimethylsiloxane diamines having molecular weights of from 5280 to 105,000, with a calculated average molecular weight of 17,600, can provide a composition having a useful temperature range of from 31 to 72° C.

Examples 102–104

In Example 102, 8 parts Polydimethylsiloxane Polyurea Segmented Copolymer C, 12 parts dried SR-545 MQ resin, dried as in Examples 96–98, and 80 parts of 70:30 parts toluene:isopropanol were slowly agitated in a glass jar until homogeneous. Then 1.6 parts hydrophilic silica (CAB-O-SIL™ M-5, available from Cabot Corp., Boston, Mass.) were added and the solution was stirred with an air stirrer for 4 hours. In Example 103, a solution was prepared as in Example 102 except the amounts of Copolymer C and MQ resin were twice that of Example 102 and 7.1 parts hydrophobic silica (AEROSIL™, available from Degussa Corp., Teterboro, N.J.) were substituted for the hydrophilic silica. In Example 104, a solution was prepared as in Example 102 except 8.6 parts ground calcium carbonate (CAMEL-KOTE™, available from Jenstar Stone Products C., Hunt Valley, Md.) were substituted for the hydrophilic silica.

Each solution was coated onto a release liner and dried to form a vibration damping material. The storage modulus and loss factor were determined for each sample. The results are set forth in Table 19 together with those for Example 87, a similar composition having no filler.

TABLE 19

| Temp | Example 87 | | Example 102 | | Example 103 | | Example 104 | |
|---|---|---|---|---|---|---|---|---|
| (° C.) | G'(Pa) | Tanδ | G'(Pa) | Tanδ | G'(Pa) | Tanδ | G'(Pa) | Tanδ |
| −90 | $1.00 \times 10^8$ | 0.03 | $6.06 \times 10^7$ | 0.02 | $1.01 \times 10^8$ | 0.03 | $6.79 \times 10^7$ | 0.02 |
| −80 | $9.35 \times 10^7$ | 0.03 | $5.65 \times 10^7$ | 0.02 | $9.33 \times 10^7$ | 0.04 | $6.49 \times 10^7$ | 0.02 |
| −70 | $8.44 \times 10^7$ | 0.05 | $5.27 \times 10^7$ | 0.04 | $8.49 \times 10^7$ | 0.06 | $6.13 \times 10^7$ | 0.04 |
| −60 | $7.63 \times 10^7$ | 0.07 | $5.10 \times 10^7$ | 0.06 | $7.83 \times 10^7$ | 0.07 | $5.82 \times 10^7$ | 0.05 |
| −50 | $6.92 \times 10^7$ | 0.08 | $5.02 \times 10^7$ | 0.07 | $7.21 \times 10^7$ | 0.07 | $5.51 \times 10^7$ | 0.06 |
| −40 | $6.18 \times 10^7$ | 0.11 | $4.77 \times 10^7$ | 0.08 | $6.60 \times 10^7$ | 0.08 | $5.13 \times 10^7$ | 0.07 |
| −30 | $5.16 \times 10^7$ | 0.15 | $4.47 \times 10^7$ | 0.10 | $5.87 \times 10^7$ | 0.11 | $4.65 \times 10^7$ | 0.10 |
| −20 | $4.36 \times 10^7$ | 0.19 | $4.12 \times 10^7$ | 0.11 | $5.18 \times 10^7$ | 0.13 | $4.1 \times 10^7$ | 0.13 |
| −10 | $3.57 \times 10^7$ | 0.24 | $3.63 \times 10^7$ | 0.15 | $4.44 \times 10^7$ | 0.17 | $3.45 \times 10^7$ | 0.19 |
| 0 | $2.55 \times 10^7$ | 0.34 | $2.95 \times 10^7$ | 0.22 | $3.56 \times 10^7$ | 0.22 | $2.54 \times 10^7$ | 0.30 |
| 10 | $1.56 \times 10^7$ | 0.51 | $2.20 \times 10^7$ | 0.32 | $2.72 \times 10^7$ | 0.29 | $1.62 \times 10^7$ | 0.46 |
| 20 | $7.92 \times 10^6$ | 0.73 | $1.41 \times 10^7$ | 0.48 | $1.83 \times 10^7$ | 0.40 | $8.81 \times 10^6$ | 0.66 |
| 30 | $4.49 \times 10^6$ | 0.83 | $7.55 \times 10^6$ | 0.68 | $1.10 \times 10^7$ | 0.52 | $4.70 \times 10^6$ | 0.79 |
| 40 | $2.42 \times 10^6$ | 0.88 | $3.83 \times 10^6$ | 0.82 | $6.89 \times 10^6$ | 0.60 | $2.98 \times 10^6$ | 0.80 |
| 50 | $1.34 \times 10^6$ | 0.89 | $2.41 \times 10^6$ | 0.82 | $4.55 \times 10^6$ | 0.62 | $1.92 \times 10^6$ | 0.78 |

TABLE 19-continued

| Temp | Example 87 | | Example 102 | | Example 103 | | Example 104 | |
|---|---|---|---|---|---|---|---|---|
| (° C.) | G'(Pa) | Tanδ | G'(Pa) | Tanδ | G'(Pa) | Tanδ | G'(Pa) | Tanδ |
| 60 | 7.42 × 10$^5$ | 0.84 | 1.58 × 10$^6$ | 0.79 | 2.99 × 10$^6$ | 0.62 | 1.24 × 10$^6$ | 0.75 |
| 70 | 4.29 × 10$^5$ | 0.78 | 1.07 × 10$^6$ | 0.74 | 2.06 × 10$^6$ | 0.59 | 8.35 × 10$^5$ | 0.70 |
| 80 | 2.71 × 10$^5$ | 0.70 | 7.26 × 10$^5$ | 0.67 | 1.47 × 10$^6$ | 0.54 | 5.66 × 10$^5$ | 0.66 |
| 90 | 1.87 × 10$^5$ | 0.62 | 5.33 × 10$^5$ | 0.60 | 1.13 × 10$^6$ | 0.48 | 3.87 × 10$^5$ | 0.63 |
| 100 | 1.43 × 10$^5$ | 0.56 | 4.08 × 10$^5$ | 0.53 | 8.79 × 10$^5$ | 0.44 | 2.77 × 10$^5$ | 0.59 |
| 110 | 1.14 × 10$^5$ | 0.50 | 3.25 × 10$^5$ | 0.49 | 7.46 × 10$^5$ | 0.39 | 2.07 × 10$^5$ | 0.56 |
| 120 | 9.48 × 10$^4$ | 0.46 | 2.56 × 10$^5$ | 0.47 | 6.29 × 10$^5$ | 0.37 | 1.61 × 10$^5$ | 0.54 |
| 130 | 8.19 × 10$^4$ | 0.45 | 2.01 × 10$^5$ | 0.49 | 5.36 × 10$^5$ | 0.37 | 1.25 × 10$^5$ | 0.53 |
| 140 | 6.80 × 10$^4$ | 0.45 | 1.50 × 10$^5$ | 0.52 | 4.72 × 10$^5$ | 0.37 | 9.52 × 10$^4$ | 0.53 |
| 150 | 5.49 × 10$^4$ | 0.46 | 1.07 × 10$^5$ | 0.59 | 3.93 × 10$^5$ | 0.39 | 7.20 × 10$^4$ | 0.57 |
| 160 | 4.05 × 10$^4$ | 0.53 | 6.89 × 10$^4$ | 0.68 | 3.15 × 10$^5$ | 0.42 | 5.22 × 10$^4$ | 0.62 |
| 170 | 2.73 × 10$^4$ | 0.56 | 4.20 × 10$^4$ | 0.81 | 2.52 × 10$^5$ | 0.45 | 3.35 × 10$^4$ | 0.71 |
| 180 | 1.46 × 10$^4$ | 0.73 | 2.13 × 10$^4$ | 0.99 | 2.10 × 10$^5$ | 0.46 | 1.68 × 10$^4$ | 0.89 |
| 190 | — | — | 9.66 × 10$^4$ | 1.21 | — | — | — | — |

The results in Table 19 demonstrate that the addition of filler increases the upper end of the useful temperature range from 22 to 74° C. for Example 87 with no filler, 31 to 107° C. with hydrophilic silica, 40 to 109° C. with hydrophobic silica and 24 to 93 with calcium carbonate. The addition of these fillers would also be expected to the cost of these vibration damping materials. Example 103 was also evaluated as a heat activated adhesive and afforded a stress at break value of 0.97 MN/m$^2$.

Example 105

In Example 105, 66.7 parts Polydimethylsiloxane Polyurea Segmented Copolymer J solution, prepared using solvent polymerization, 23.8 parts SR-545 MQ silicate resin solution, and 9.5 parts of 70:30 parts toluene:isopropanol were slowly agitate in a glass jar until homogeneous. The solution was coated onto a release liner and dried to form a vibration damping material.

The storage modulus and loss factor measured at 1 Hz for Example 105 are set forth in Table 20.

TABLE 20

| | Example 105 | |
|---|---|---|
| Temp (° C.) | G' (Pa) | Tan δ |
| −90 | 6.68 × 10$^7$ | 0.02 |
| −80 | 6.40 × 10$^7$ | 0.02 |
| −70 | 5.91 × 10$^7$ | 0.04 |
| −60 | 5.37 × 10$^7$ | 0.06 |
| −50 | 5.02 × 10$^7$ | 0.07 |
| −40 | 4.56 × 10$^7$ | 0.10 |
| −30 | 4.04 × 10$^7$ | 0.12 |
| −20 | 3.42 × 10$^7$ | 0.17 |
| −10 | 2.91 × 10$^7$ | 0.21 |
| 0 | 2.19 × 10$^7$ | 0.30 |
| 10 | 1.48 × 10$^7$ | 0.43 |
| 20 | 8.48 × 10$^6$ | 0.63 |
| 30 | 4.25 × 10$^6$ | 0.83 |
| 40 | 2.31 × 10$^6$ | 0.92 |
| 50 | 1.21 × 10$^6$ | 0.98 |
| 60 | 6.50 × 10$^5$ | 0.97 |
| 70 | 3.65 × 10$^5$ | 0.89 |
| 80 | 2.28 × 10$^5$ | 0.77 |
| 90 | 1.62 × 10$^5$ | 0.66 |
| 100 | 1.25 × 10$^5$ | 0.60 |
| 110 | 9.97 × 10$^4$ | 0.55 |
| 120 | 7.99 × 10$^4$ | 0.54 |
| 130 | 6.32 × 10$^4$ | 0.54 |
| 140 | 4.91 × 10$^4$ | 0.57 |
| 150 | 3.67 × 10$^4$ | 0.61 |
| 160 | 2.65 × 10$^4$ | 0.65 |
| 170 | 1.68 × 10$^4$ | 0.74 |

The data in Table 20 demonstrates that a vibration damping composition of the present invention, formulated using a polydimethylsiloxane polyurea segmented copolymer prepared by a solvent process provides a composition having a useful temperature range of 23 to 71° C.

Examples 106–109

In Example 106, 12.6 parts of the polydimethylsiloxane polyurea segmented copolymer-based vibration damping material of Example 99, 7.6 parts SR-545 MQ silicate resin solution, 9.0 parts Polydimethylsiloxane Oligourea Segmented Copolymer A, and 70.8 parts of 70:30 parts toluene:isopropanol were slowly agitated in a glass jar until homogeneous. The solution was coated onto a release liner and dried. In Example 107, a solution was prepared as in Example 106 except 6.8 parts Polydimethylsiloxane Oligourea Segmented Copolymer B were substituted for the parts Polydimethylsiloxane Oligourea Segmented Copolymer A and 73.0 parts toluene:isopropanol were used. In Example 108, a solution was prepared as in Example 106 except 9.0 parts Polydimethylsiloxane Oligourea Segmented Copolymer C were substituted for the Polydimethylsiloxane Oligourea Segmented Copolymer A. In Example 109, a solution was prepared as in Example 106 except no polydimethylsiloxane oligourea segmented copolymer was added.

Each solution was coated onto a release liner and dried to form vibration damping material. The storage modulus, G', and loss factor, measured at 1 Hz, were determined for each material. The results are set forth in Table 210.

TABLE 21

| Temp (° C.) | Example 87 G'(Pa) | Tanδ | Example 107 G'(Pa) | Tanδ | Example 108 G'(Pa) | Tanδ | Example 109 G'(Pa) | Tanδ |
|---|---|---|---|---|---|---|---|---|
| −90 | $5.11 \times 10^7$ | 0.03 | $6.30 \times 10^7$ | 0.03 | $5.34 \times 10^7$ | 0.04 | $7.16 \times 10^7$ | 0.03 |
| −80 | $4.73 \times 10^7$ | 0.03 | $5.78 \times 10^7$ | 0.04 | $5.03 \times 10^7$ | 0.04 | $6.34 \times 10^7$ | 0.03 |
| −70 | $4.34 \times 10^7$ | 0.04 | $4.96 \times 10^7$ | 0.07 | $4.57 \times 10^7$ | 0.05 | $5.24 \times 10^7$ | 0.04 |
| −60 | $3.81 \times 10^7$ | 0.06 | $4.41 \times 10^7$ | 0.09 | $4.12 \times 10^7$ | 0.06 | $4.44 \times 10^7$ | 0.06 |
| −50 | $3.28 \times 10^7$ | 0.10 | $3.99 \times 10^7$ | 0.10 | $3.62 \times 10^7$ | 0.08 | $3.86 \times 10^7$ | 0.10 |
| −40 | $2.76 \times 10^7$ | 0.13 | $3.63 \times 10^7$ | 0.12 | $3.07 \times 10^7$ | 0.12 | $3.27 \times 10^7$ | 0.13 |
| −30 | $2.30 \times 10^7$ | 0.17 | $3.15 \times 10^7$ | 0.15 | $2.58 \times 10^7$ | 0.16 | $2.65 \times 10^7$ | 0.17 |
| −20 | $1.92 \times 10^7$ | 0.21 | $2.69 \times 10^7$ | 0.18 | $2.21 \times 10^7$ | 0.20 | $2.18 \times 10^7$ | 0.21 |
| −10 | $1.43 \times 10^7$ | 0.27 | $1.97 \times 10^7$ | 0.26 | $1.59 \times 10^7$ | 0.28 | $1.48 \times 10^7$ | 0.27 |
| 0 | $9.83 \times 10^6$ | 0.37 | $1.38 \times 10^7$ | 0.35 | $1.12 \times 10^7$ | 0.36 | $1.01 \times 10^7$ | 0.37 |
| 10 | $6.02 \times 10^6$ | 0.47 | $9.16 \times 10^6$ | 0.46 | $7.62 \times 10^6$ | 0.45 | $7.49 \times 10^6$ | 0.47 |
| 20 | $3.89 \times 10^6$ | 0.57 | $5.86 \times 10^6$ | 0.56 | $5.29 \times 10^6$ | 0.51 | $5.15 \times 10^6$ | 0.57 |
| 30 | $2.79 \times 10^6$ | 0.60 | $4.02 \times 10^6$ | 0.62 | $3.70 \times 10^6$ | 0.56 | $3.57 \times 10^6$ | 0.60 |
| 40 | $1.95 \times 10^6$ | 0.64 | $2.83 \times 10^6$ | 0.65 | $2.54 \times 10^6$ | 0.58 | $2.47 \times 10^6$ | 0.64 |
| 50 | $1.25 \times 10^6$ | 0.66 | $1.7 \times 10^6$ | 0.69 | $1.70 \times 10^6$ | 0.61 | $1.66 \times 10^6$ | 0.66 |
| 60 | $7.97 \times 10^5$ | 0.66 | $1.14 \times 10^6$ | 0.71 | $1.11 \times 10^6$ | 0.62 | $1.11 \times 10^6$ | 0.66 |
| 70 | $5.34 \times 10^5$ | 0.67 | $6.88 \times 10^5$ | 0.72 | $7.27 \times 10^5$ | 0.62 | $7.31 \times 10^5$ | 0.67 |
| 80 | $3.20 \times 10^5$ | 0.67 | $4.27 \times 10^5$ | 0.72 | $4.70 \times 10^5$ | 0.63 | $5.00 \times 10^5$ | 0.67 |
| 90 | $2.24 \times 10^5$ | 0.66 | $2.68 \times 10^5$ | 0.72 | $3.08 \times 10^5$ | 0.63 | $3.55 \times 10^5$ | 0.66 |
| 100 | $1.55 \times 10^5$ | 0.65 | $1.77 \times 10^5$ | 0.70 | $2.10 \times 10^5$ | 0.63 | $2.64 \times 10^5$ | 0.65 |
| 110 | $1.09 \times 10^5$ | 0.65 | $1.24 \times 10^5$ | 0.68 | $1.50 \times 10^5$ | 0.63 | $2.04 \times 10^5$ | 0.65 |
| 120 | $7.73 \times 10^4$ | 0.66 | $9.03 \times 10^4$ | 0.67 | $1.11 \times 10^5$ | 0.63 | $1.62 \times 10^5$ | 0.66 |
| 130 | $5.62 \times 10^4$ | 0.68 | $6.63 \times 10^4$ | 0.68 | $8.40 \times 10^4$ | 0.64 | $1.25 \times 10^5$ | 0.68 |
| 140 | $3.93 \times 10^4$ | 0.72 | $4.75 \times 10^4$ | 0.69 | $6.13 \times 10^4$ | 0.67 | $1.03 \times 10^5$ | 0.72 |
| 150 | $2.72 \times 10^4$ | 0.79 | $3.42 \times 10^4$ | 0.75 | $4.46 \times 10^4$ | 0.74 | $7.91 \times 10^4$ | 0.79 |
| 160 | $1.84 \times 10^4$ | 0.86 | $2.36 \times 10^4$ | 0.82 | $3.04 \times 10^4$ | 0.81 | $5.86 \times 10^4$ | 0.86 |
| 170 | $1.28 \times 10^4$ | 0.90 | $1.50 \times 10^4$ | 0.92 | $2.08 \times 10^4$ | 0.88 | $4.16 \times 10^4$ | 0.90 |
| 180 | $8.18 \times 10^3$ | 1.02 | $1.10 \times 10^4$ | — | $1.48 \times 10^4$ | 0.90 | $2.86 \times 10^4$ | 1.02 |
| 190 | $1.12 \times 10^0$ | 1.02 | $7.59 \times 10^3$ | — | $1.05 \times 10^4$ | 0.92 | — | — |

The data in Table 21 demonstrate that addition of polydimethylsiloxane oligourea segmented copolymers to compositions containing polydimethylsiloxane polyurea segmented copolymers, silicate resin, toluene and isopropanol, provides vibration damping compositions having similar useful temperature ranges of 8 to 79° C., 6 to 85° C. 13 to 87° C. and 2 to 91° C., respectively, for Examples 106–109. Example 106 was also evaluated as a heat activated adhesive and afforded a stress at break value of 95 MN/r².

Example 10

Example 110, methylenedicyclohexylene-4,4'-diisocyanate at a rate of in (0.000025 mol/min) and Polydimethylsiloxane Diamine E, Lot 1, molecular weight 58,700, at a rate of 2.0 g/min (0.000034 mol/min) were fed into the first zone of a Leistritz 18 mm diameter twin screw extruder. MQD silicate resin (MQR-32-3, 70 weight percent in toluene, available from Shin-Etsu Silicones of America, Inc., Torrance, Calif.), the toluene from the solution having been previously evaporated, was fed at 7.7 g/min into the second zone of the extruder. The extruder was used in co-rotating mode with double-start fully intermeshing screws throughout the entire length of the barrel, rotating at 75 revolutions per minute. The temperature profile for each of the 90 mm long zones was: zones 1 and 2—22° C.; zone 3—50° C.; zone 4—100° C.; zone 5—140° C.; zones 6 and 7—180° C.; and zone 8 and endcap—200° C.; cooled in air and collected. Subsequently, the polydimethylsiloxane polyurea segmented copolymer-based vibration damper material parallels melt pressed between parallel 3.2 mm (⅛ in) thick aluminum plates, lined with released liner, at 160° C.

The storage modulus and loss factor data measured at 1 Hz are set forth in Table 22.

TABLE 22

| Temp (° C.) | Example 110 G' (Pa) | Tan δ |
|---|---|---|
| −90 | $6.76 \times 10^7$ | 0.01 |
| −80 | $6.57 \times 10^7$ | 0.01 |
| −70 | $6.34 \times 10^7$ | 0.02 |
| −60 | $6.08 \times 10^7$ | 0.03 |
| −50 | $5.84 \times 10^7$ | 0.04 |
| −40 | $5.61 \times 10^7$ | 0.04 |
| −30 | $5.40 \times 10^7$ | 0.05 |
| −20 | $5.13 \times 10^7$ | 0.06 |
| −10 | $4.72 \times 10^7$ | 0.07 |
| 0 | $4.30 \times 10^7$ | 0.09 |
| 10 | $3.80 \times 10^7$ | 0.12 |
| 20 | $3.21 \times 10^7$ | 0.16 |
| 30 | $2.58 \times 10^7$ | 0.20 |
| 40 | $1.90 \times 10^7$ | 0.29 |
| 50 | $1.09 \times 10^7$ | 0.49 |
| 60 | $4.54 \times 10^6$ | 0.81 |
| 70 | $1.88 \times 10^6$ | 1.08 |
| 80 | $8.01 \times 10^5$ | 1.35 |
| 90 | $3.25 \times 10^5$ | 1.67 |
| 100 | $1.31 \times 10^5$ | 2.10 |
| 110 | $4.80 \times 10^4$ | 2.60 |
| 120 | $1.74 \times 10^4$ | 2.99 |
| 130 | $8.36 \times 10^3$ | 2.49 |
| 140 | $5.08 \times 10^3$ | 1.69 |

The data in Table 22 demonstrate that a vibration damping composition formulated using 80 weight percent of an MQD silicate resin provides a vibration damping composition having a useful temperature range of 55 to 89° C.

Example 111

In Example 111, 95 parts by weight Polydimethylsiloxane Diamine A, Lot 1, 5,280 molecular weight, was blended well with 5 parts by weight AEROSIL™ R-972 fumed silica.

Incorporated air bubbles were allowed to degas overnight. MQ resin containing about 0.1% toluene, obtained from GE Silicones, Inc. as experimental material, and further dried under vacuum for 16 hours at 55° C., was dried in a vacuum oven overnight at 50° C. to lower the toluene content to less than 0.1%. This dried MQ resin was fed at a rate of 93.6 g/min into the first zone of a Berstorff 40 mm diameter 1600 mm long corotating twin screw extruder. The polydimethylsiloxane diamine/fumed silica mixture was injected into zone two at a rate of 59.5 g/min (0.0107 mol diamine/min). Dicyclohexylmethane-4,4'-diisocyanate was fed at a rate of 2.95 g/min (0.0113 mol/min) into zone five to provide an NCO:NH2 ratio of 1.06:1. Double-start fully intermeshing screws were used throughout the entire length of the barrel, rotating at 225 revolutions per minute. The temperature profile for each of the 160 mm long zones was: zone 1—30° C.; zone 2—53 ° C.; zone 3—57° C.; zone 4—58° C.; zone 5—74° C.; zone 6—125° C.; zone 7—68° C.; zones 8, 9, 10, endcap, and melt pump —200° C. Vacuum was pulled on zone 8. The thus-prepared vibration damping material exiting the extruder was collected in a square aluminum frame, measuring about 330 mm per side and having a depth of about 19 mm, lined with fluorosilicone coated 50. 8 $\mu$m polyethylene terephthalate-based release liner, and allowed to cool to room temperature.

A bi-directional vibration damper was constructed using this composition. The release liners were removed and the slab was cut into 4 pieces 165 mm×165 mm. The pieces were stacked atop one another, between pieces of polyethylene terephthalate-based release liner described above, and pressed in a heated platen press with gap set at 19 mm for 10 minutes at 127° C. The sample was removed from the press, allowed to cool to room temperature, and placed in a vacuum oven at 80° C. at a pressure of 0.25 mm Hg for 16 hours to degas the sample. Immediately after degassing, the release liners were removed from the sample, replaced with two new release liners, the sample was placed back in the platen press with gap set at 13.4 mm for 60 minutes at 127° C., and then removed from the press. Release liners were once again removed and replaced with new release liners, and the sample was pressed an additional 3 hours at 127° C. with a gap of 13.4 mm. The flat bubble free slab was removed from the press and allowed to cool to room temperature. Release liners were removed from the slab and the broad faces of the slab were abraded with a SCOTCH-BRITE™ #7447 Hand Pad, available from 3M Company, St. Paul, Minn., to roughen the surface of the slab. Two square sections of vibration damping material measuring 38.1 mm per side and having a thickness of 12.7 mm were cut from this slab. A bidirectional damper, similar in appearance to FIG. 1, was constructed by bonding, using epoxy adhesive, vibration damping material 1 of FIG. 1, to a 4.7 mm thick cold rolled steel plate 2 and to members 3 *a* and 3 *b* of FIG. 1, that had been cleaned prior to assembly by sand blasting and solvent degreasing. The epoxy bonded bidirectional damping assembly was fixtured for 24 hours at room temperature to maintain parallelism between the steel members and the vibration damping material during epoxy cure.

The damper assembly was rigidly mounted in an MTS model number 312.21 hydraulically actuated closed loop feedback control testing machine fit with a temperature controlled chamber. The viscoelastic material was equilibrated at 24° C. and conditioned by cyclically deforming the viscoelastic material a total of 3 cycles at 50% strain and a frequency of 0.1 Hz. Three cycles of dynamic mechanical testing were then performed at temperatures of 0, 10, 21, and 36° C. at strains of 50% and 100% at each temperature. The storage modulus, G', and loss factor, tan δ, were determined at 1 Hz and are reported in Table 23.

TABLE 23

| | | Example 111 | |
|---|---|---|---|
| Temp (° C.) | Strain (%) | G' (Pa) | Tan δ |
| 0 | 50 | $1.45 \times 10^6$ | 1.60 |
| 10 | 50 | $1.10 \times 10^6$ | 1.88 |
| 21 | 50 | $9.52 \times 10^5$ | 1.81 |
| 36 | 50 | $7.11 \times 10^5$ | 1.71 |
| 0 | 100 | $6.90 \times 10^5$ | 1.80 |
| 10 | 100 | $6.21 \times 10^5$ | 1.90 |
| 21 | 100 | $5.38 \times 10^5$ | 1.88 |
| 36 | 100 | $4.37 \times 10^5$ | 1.75 |

The results in Table 23 demonstrate that the storage modulus and loss factor of this composition are high and relatively insensitive to changes in temperature. These are particularly desirable features of vibration damping materials employed in bi-directional damping constructions.

Examples 112 and 113

In Examples 112 and 113, the polydimethylsiloxane polyurea segmented copolymers of Examples 71 and 72, respectively were tested for vibration damping properties. The materials of Examples 112 and 113 were melt pressed between parallel aluminum plates as described in Example 99, with the exception that the press temperatures was 127° C. The storage modulus, G', and loss factor, tan δ, measured at 1 Hz were determined and are reported in Table 24. Example 112 was also evaluated as a heat activated adhesive and afforded a stress at break value of 0.45 MN/m².

TABLE 24

| Temp (° C.) | Example 112 | | Example 113 | |
|---|---|---|---|---|
| | G' (Pa) | Tan δ | G' (Pa) | Tan δ |
| −90 | $1.79 \times 10^7$ | 0.14 | $4.61 \times 10^7$ | 0.09 |
| −80 | $1.26 \times 10^7$ | 0.17 | $3.55 \times 10^7$ | 0.11 |
| −70 | $9.40 \times 10^6$ | 0.21 | $2.42 \times 10^7$ | 0.17 |
| −60 | $6.66 \times 10^6$ | 0.26 | $1.72 \times 10^7$ | 0.23 |
| −50 | $4.15 \times 10^6$ | 0.37 | $1.15 \times 10^7$ | 0.31 |
| −40 | $2.26 \times 10^6$ | 0.48 | $7.07 \times 10^6$ | 0.42 |
| −30 | $1.11 \times 10^6$ | 0.60 | $3.61 \times 10^6$ | 0.54 |
| −20 | $5.22 \times 10^5$ | 0.69 | $2.02 \times 10^6$ | 0.66 |
| −10 | $3.35 \times 10^5$ | 0.72 | $1.13 \times 10^6$ | 0.73 |
| 0 | $1.57 \times 10^5$ | 0.73 | $5.70 \times 10^5$ | 0.77 |
| 10 | $1.03 \times 10^5$ | 0.67 | $3.32 \times 10^5$ | 0.74 |
| 20 | $6.88 \times 10^4$ | 0.60 | $2.10 \times 10^5$ | 0.68 |
| 30 | $4.76 \times 10^4$ | 0.53 | $1.31 \times 10^5$ | 0.62 |
| 40 | $3.89 \times 10^4$ | 0.49 | $1.00 \times 10^5$ | 0.55 |
| 50 | $3.03 \times 10^4$ | 0.43 | $7.66 \times 10^4$ | 0.49 |
| 60 | $2.43 \times 10^4$ | 0.40 | $6.23 \times 10^4$ | 0.45 |
| 70 | $2.13 \times 10^4$ | 0.39 | $5.20 \times 10^4$ | 0.44 |
| 80 | $1.88 \times 10^4$ | 0.38 | $4.34 \times 10^4$ | 0.42 |
| 90 | $1.65 \times 10^4$ | 0.38 | $3.79 \times 10^4$ | 0.43 |
| 100 | $1.45 \times 10^4$ | 0.37 | $3.36 \times 10^4$ | 0.41 |
| 110 | $1.34 \times 10^4$ | 0.37 | $2.99 \times 10^4$ | 0.41 |
| 120 | $1.24 \times 10^4$ | 0.36 | $2.67 \times 10^4$ | 0.43 |
| 130 | $1.12 \times 10^4$ | 0.35 | $2.32 \times 10^4$ | 0.42 |
| 140 | $1.03 \times 10^4$ | 0.35 | $2.14 \times 10^4$ | 0.41 |
| 150 | $8.78 \times 10^3$ | 0.35 | $1.88 \times 10^4$ | 0.42 |
| 160 | $7.87 \times 10^3$ | 0.36 | $1.54 \times 10^4$ | 0.45 |
| 170 | $6.38 \times 10^3$ | 0.37 | $1.20 \times 10^4$ | 0.48 |
| 180 | $4.69 \times 10^3$ | 0.38 | $8.67 \times 10^4$ | 0.50 |
| 190 | $3.11 \times 10^3$ | 0.37 | — | — |

The data in Table 24 demostrate that the vibration damping materials of Examples 112 and 113, formulated using a blend of diisocyanate and triisocyanate, provide useful temperature ranges of of —20 to —11° C. and —38 to 8° C. respectively.

Example 114

In Example 114, the polydimethylsiloxane polyurea segmented copolymer of Example 73 was tested for vibration damping properties. The material was melt pressed between parallel aluminum plates as described in Example 112. The storage modulus, G', and loss factor, tan δ measured at 1 Hz were determined and are reported in able 25.

TABLE 25

| Temp | Example 114 | |
|---|---|---|
| (° C.) | G' (Pa) | Tan δ |
| −90 | $5.54 \times 10^7$ | 0.12 |
| −80 | $4.27 \times 10^7$ | 0.15 |
| −70 | $2.94 \times 10^7$ | 0.21 |
| −60 | $1.90 \times 10^7$ | 0.29 |
| −50 | $1.09 \times 10^7$ | 0.41 |
| −40 | $5.78 \times 10^6$ | 0.54 |
| −30 | $2.79 \times 10^6$ | 0.63 |
| −20 | $1.34 \times 10^6$ | 0.68 |
| −10 | $6.86 \times 10^5$ | 0.68 |
| 0 | $4.20 \times 10^5$ | 0.62 |
| 10 | $2.71 \times 10^5$ | 0.57 |
| 20 | $1.89 \times 10^5$ | 0.50 |
| 30 | $1.47 \times 10^5$ | 0.45 |
| 40 | $1.24 \times 10^5$ | 0.42 |
| 50 | $1.08 \times 10^5$ | 0.41 |
| 60 | $9.07 \times 10^4$ | 0.39 |
| 70 | $8.00 \times 10^4$ | 0.39 |
| 80 | $6.62 \times 10^4$ | 0.39 |
| 90 | $5.85 \times 10^4$ | 0.38 |
| 100 | $5.48 \times 10^4$ | 0.38 |
| 110 | $4.80 \times 10^4$ | 0.38 |
| 120 | $4.45 \times 10^4$ | 0.39 |
| 130 | $4.10 \times 10^4$ | 0.39 |
| 140 | $3.42 \times 10^4$ | 0.39 |
| 150 | $3.03 \times 10^4$ | 0.41 |
| 160 | $2.55 \times 10^4$ | 0.43 |
| 170 | $1.90 \times 10^4$ | 0.48 |
| 180 | $1.27 \times 10^4$ | 0.52 |

The data in Table 25 demonstrate that the vibration damping material of Example 114, formulated with 41 wt % aluminum oxide, provides a useful temperature range of —42 to 2° C.

Example 115–118

In Examples 115–118 vibration damping compositions were prepared by mixing the polydimethylsiloxane polyurea segmented copolymers of Examples 81–84, dried MQ resin and/or organic tackifying resin FORAL™85, available from Hercules Inc., toluene, and isopropanol as shown in Table 206. Samples were agitated slowly until dissolved. Examples 117 and 118, containing organic tackifying resin, FORAL 85™, required heat to dissolve the tackifying resin.

TABLE 26

| Example | Copolymer of Example | Copolymer (parts) | MQ 1170-002 (parts) | FORAL 85 ™ (parts) | Toluene (parts) | Isopropanol (parts) |
|---|---|---|---|---|---|---|
| 115 | 81 | 12.5 | 12.5 | — | 18.8 | 18.8 |
| 116 | 82 | 12.5 | 5.36 | — | 6.3 | 6.3 |
| 117 | 83 | 12.5 | — | 12.5 | 6.3 | 6.3 |
| 118 | 84 | 12.5 | 6.3 | 6.3 | 6.3 | 6.3 |

The samples were then coated onto release liner, dried for 15 minutes at a temperature of 70° C., and laminated to form a vibration damping material. The storage modulus, G', and loss factor, tan δ, measured at 1 Hz were determined and are reported in Table 27.

TABLE 27

| Temp | Example 115 | | Example 116 | | Example 117 | | Example 118 | |
|---|---|---|---|---|---|---|---|---|
| (° C.) | G'(Pa) | Tanδ | G'(Pa) | Tanδ | G'(Pa) | Tanδ | G'(Pa) | Tanδ |
| −90 | $7.76 \times 10^7$ | 0.05 | $9.60 \times 10^7$ | 0.05 | $8.05 \times 10^7$ | 0.01 | $9.52 \times 10^7$ | 0.01 |
| −80 | $6.68 \times 10^7$ | 0.08 | $9.86 \times 10^7$ | 0.04 | $7.98 \times 10^7$ | 0.00 | $9.43 \times 10^7$ | 0.01 |
| −70 | $5.30 \times 10^7$ | 0.14 | $1.04 \times 10^8$ | 0.03 | $7.91 \times 10^7$ | 0.01 | $9.31 \times 10^7$ | 0.01 |
| −60 | $4.23 \times 10^7$ | 0.19 | $1.01 \times 10^8$ | 0.06 | $7.82 \times 10^7$ | 0.01 | $9.13 \times 10^7$ | 0.02 |
| −50 | $3.14 \times 10^7$ | 0.26 | $4.89 \times 10^7$ | 0.36 | $7.75 \times 10^7$ | 0.01 | $8.77 \times 10^7$ | 0.03 |
| −40 | $1.97 \times 10^7$ | 0.40 | $1.68 \times 10^7$ | 0.39 | $6.98 \times 10^7$ | 0.05 | $6.38 \times 10^7$ | 0.15 |
| −30 | $1.07 \times 10^7$ | 0.59 | $6.35 \times 10^6$ | 0.31 | $4.88 \times 10^7$ | 0.17 | $1.84 \times 10^7$ | 0.54 |
| −20 | $3.89 \times 10^6$ | 0.78 | $2.40 \times 10^6$ | 0.29 | $1.87 \times 10^7$ | 0.52 | $7.62 \times 10^6$ | 0.87 |
| −10 | $2.55 \times 10^6$ | 0.76 | $2.00 \times 10^6$ | 0.30 | $4.77 \times 10^6$ | 0.94 | $3.43 \times 10^6$ | 0.73 |
| 0 | $1.57 \times 10^6$ | 0.74 | $1.58 \times 10^6$ | 0.31 | $2.26 \times 10^6$ | 0.93 | $2.74 \times 10^6$ | 0.46 |
| 10 | $1.01 \times 10^6$ | 0.70 | $1.22 \times 10^6$ | 0.32 | $1.45 \times 10^6$ | 0.78 | $3.99 \times 10^5$ | 0.41 |
| 20 | $6.11 \times 10^5$ | 0.63 | $1.00 \times 10^6$ | 0.32 | $9.02 \times 10^5$ | 0.69 | $2.81 \times 10^5$ | 0.40 |
| 30 | $4.30 \times 10^5$ | 0.55 | $8.10 \times 10^5$ | 0.32 | $2.49 \times 10^5$ | 0.66 | $1.82 \times 10^5$ | 0.43 |
| 40 | $3.10 \times 10^5$ | 0.47 | $5.19 \times 10^5$ | 0.29 | $1.91 \times 10^4$ | 0.69 | $1.17 \times 10^5$ | 0.53 |
| 50 | $2.44 \times 10^5$ | 0.42 | $3.66 \times 10^5$ | 0.30 | $1.01 \times 10^4$ | 0.84 | $6.42 \times 10^4$ | 0.64 |
| 60 | $2.04 \times 10^5$ | 0.37 | $2.54 \times 10^5$ | 0.37 | — | — | $2.88 \times 10^4$ | 0.84 |
| 70 | $1.80 \times 10^5$ | 0.34 | $1.55 \times 10^5$ | 0.47 | — | — | $1.66 \times 10^4$ | 0.99 |
| 80 | $1.59 \times 10^5$ | 0.33 | $9.74 \times 10^4$ | 0.52 | — | — | — | — |
| 90 | $1.42 \times 10^5$ | 0.33 | $7.49 \times 10^4$ | 0.50 | — | — | — | — |
| 100 | $1.28 \times 10^5$ | 0.33 | $5.66 \times 10^4$ | 0.41 | — | — | — | — |
| 110 | $1.15 \times 10^5$ | 0.35 | $4.23 \times 10^4$ | 0.32 | — | — | — | — |
| 120 | $1.04 \times 10^5$ | 0.37 | $2.67 \times 10^4$ | 0.32 | — | — | — | — |
| 130 | $9.07 \times 10^4$ | 0.39 | $1.74 \times 10^4$ | 0.36 | — | — | — | — |
| 140 | $7.84 \times 10^4$ | 0.42 | $3.60 \times 10^3$ | 0.32 | — | — | — | — |
| 150 | $6.53 \times 10^4$ | 0.43 | — | — | — | — | — | — |
| 160 | $5.47 \times 10^4$ | 0.44 | — | — | — | — | — | — |
| 170 | $4.59 \times 10^4$ | 0.45 | — | — | — | — | — | — |

TABLE 27-continued

| Temp | Example 115 | | Example 116 | | Example 117 | | Example 118 | |
|---|---|---|---|---|---|---|---|---|
| (° C.) | G'(Pa) | Tanδ | G'(Pa) | Tanδ | G'(Pa) | Tanδ | G'(Pa) | Tanδ |
| 180 | 2.88 × 10⁴ | 0.54 | — | — | — | — | — | — |
| 190 | 1.54 × 10⁴ | 0.67 | — | — | — | — | — | — |

The data in Table 27 show that Example 115, based on a polydimethylsiloxane polyurea segmented copolymer derived from equimolar quantities of a polydimethylsiloxane diamine of about 50,000 molecular weight and Dytek A™, a short chain hydrocarbon diamine, provides a vibration damping material with a useful temperature range of —25 to 35° C. when tackified with MQ resin.

The data in Table 27 for Examples 116, 117, and 118 show that a polidimethylsiloxanepolyurea segmented copolymer derived from a polydimethylsiloxane diamine of about 5300 molecular weight and two organic diamines, Jeffamine™ D-4000, a polypropylene oxide diamine having a molecular weight of about 4,500, and Dytek A™ a short chain hydrocarbon diamine having a molecular weight of about 100, where polypropylene oxide constitutes about 77 wt % of the copolymer, when tackified with an MQ silicate resin, an organic tackifying resin, or a combination of MQ and organic tackifying resins provide vibration damping materials with useful temperature ranges of 21 to 52° C., —5 to 5° C., and —24 to 13 ° C. Examples 115, 116 and 118 were also evaluated as heat activated adhesives and afforded stress at break values of 0.30 MN/M²,0.84 MN/M² and 0.15 MN/M², respectively.

Example 119

In Example 119, MQ resin powder containing less than 1% toluene (GE Silicones, material 1170-002) was fed at a rate of 42.8 g/min into zone 1 of a Berstorff 40 mm diameter 1600 mm length corotating twin screw extruder. Polydimethylsiloxane Diamine C, Lot 2, 22,000 molecular weight, was injected at a rate of 38.1 g/min (0.00173 mol/min) into zone 2. Methylenedicyclohexylene-4,4'-diisocyanate was fed at a rate of 0.585 g/min (0.00223 mol/min) into zone 5 to provide an NCO:NH$_2$ ratio of 1.29: 1.00. The diisocyanate feed line was placed close to the screw threads as in Example 1. Double start fully intermeshing screws, rotating at 100 revolutions per minute, were used throughout the entire length of the barrel. The temperatures set for each of the 160 mm zones were: zone—25° C.; zones 2 through 4—40° C.; zone 5—60° C.; zone 6—120° C.; zone 7—160° C.; and zones 8 through 10, endcap, and melt pump—180° C. Vacuum was pulled on zone 8. The polydiorganosiloxane polyurea segmented copolymer pressure-sensitive adhesive was collected and cooled in air.

Example 120

In Example 120, polydiorganosiloxane polyurea segmented copolymer pressure-sensitive adhesive was produced as in Example 119, with the following changes. The MQ resin flowrate was 55.8 g/min, the polydimethylsiloxane diamine was Polydimethylsiloxane Diamine F, molecular weight 71,000, injected at 37.0 g/min (0.000521 mol/min), and the diisocyanate was fed at 0.143 g/min (0.000546 mol/min). The temperature set points were: zone 4—60° C.; zone 5—120° C.; zone 6—160° C.; and zone 7—180° C.

Example 121

In Example 121, polydiorganosiloxane polyurea segmented copolymer pressure-sensitive adhesive was produced as in Example 120, except the MQ resin flowrate was 30.4 g/min.

Comparative Example C3

Dow Corning Silicone pressure-sensitive adhesive 280A was coated and thermally cured according to the manufacturer's specifications.

Examples 119–121 and Comparative Example C1 were tested for dry peel against steel, wet rusty peel, initial corrosion protection via EIS, and corrosion protection after 3 weeks of aging in the electrolyte solution. The results are set forth in Table 27.

TABLE 27

| Example | Diamine Mn | % MQ tackifier | dry peel (N/dm) | wet, rusty peel (N/dm) | static shear (minutes) | Initial Resistance (Ω/cm²) | Resistance after 3 weeks (Ω/cm²) |
|---|---|---|---|---|---|---|---|
| 119 | 22,000 | 53 | 57 | 42 | 4448 | >4 × 10¹¹ | 2 × 10¹⁰ |
| 120 | 71,000 | 60 | 92 | 114 | >10,000 | 2 × 10¹⁰ | 6 × 10⁹ |
| 121 | 71,000 | 45 | 53 | 48 | 127 | 2 × 10¹¹ | 4 × 10¹⁰ |
| C3 | Dow corning 280A, cured | | | | 516 | >1 × 10⁹ | <10 |

Table 27 shows that the three representative polydiorganosiloxane polyurea segmented copolymer formulations can be optimized for wet adhesion, shear and corrosion resistance. Comparative Example C3 is a commercial silicone PSA that does not offer corrosion resistance.

Example 122

In Example 122, polydiorganosiloxane polyurea segmented copolymer pressure-sensitive adhesive was produced as in Example 119, with the following changes. The MQ resin flowrate was 31.4 g/min, the polydimethylsiloxane diamine was Polydimethylsiloxane Diamine G, molecular weight 105,000, injected at 29.0 g/min (0.000276 mol/min) into zone 3, and the diisocyanate was fed at 0.0803 g/min (0.000307 mol/min). Screw speed was 250 revolutions per minute. Zone 1 was set at 15° C.

In Examples 123–126, polydiorganosiloxane polyurea segmented copolymer pressure-sensitive adhesives were produced in a manner similar to Example 122, but with different MQ and diisocyanate flowrates, as listed in Table 28. The polydiorganosiloxane polyurea segmented copolymer pressure-sensitive adhesives of Examples 122–126 were coated at 0.2 mm onto polyester backing, applied to grit blasted steel, and soaked in deionized water at 50° C. for 3 months. Table 28 lists these pressure-sensitive adhesive formulations in decreasing order of protection, as determined by visual inspection.

TABLE 28

| Example | % MQ tackifier | NCO/NH$_2$ ratio |
|---|---|---|
| 122 | 53 | 1.11:1 |
| 123 | 53 | 1.05:1 |
| 124 | 40 | 1.00:1 |
| 125 | 70 | 1.00:1 |
| 126 | 20 | 1.11:1 |

Example 127

In Example 127, a polydiorganosiloxane polyurea segmented copolymer pressure-sensitive adhesive was produced as in Example 119 with the following changes. The MQ resin flowrate was 21.6 g/min, the polydimethylsiloxane diamine was Polydimethylsiloxane Diamine D, Lot 1, molecular weight 37,800, injected at 21.5 g/min (0.000569 mol/min), and the isocyanate, Dow ISONATE™ 2143L, was fed at 0.168 g/min (0.000568 mol/min). The temperature set points were: zone 1—30° C.; zones 2 through 4—50° C.; zone—60° C.; zone 6—100° C.; zone 7—160° C.; —10, and zones 8–10 endcap, and melt pump—180° C. A pressure-sensitive adhesive tape was produced via solvent coating, as in Example 1, to produce a 0.4 mm thick pressure-sensitive adhesive layer. This tape was applied over a pre-existing rust spot on a steel plate. This construction was placed in an aerated, room temperature electrolyte (3 % NaCl in deionized water) for seven days. Corrosion of the bare metal occurred rapidly, while the appearance of the surface under the tape did not change.

Example 128

The polydiorganosiloxane polyurea segmented copolymer pressure-sensitive adhesive of Example 125 was extruded, as in Example 8, as a 0.2 mm thick film onto release liners. Strips of the adhesive were cut from the film, wrapped around a twisted connection between two copper wires, and inserted into an expanded THV™ heat shrink tube (3M Co.). A standard heat shrink oven was used to shrink the outer tube, which caused the adhesive to flow around the wires and seal the connection. The test pieces were immersed in 5 wt % salt water and attached to a 50 volt power supply, as specified in the Initial Current Leakage Test (ICLT), Military Specification. After 24 hours exposure, the leakage current remained below 25 μA, meeting the test specification. The test sequence was repeated on six more samples sealed with smaller adhesive strips, producing identical results. The polydiorganosiloxane polyurea segmented copolymer pressure-sensitive adhesive possesses a rheology at the heat shrink temperature high enough that the pressure-sensitive adhesive does not flow out of the desired configuration, yet is appropriate to for conforming around the desired geometry.

Various modifications and alterations of this invention will become apparent to those skilled in the art without departing from the scope and principles of this invention, and it should be understood that this invention is not be unduly limited to the illustrative embodiments set forth herein above. All publications and patents are incorporated herein by reference to the same extent as if each individual publication or patent was specifically and individually indicated to be incorporated by reference.

What is claim:

1. A process for producing a tackified polydiorganosiloxane polyurea segmented copolymer comprising the steps of:

(a) continuously providing reactants wherein the reactants include at least one polyisocyanate, at least one polyamine, wherein the polyamine comprises at least one polydiorganosiloxane diamine, or a mixture of at least one polydiorganosiloxane diamine and at least one organic polyamine and at least one silicate resin to a reactor;

(b) mixing the reactants under substantially solventless conditions;

(c) allowing the reactants to react to form a polydiorganosiloxane polyurea segmented copolymer; and (d) conveying the copolymer from the reactor.

* * * * *

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Title page,
Item [56], References Cited, U.S. PATENT DOCUMENTS,
"4,528,343" reference, delete "7/1985", insert in place thereof -- 9/1985 --;
OTHER PUBLICATIONS,
"Parin" reference, delete "Techical", insert in place thereof -- Technical --;
Item [57], ABSTRACT,
Line 1, delete "polydiorgannosiloxane", insert in place thereof -- polydiorganosiloxane --;
Line 3, delete "polyaminie", insert in place thereof -- polyamine --;
Line 8, delete "amined", insert in place thereof -- amine --;

Column 1,
Line 46, delete "conmnonly", insert in place thereof -- commonly --;
Line 65, delete "aplications", insert in place thereof -- applications --;

Column 2,
Line 4, delete "membrances", insert in place thereof -- membranes --;
Line 8, delete "automative", insert in place thereof -- automotive --;
Line 60, delete "adhesive", insert in place thereof -- adhesives --;

Column 3,
Line 7, delete "nonadhereing", insert in place thereof -- nonadhering --;

Column 5,
Line 4, delete "5", insert in place thereof -- δ --;
Line 24, delete "calendaring", insert in place thereof -- calendering --;

Column 6,
Lines 60-70, delete "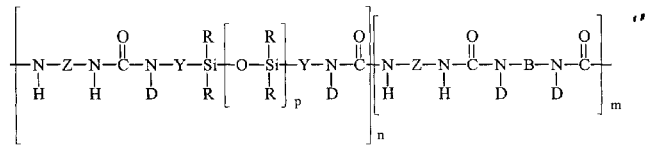"

insert in place thereof
-- "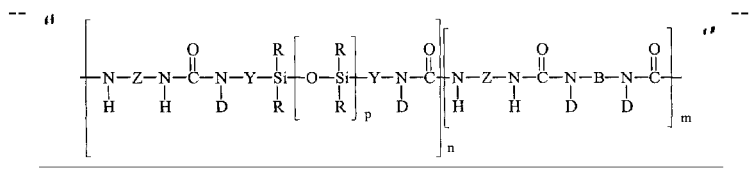" --

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Column 7,
Line 22, delete "No.", insert in place thereof -- U.S. Pat. No. --;
Line 44, insert -- 1 -- following "of";
Line 50, insert -- a ring structure including B or -- following "completes";
Line 59, insert -- p -- preceding "is a number";

Column 9,
Line 15, delete "D400", insert in place thereof -- D-400 --;
Line 15, delete "D4000", insert in place thereof -- D-4000 --;
Line 51, delete "disocyanatohexane", insert in place thereof -- diisocyanatohexane --;
Line 51-52, delete "1,1 2- diisocyanatodode cane", insert in place thereof -- 1,12-diisocyanatododecane, --;

Column 11,
Line 44, delete "R'$_3$SiO$_{2/1}$", insert in place thereof -- R"$_3$SiO$_{1/2}$ --;

Column 13,
Line 25, delete "diarnine(s)", insert in place thereof -- diamine(s) --;
Line 56, delete "Vol. Dec. 25,", insert in place thereof -- Vol. 25, Dec., --;

Column 14,
Line 43, delete "polyisocynate", insert in place thereof -- polyisocyanate --;
Line 44, insert -- the -- following "in";
Line 46, delete "stirre,", insert in place thereof -- stirrer, --;
Line 53, delete "h", insert in place thereof -- the --;
Line 57, delete "feed locks and deis.", insert in place thereof -- feed blocks and dies. --;
Line 57, delete "al," following "conveying";
Line 58, insert -- the -- following "materials,";
Line 59, delete "bout", insert in place thereof -- about --;

Column 15,
Line 5, insert -- between -- following "lying";
Line 17, delete "isused", insert in place thereof -- is used --;

Column 17,
Line 15, delete "by", insert in place thereof -- be --;
Line 17, delete "metalized", insert in place thereof -- metallized --;

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Column 18,
Line 27, delete "5", insert in place thereof -- 55 --;
Line 27, delete "line", insert in place thereof -- liner --;
Line 58, delete "composition", insert in place thereof -- compositions --;

Column 20,
Line 46, delete "surbstrate", insert in place thereof -- substrate --;
Line 48-49, delete "adhesvie", insert in place thereof -- adhesive --;

Column 22,
Line 8, delete "alloysthereof", insert in place thereof -- alloys thereof --;

Column 23,
Line 30, delete "4:5260", insert in place thereof -- 4: 5260 --;
Line 59, delete "Diarnine", insert in place thereof -- Diamine --;

Column 24,
Line 33, delete "N/M$^2$," insert in place thereof -- N/m$^2$ --;
Line 42, delete "75.I", insert in place thereof -- 75.1 --;
Line 53, delete "N/m2", insert in place thereof -- N/m$^2$ --;
Line 54, delete "15° C. foe", insert in place thereof -- 150° C. for --;
Line 66, delete "tetramethylamrnonium", insert in place thereof -- tetramethylammonium --;

Column 25,
Line 18, delete "polydiorganosilicone", insert in place thereof -- polydiorganosiloxane --;
Line 20, delete "Polydimethylsilaxane", insert in place thereof -- Polydimethylsiloxane --;

Column 26,
Line 19, delete "Diarine", insert in place thereof -- Diamine --;
Line 21, delete "disocyanate", insert in place thereof -- diisocyanate --;
Line 43, delete "encap", insert in place thereof -- endcap --;
Line 55, delete " interneshing", insert in place thereof -- intermeshing --;
Line 59, insert -- 9 -- following "zone";
Line 66, delete "Diarine", insert in place thereof -- Diamine --;

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Column 27,
Line 8, delete "of" following "8";
Line 42, delete "Diarnine", insert in place thereof -- Diamine --;
Line 51, delete "dijsocyanate", insert in place thereof -- diisocyanate --;
Line 58, insert -- 5 -- following "zone";
Line 59, insert -- endcap - 180° C. -- following "8 and";

Column 28,
Line 20, delete "154.3parts", insert in place thereof -- 154.3 parts --;
Line 31, delete "monoarnines", insert in place thereof -- monoamines --;
Line 41, delete "Aminopropyidimethylfluorosilane", insert in place thereof ☐Aminopropyldimethylfluorosilane --;
Line 45, delete "279.6 gl, 3-bis", insert in place thereof -- 279.6 g 1,3-bis --;
Line 64, delete "2.5 Mn-butyl", insert in place thereof -- 2.5M n-butyl --;

Column 29,
Line 14, delete " 2.5 Mn-butyl", insert in place thereof -- 2.5M n-butyl --;
Line 16, delete "and" following "and";
Line 58, delete "9830", insert in place thereof -- 14,760 --;

Column 30,
Line 25, delete "Peet", insert in place thereof -- Peel --;

Column 31,
Line 34, delete "(MvTR$_{up}$)", insert in place thereof -- (MVTR$_{up}$) --;
Line 60, delete "assemble", insert in place thereof -- assembly --;

Column 32,
Line 67, delete "$\mu 3$", insert in place thereof -- $\mu$m, --;

Column 33
Line 1, delete "m," in front of "on";
Line 22, delete "50", insert in place thereof -- 5° --;
Line 64, delete "Impedence", insert in place thereof --Impedance --;

Column 34,
Line 3, delete "Impedence", insert in place thereof --Impedance --;
Line 4, delete "articleby", insert in place thereof -- article by --;
Line 61, delete "interneshing", insert in place thereof -- intermeshing

UNITED STATES PATENT AND TRADEMARK OFFICE
CERTIFICATE OF CORRECTION

PATENT NO.    : 6,664,359 B1
DATED         : December 16, 2003
INVENTOR(S)   : Kangas, Lani S.

It is certified that error appears in the above-identified patent and that said Letters Patent is hereby corrected as shown below:

Column 35,
Line 6, delete "Diarine", insert in place thereof -- Diamine --;
Line 9, delete "°iisocyanate", insert in place thereof -- diisocyanate --;
Line 8, delete "Diarnine", insert in place thereof -- Diamine --;
Line 13, insert -- zone -- preceeding "7";
Line 38, delete "500", insert in place thereof -- 50° C.; --;
Line 40, insert -- in -- following "cooled";
Line 43, delete "tackifing", insert in place thereof -- tackifying --;
Lines 66-67, delete "interm-neshing", insert in place thereof -- intermeshing --;

Column 36,
Line 12, delete "Diarnine", insert in place thereof -- Diamine --;
Line 22, delete "and 8—50° C.;", insert in place thereof -- and 8—150° C.; --;
Line 23, delete "60° C.;", insert in place thereof -- 160° C.; --;
Line 28, delete "1-7had", insert in place thereof -- 1-7 had --;
Line 45, delete "14", insert in place thereof -- 1-4 --;
Line 52, delete "1800", insert in place thereof -- 180° --;
Line 67, delete 3 h 5,700", insert in place thereof -- 35,700 --;

Column 37,
Line 19, delete "gm", insert in place thereof -- $\mu$-m --;
Line 51, delete "zones", insert in place thereof -- zone --;
Line 52, delete "20° C.", insert in place thereof -- 120° C. --;
Line 52, delete "60° C.", insert in place thereof -- 160° C. --;
Line 52, delete "90° C.", insert in place thereof -- 190° C. --;

Column 38,
Line 43, delete "partstetrahydrofuran", insert in place thereof -- parts tetrahydrofuran --;
Line 56, delete "partstet", insert in place thereof -- parts tet- --, Column 39,
Line 6, insert -- procedure -- following "the";
Line 9, insert -- In -- preceding "Example";
Line 12, delete "isocianatomethyl", insert in place thereof -- isocyanatomethyl --;
Line 13, delete "partstet-", insert in place thereof -- parts tet- --;
Line 60, delete "50 $\mu$m 2mil)", insert in place thereof -- 50 $\mu$m (2 mil) --;

Column 40,
Line 1, delete "disocyanate" insert in place thereof -- diisocyanate --;

UNITED STATES PATENT AND TRADEMARK OFFICE
CERTIFICATE OF CORRECTION

PATENT NO.    : 6,664,359 B1
DATED         : December 16, 2003
INVENTOR(S)   : Kangas, Lani S.

It is certified that error appears in the above-identified patent and that said Letters Patent is hereby corrected as shown below:

Column 41,
Line 4, delete "20° C.", insert in place thereof -- 120° C. --;
Line 4, delete "30° C.", insert in place thereof -- 130° C. --;
Line 4, delete "S-140°", insert in place thereof -- 5-140° --;

Column 42,
Line 35, insert -- 5 -- following "zone";
Line 36, delete "interneshing", insert in place thereof -- intermeshing --;
Line 41, insert -- 5 -- following "zone";

Column 43,
Line 3, delete "200", insert in place thereof -- 20 --;
Line 30, delete "copolymerstackified", insert in place thereof -- copolymers tackified --;

Column 44,
Line 19, insert -- 5 -- following "zone";
Line 20, delete "encap", insert in place thereof -- endcap --;

Column 45,
Line 33, delete "p" preceding "Composite";
Line 52, insert -- 5 -- after "Example";

Column 46,
Line 15, delete "the" following "of";

Column 48,
Line 8, insert -- 5 -- following "zone";
Line 8, delete "60° C.;" insert in place thereof -- 160° C; --;
Line 9, delete "179° C.;" insert in place thereof -- 170° C; --;
Line 55, delete "5", insert in place thereof -- 55 --;
Line 65, delete "repeted", insert in place thereof -- repeated --;

Column 49,
Line 24, delete "king", insert in place thereof -- marking --;
Line 25, insert -- two -- preceding "concrete"

UNITED STATES PATENT AND TRADEMARK OFFICE
CERTIFICATE OF CORRECTION

PATENT NO.     : 6,664,359 B1
DATED          : December 16, 2003
INVENTOR(S)    : Kangas, Lani S.

It is certified that error appears in the above-identified patent and that said Letters Patent is hereby corrected as shown below:

Column 50,
Line 6, delete "Example", insert in place thereof -- Examples --;
Line 24, delete "NH2", insert in place thereof -- $NH_2$ --;
Line 44, delete "NCO NH2", insert in place thereof -- $NCO:NH_2$ --;
Line 58, delete "NH2", insert in place thereof – $NH_2$ --;
Line 60, delete "in", insert in place thereof -- and --;

Column 51,
Line 10, insert -- was -- following "which";
Lines 23 and 35, delete "weigh t", insert in place thereof -- weight --;
Lines 43 and 65, delete "t" following "upright";

Column 52,
Line 13, delete "NH2", insert in place thereof -- $NH_2$ --;
Line 22, delete "60° C.", insert in place thereof -- 160° C. --;
Line 66, delete "encap", insert in place thereof -- endcap --;
Line 40, delete "Day,", insert in place thereof -- Dry, --;
Line 66, delete "80° C.;", insert in place thereof -- 180° C.; --;
Line 66, delete "90° C.;", insert in place thereof -- 190° C.; --;

Column 53,
Line 1, delete "Am$^{TM}$", insert in place thereof – $A^{TM}$ --;
Line 26, insert -- 5 -- following "zone";
Line 28, insert -- 5 -- following "zone";
Line 29, delete "75° C.", insert in place thereof -- 175° C.; --;
Line 38, insert -- 513-1-0393-0594) -- following "#";
Line 41, insert -- SC94030211) -- following "#";
Line 56, delete "polystryene", insert in place thereof -- polystyrene Column 54,
Line 27, delete "diarnine", insert in place thereof -- diamine --;
Line 46, delete "84", insert in place thereof -- 85 --;
Line 67, delete "mined", insert in place thereof -- were determined. --

Column 55,
Lines 33-67, delete all (includes five lines of text and second Table 12);

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Column 57,
Line 63, insert -- In -- preceding "Example";

Column 58,
Line 37, delete "copolimers", insert in place thereof -- copolymers --;
Line 52, insert -- forth in -- following "set";
Line 66, insert -- for each -- following "determined";

Column 59,
Line 38, delete "MN/M$^2$", insert in place thereof -- MN/m$^2$ --;

Column 60,
Line 62, under "Example 99" delete "0.45", insert in place thereof -- 0.48 --;

Column 61,
Line 11, insert -- directly -- following "used";
Line 12, delete "de" following "provide";
Line 20, insert -- : -- following "toluene";

Column 62,
Line 11, delete "10$^4$", insert in place thereof -- 10$^5$ --;

Column 63,
Line 25, delete "93", insert in place thereof -- 93° C.
Line 26, insert -- reduce -- following "to";
Line 36, delete "agitate", insert in place thereof -- agitated --;

Column 64,
Line 34, delete "copoplymer", insert in place thereof -- copolymer --;
Line 67, delete "210", insert in place thereof -- 21 --;

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Column 65,
Line 2, delete "Example 87", insert in place thereof -- Example 106 --;
Line 38, delete "6", insert in place thereof -- 16 --;
Line 39, delete "2", insert in place thereof -- 12 --;
Line 41, delete "95 MN/r$^2$.", insert in place thereof -- 0.95 MN/m$^2$. --;
Line 43, delete "10", insert in place thereof -- 110 --;
Line 45, insert -- In -- preceding "Example";
Line 46, delete "in", insert in place thereof -- 0.0065 g/min --;
Line 61, delete "; cooled", insert in place thereof -- . The extrudate was cooled --;
Line 63, delete "damper", insert in place thereof -- damping --;
Line 64, delete "parallels", insert in place thereof -- was --;
Line 65, delete "released", insert in place thereof -- release --;

Column 66,
Line 59, delete "demostrate", insert in place thereof -- demonstrates --;

Column 67,
Line 3, insert -- 1170-002 -- following "material";
Line 13, delete "NH2", insert in place thereof -- NH2 --;
Line 18, delete "68° C.;", insert in place thereof -- 168° C.; --;
Line 23, delete "50. 8", insert in place thereof -- 50.8 --;

Column 68,
Line 1, delete "5", insert in place thereof -- δ --;
Line 28, delete "temperatures", insert in place thereof -- temperature --;
Line 63, delete "demostrate", insert in place thereof -- demonstrate --;
Line 66, delete "of" following "of";

Column 69,
Line 8, delete "able", insert in place thereof -- Table --;

Column 70,
Line 8, delete "Example", insert in place thereof -- Examples --;
Line 17, delete "206.", insert in place thereof -- 26. --;

Column 71,
Line 19, delete "polidimethylsiloxanepolyurea", insert in place thereof
-- polydimethylsiloxanepolyurea --;
Line 32,33, delete "MN/M$^2$", insert in place thereof -- MN/m$^2$ --; (all three locations)
Line 62, insert -- 1 -- following "zone";

UNITED STATES PATENT AND TRADEMARK OFFICE
CERTIFICATE OF CORRECTION

PATENT NO. : 6,664,359 B1
DATED : December 16, 2003
INVENTOR(S) : Kangas, Lani S.

It is certified that error appears in the above-identified patent and that said Letters Patent is hereby corrected as shown below:

Column 72,
Line 29, delete "C1, insert in place thereof -- C3 --;
Table 27, delete "corning", insert in place thereof -- Corning --;
Lines 33, 36 and 47 delete "Table 27", insert in place thereof -- Table 28 --;
Line 67, delete "28", insert in place thereof -- 29 --;

Column 73,
Lines 4 and 8, delete "Table 28", insert in place thereof -- Table 29 --;
Line 29, insert -- 5 -- following "zone";
Line 30, delete "-10, and zones 8-10", insert in place thereof -- and zones 8-10, --;

Column 74,
Line 8, insert -- 23053 -- following ""specification";
Line 16, delete "to" following "appropriate",
Line 21, insert -- to -- following "not";
Line 27, delete "claim", insert in place thereof -- claimed --;
Line 36, delete "polyamine", insert in place thereof -- amine --.

Signed and Sealed this

Third Day of August, 2004

JON W. DUDAS
*Acting Director of the United States Patent and Trademark Office*